United States Patent
Fan et al.

(10) Patent No.: US 9,948,557 B2
(45) Date of Patent: Apr. 17, 2018

(54) METHODS AND APPARATUSES FOR ROUTING AND FORWARDING, ESTABLISHING ROUTING TABLE, AND ACQUIRING CONTENT

(71) Applicant: HUAWEI TECHNOLOGIES CO., LTD., Shenzhen, Guangdong (CN)

(72) Inventors: Lingyuan Fan, Shenzhen (CN); Chunfeng Yao, Beijing (CN); Zhefeng Yan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 84 days.

(21) Appl. No.: 14/737,941

(22) Filed: Jun. 12, 2015

(65) Prior Publication Data
US 2015/0281079 A1    Oct. 1, 2015

Related U.S. Application Data

(63) Continuation of application No. PCT/CN2013/081601, filed on Aug. 16, 2013.

(30) Foreign Application Priority Data

Dec. 12, 2012  (CN) .......................... 2012 1 0535249

(51) Int. Cl.
*H04L 12/741* (2013.01)
*H04L 12/64* (2006.01)
(Continued)

(52) U.S. Cl.
CPC ........ *H04L 45/745* (2013.01); *H04L 12/6418* (2013.01); *H04L 45/306* (2013.01); *H04L 45/42* (2013.01)

(58) Field of Classification Search
None
See application file for complete search history.

(56) References Cited

U.S. PATENT DOCUMENTS

| | | | |
|---|---|---|---|
| 6,772,215 | B1 | 8/2004 | Rathonyi et al. |
| 2006/0088031 | A1 | 4/2006 | Nalawade |

(Continued)

FOREIGN PATENT DOCUMENTS

| | | | |
|---|---|---|---|
| CN | 101540775 A | | 9/2009 |
| CN | 101686200 A | | 3/2010 |

(Continued)

OTHER PUBLICATIONS

Ashok Narayanan et al: "NDN and IP routing can it scale", Nov. 2011, total 26 pages.

*Primary Examiner* — Kouroush Mohebbi
(74) *Attorney, Agent, or Firm* — Leydig, Voit & Mayer, Ltd.

(57) ABSTRACT

Methods and apparatuses for routing and forwarding, establishing a routing table, and acquiring content are provided. The method for routing and forwarding includes: receiving a content request packet, where the content request packet carries a content name of requested content and container information of the requested content; determining whether any forwarding entry that matches the content name of the requested content exists in a FIB; determining whether any forwarding entry that matches the container identifier in the container information exists in the FIB when no forwarding entry that matches the content name of the requested content exists in the FIB; and when a forwarding entry that matches the container identifier in the container information of the requested content exists in the FIB, sending the content request packet according to a port in the matched forwarding entry.

21 Claims, 20 Drawing Sheets

(51) Int. Cl.
*H04L 12/717* (2013.01)
*H04L 12/725* (2013.01)

(56) References Cited

U.S. PATENT DOCUMENTS

| | | |
|---|---|---|
| 2009/0287835 A1 | 11/2009 | Jacobson |
| 2010/0195655 A1* | 8/2010 | Jacobson ............... H04L 45/748 370/392 |
| 2010/0332723 A1 | 12/2010 | Lin et al. |
| 2011/0075680 A1 | 3/2011 | Sun et al. |
| 2011/0265174 A1 | 10/2011 | Thornton et al. |
| 2012/0036180 A1 | 2/2012 | Thornton et al. |
| 2012/0158862 A1 | 6/2012 | Mosko et al. |
| 2012/0158912 A1 | 6/2012 | Jacobson |
| 2012/0158973 A1 | 6/2012 | Jacobson et al. |
| 2012/0290696 A1 | 11/2012 | Wu et al. |
| 2014/0036918 A1* | 2/2014 | Varvello ............... H04L 45/306 370/392 |
| 2014/0108672 A1 | 4/2014 | Ou et al. |

FOREIGN PATENT DOCUMENTS

| | | |
|---|---|---|
| CN | 102195844 A | 9/2011 |
| CN | 102549988 A | 7/2012 |
| CN | 102668518 A | 9/2012 |
| EP | 2214357 A1 | 8/2010 |
| EP | 2958281 A1 | 12/2015 |

\* cited by examiner

FIG. 2(b) Directed acyclic graph

FIG. 2(a) Tree

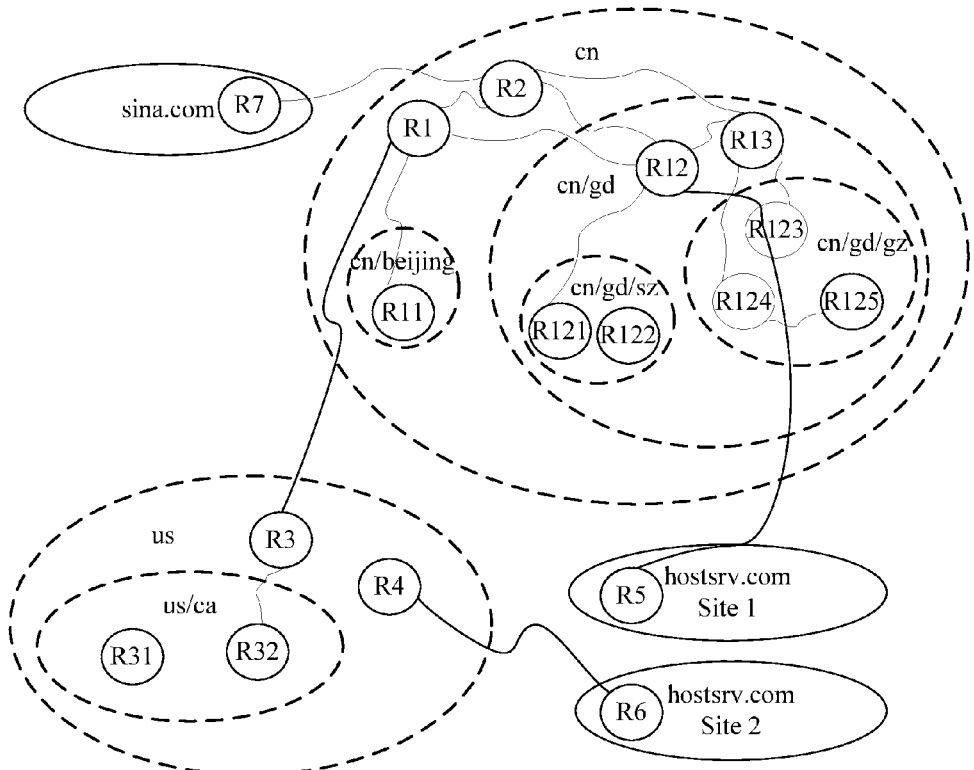

FIG. 12

| Receive a content request packet, where the content request packet carries a content name of requested content and container information of the requested content, where the container information of the requested content includes a container identifier used to identify a container that stores the requested content, where the container includes at least one routing node, where the requested content is capable of being routed in the container through one or more routing nodes in the at least one routing node, or the requested content is capable of being routed through the container | 510 |
|---|---|
| Determine a forwarding route for the content request packet according to the content name of the requested content and the container information of the requested content | 520 |

FIG. 13

METHODS AND APPARATUSES FOR ROUTING AND FORWARDING, ESTABLISHING ROUTING TABLE, AND ACQUIRING CONTENT

CROSS-REFERENCE TO RELATED APPLICATIONS

This application is a continuation of International Application No. PCT/CN2013/081601, filed on Aug. 16, 2013, which claims priority to Chinese Patent Application No. 201210535249.3, filed on Dec. 12, 2012, both of which are hereby incorporated by reference in their entireties.

TECHNICAL FIELD

The present disclosure relates to the communications field, and in particular, to methods and apparatuses for routing and forwarding, establishing a routing table, and acquiring content.

BACKGROUND

Although the Internet Protocol (Internet Protocol, "IP" for short) has achieved huge success and made the Internet ubiquitous, "terminals" have been placed in a core position since the birth of IP, where a session carrying IP packets between two terminals is identified by using a destination IP address and a source IP address. Therefore, IP is a terminal centric network protocol. However, nowadays, a session between terminals is not the main purpose of using the Internet. Instead, people use the Internet mainly for acquiring information. For examples, applications such as network news, search engines, network music, network videos, blogs, microblogs, social networking sites, and network forums actually all focus on production, propagation, and sharing of information. Moreover, when acquiring the information, people usually do not care about where the information is acquired. This is a new information or content centric model. To solve the problem of mismatch between the information centric model of Internet applications and the terminal centric model of IP, the research circle starts trying to redefine the waist of an Internet hourglass model and studying a new future Internet architecture directly oriented to information and content.

Among all information centric network (Information Centric Network, "ICN" for short) architectures, a named data network (Named Data Network, "NDN" for short) has a greatest impact. The NDN is studied and developed from a content centric networking (Content Centric Networking, "CCN" for short) project led by Van Jacobson. The NDN and CCN consider that a future network should use content-based naming and routing as a basis, adopt URL-like structured content naming, implement a cache function by using a content store table (Content Store, "CS" for short) in an NDN router, and find and determine a next hop through longest matching between a content name of requested content and a content name prefix in a forwarding information base (Forwarding Information Base, "FIB" for short). The NDN is also dedicated to the implementation of content-name-based forwarding based on a current IP router and an Ethernet forwarding engine. Therefore, a routing table capacity problem is a major problem of interest in an NDN study. The NDN tries to solve this problem through name aggregation. However, because the size of a content name space is much larger than that of an IP address space, the NDN is faced with a rather serious routing scalability problem. Specifically, at present, the number of uniform resource locators (Uniform Resource Locator, "URL" for short) indexed by Google has exceeded $10^{12}$. Therefore, even if the FIB of the NDN stores only top-level domain names, there should be up to $2 \times 10^8$ routes according to the current network scale. If a part of second-level and third-level name prefixes are added, the size of a routing table is estimated to reach $6 \times 10^8$ routes. This number is almost two hundred times the number of Border Gateway Protocol (Border Gateway Protocol, "BGP" for short) routes in the current network, while the increase of BGP routes by 10 times takes nearly 10 years. Therefore, it can be hardly expected that current hardware such as a forwarding engine can support an NDN routing table of this size within a short term.

With respect to the preceding routing scalability problem of the NDN, a possible solution proposed by a content naming mechanism of the NDN is: adding a topology-dependent prefix before a content name, and then reducing the size of a routing table through topology aggregation. However, this naming mechanism obviously has a problem of naming non-persistence. In particular, as the mobile Internet is booming nowadays, it is expected that content naming should be location-independent from perspectives of mobility, multi-homing, services, and security. Another solution introduces a concept of routing label on the basis of a content name. A routing label is used to define the location of content, and a user or a routing node can acquire a routing label set corresponding to a content name by querying a name resolution system. However, in a process of forwarding a packet of interest, the content name is only used for cache lookup, and what really determines a forwarding route for the packet of interest is a routing label. Therefore, this technical solution weakens the concept of content routing. However, the routing label is a piece of location information in essence, and this technical solution has no essential difference from IP. Therefore, this technical solution is more like an IP router with an additional content cache function, rather than content routing in a real sense. In addition, the technology overemphasizes the function of a system for separating and mapping two name spaces, which causes the technology to be dependent upon the name resolution system, so that original flexibility of the NDN that is based on content routing is largely lost. Therefore, how to solve the routing scalability problem and the like that are caused by the content name, while ensuring flexibility of content routing, is a pressing issue to be solved in the study of current NDN systems and other ICN systems.

SUMMARY

Embodiments of the present disclosure provide a method for routing and forwarding, a method for processing a content request, a method for establishing a routing table, a method for acquiring content, and a method for publishing content, a router, an apparatus for establishing a routing table, a user equipment, and an apparatus for publishing content. Container information of content is added on the basis of a content name to extend attributes of content in an ICN system, so that routing and forwarding are less dependent upon the content name.

In a first aspect, an embodiment of the present disclosure provides a method for routing and forwarding, where the method includes: receiving a content request packet, where the content request packet carries a content name of requested content and container information of the requested content, where the container information of the requested content includes a container identifier used to identify a container that stores the requested content; determining whether any forwarding entry that matches the content name of the requested content exists in a forwarding information base FIB; determining whether any forwarding entry that matches the container identifier in the container information of the requested content exists in the FIB when no forwarding entry that matches the content name of the requested content exists in the FIB, where a forwarding entry in the FIB includes a preset container identifier and a port corresponding to the preset container identifier; and when a forwarding entry that matches the container identifier in the container information of the requested content exists in the FIB, sending the content request packet according to a port in the matched forwarding entry.

With reference to the first aspect, in a first possible implementation manner, the container is a storage space used to store a group of content.

With reference to the first aspect or the first possible implementation manner of the first aspect, in a second possible implementation manner, the container includes at least one routing node, where the requested content is capable of being routed in the container through one or more routing nodes in the at least one routing node, or the requested content is capable of being routed through the container.

With reference to the first aspect or the first possible implementation manner of the first aspect, in a third possible implementation manner, the content name of the requested content corresponds to one or more home containers, where a home container of the requested content is a container that is capable of directly routing the requested content.

With reference to the first aspect or any one possible implementation manner of the first to third possible implementation manners of the first aspect, in a fourth possible implementation manner, the container is an access container of one or more first other containers; and/or one or more second other containers are access containers of the container; where, the access container is a container including another container in a topological relationship and having a forwarding entry for routing the content request packet to the another container.

With reference to the first aspect or any one possible implementation manner of the first to fourth possible implementation manners of the first aspect, in a fifth possible implementation manner, the container information further includes a resolution identifier corresponding to the container identifier, where the resolution identifier is used to identify whether the container corresponding to the container identifier is resolvable; and the determining whether any forwarding entry that matches the container identifier in the container information of the requested content exists in the FIB includes: acquiring, by resolution according to the resolution identifier, container identifiers of access containers of all resolvable containers of the requested content; and matching the container identifier in the container information of the requested content and the container identifiers of the access containers of all the resolvable containers of the requested content with the preset container identifiers in the FIB to determine whether any forwarding entry that matches the container identifier in the container information of the requested content and the container identifier of the access container exists in the FIB.

With reference to the fifth possible implementation manner of the first aspect, in a sixth possible implementation manner, the method further includes: adding container information, which is acquired by resolution, of the access containers of all the resolvable containers of the requested content, to the container information of the requested content.

With reference to the first aspect or any one possible implementation manner of the first to fourth possible implementation manners of the first aspect, in a seventh possible implementation manner, the container information further includes a resolution identifier corresponding to the container identifier, where the resolution identifier is used to identify whether the container corresponding to the container identifier is resolvable; and the method further includes: acquiring, by resolution according to the resolution identifier, a container identifier of an access container of the container when no forwarding entry that matches the container identifier in the container information of the requested content exists in the FIB; and matching the container identifier of the access container which is acquired by resolution, with the preset container identifiers in the FIB to determine whether any forwarding entry that matches the container identifier of the access container which is acquired by resolution exists in the FIB.

With reference to the seventh possible implementation manner of the first aspect, in an eighth possible implementation manner, the method further includes: adding container information of the access container which is acquired by resolution to the container information of the requested content.

With reference to the first aspect or any one possible implementation manner of the first to eighth possible implementation manners of the first aspect, in a ninth possible implementation manner, the forwarding entries in the FIB include content name prefixes and ports corresponding to the content name prefixes; the determining whether any forwarding entry that matches the content name of the requested content exists in the forwarding information base FIB includes: determining, according to whether a prefix of the content name of the requested content matches any content name prefix in the forwarding entries in the FIB, whether any forwarding entry that matches the content name of the requested content exists in the FIB; and the method further includes: when it is determined that a forwarding entry that matches the content name of the requested content exists in the FIB, sending the content request packet according to a port in the matched forwarding entry.

With reference to the first aspect or any one possible implementation manner of the first to ninth possible implementation manners of the first aspect, in a tenth possible implementation manner, the method further includes: before the determining whether any forwarding entry that matches the content name of the requested content exists in the FIB, determining whether any content that matches the content name of the requested content exists in a content store table CS; when content that matches the content name of the requested content exists in the CS, sending the matched content to a sender of the content request packet; and when no content that matches the content name of the requested content exists in the CS, performing the step of determining whether any forwarding entry that matches the content name of the requested content exists in the FIB.

With reference to the tenth possible implementation manner of the first aspect, in an eleventh possible implementation manner, the method further includes: when no content that matches the content name of the requested content exists in the CS, determining whether any PIT entry that matches the content name of the requested content exists in a pending information table PIT; when a PIT entry that matches the content name of the requested content exists in the PIT, adding a port corresponding to the sender of the content request packet to the matched PIT entry; and when no PIT entry that matches the content name of the requested content exists in the PIT, performing the step of determining whether any forwarding entry that matches the content name of the requested content exists in the FIB.

With reference to the first aspect or any one possible implementation manner of the first to eleventh possible implementation manners of the first aspect, in a twelfth possible implementation manner, the method further includes: sending the content request packet according to a default port, or discarding the content request packet when no forwarding entry that matches the container identifier in the container information of the requested content exists in the FIB.

With reference to the first aspect or any one possible implementation manner of the first to twelfth possible implementation manners of the first aspect, in a thirteenth possible implementation manner, the FIB includes a forwarding entry of a global container, where the forwarding entry of the global container includes a container identifier of the global container and a first port corresponding to the container identifier of the global container, where the first port is a port connecting a local node to a next-hop routing node of the global container, the global container is a container capable of global routing, and the global container includes a topology-dependent global container and/or a topology-independent global container.

With reference to the thirteenth possible implementation manner of the first aspect, in a fourteenth possible implementation manner, the FIB further includes a forwarding entry of the topology-dependent container, for routing based on the topology-dependent container, and the forwarding entry of the topology-dependent container is used, so that a route of a lower-level container of a home container of the local node is used as an internal route of the local node and does not flood out of the home container of the local node; where, the topology-dependent container is a container forming a topological relationship with other containers, where the topological relationship includes: one upper-level container including one or more lower-level containers, and/or one lower-level container being included by one or more upper-level containers.

With reference to the fourteenth possible implementation manner of the first aspect, in a fifteenth possible implementation manner, the forwarding entry of the topology-dependent container includes a container identifier of the lower-level container relative to the home container of the local node and a second port corresponding to the container identifier of the lower-level container, where the second port is a port connecting the local node to the lower-level container; and the using the forwarding entry of the topology-dependent container, so that a route of a lower-level container of a home container of the local node is used as an internal route of the local node and does not flood out of the home container of the local node, includes: using the container identifier of the lower-level container and the second port corresponding to the container identifier of the lower-level container in the forwarding entry of the topology-dependent container, so that the route of the lower-level container of the home container of the local node is used as an internal route of the local node and does not flood out of the home container of the local node.

With reference to the fourteenth or fifteenth possible implementation manner of the first aspect, in a sixteenth possible implementation manner, a container identifier corresponding to the topology-dependent container is capable of reflecting a level of the topology-dependent container, thereby indicating the topological relationship formed between the topology-dependent container and other containers.

With reference to any one possible implementation manner of the thirteenth to sixteenth possible implementation manners of the first aspect, in a seventeenth possible implementation manner, the FIB further includes a forwarding entry of a topology-independent small container, where the forwarding entry of the topology-independent small container includes a container identifier of the topology-independent small container and a third port corresponding to the container identifier of the topology-independent small container, where the third port is a port connecting the local node to a next-hop routing node of the topology-independent small container.

In a second aspect, an embodiment of the present disclosure provides a method for processing a content request, where the method includes: receiving a content request packet, where the content request packet carries a content name of requested content and container information of the requested content, where the container information of the requested content includes a container identifier used to identify a container that stores the requested content, where the container includes at least one routing node, where the requested content is capable of being routed in the container through one or more routing nodes in the at least one routing node, or the requested content is capable of being routed through the container; and determining a forwarding route for the content request packet according to the content name of the requested content and the container information of the requested content.

With reference to the second aspect, in a first possible implementation manner, the container is a storage space used to store a group of content.

With reference to the second aspect or the first possible implementation manner of the second aspect, in a second possible implementation manner, the content name of the requested content corresponds to one or more home containers, where a home container of the requested content is a container that is capable of directly routing the requested content.

With reference to the second aspect or the first or second possible implementation manner of the second aspect, in a third possible implementation manner, the container is an access container of one or more first other containers; and/or one or more second other containers are access containers of the container; where, the access container is a container including another container in a topological relationship and having a forwarding entry for routing the content request packet to the another container.

With reference to the second aspect or any one possible implementation manner of the first to third possible implementation manners of the second aspect, in a fourth possible implementation manner, the determining a forwarding route for the content request packet according to the content name of the requested content and the container information of the requested content includes: determining whether any forwarding entry that matches the content name of the requested content exists in a forwarding information base FIB; determining whether any forwarding entry that matches the container identifier in the container information of the requested content exists in the FIB when no forwarding entry that matches the content name of the requested content exists in the FIB, where a forwarding entry in the FIB includes a preset container identifier and a port corresponding to the preset container identifier; and when a forwarding entry that matches the container identifier in the container information of the requested content exists in the FIB, sending the content request packet according to a port in the matched forwarding entry.

With reference to the second aspect or any one possible implementation manner of the first to fourth possible implementation manners of the second aspect, in a fifth possible implementation manner, a tree with the content name of the requested content as a root node is formed by the content name of the requested content and the container information of the requested content, where a child node of the root node represents container information of the home container of the requested content, and a container corresponding to container information represented by a first node is an access container of a container corresponding to container information represented by a parent node of the first node, where the first node is a node in the tree other than the root node and the child node of the root node.

With reference to the second aspect or any one possible implementation manner of the first to fourth possible implementation manners of the second aspect, in a sixth possible implementation manner, a directed acyclic graph with the content name of the requested content as an entrance vertex is formed by the content name of the requested content and the container information of the requested content, where an endpoint of a directed edge originated from the entrance vertex represents container information of the home container of the requested content, and a container corresponding to container information represented by a second vertex in the directed acyclic graph is an access container of a container corresponding to container information represented by a first vertex, where the first vertex is a vertex in the directed acyclic graph other than the entrance vertex, and the second vertex is an endpoint of a directed edge originated from the first vertex.

In a third aspect, an embodiment of the present disclosure provides a method for establishing a routing table, where the method includes: generating a routing table of a local node, so that a forwarding information base FIB is generated according to the routing table, where the routing table includes a routing entry of a global container, where the routing entry of the global container includes a container identifier of the global container and a first port corresponding to the container identifier of the global container, where the first port is a port connecting the local node to a next-hop routing node of the global container, the global container is a container capable of global routing, and the global container includes a topology-dependent global container and/or a topology-independent global container.

With reference to the third aspect, in a first possible implementation manner, when the local node receives a content request packet, the FIB table is used to match a content name of requested content and a container identifier in container information which are carried in the content request packet with forwarding entries in the FIB to determine a forwarding route for the content request packet.

With reference to the third aspect or the first possible implementation manner of the third aspect, in a second possible implementation manner, the routing table further includes a routing entry of the topology-dependent container, for routing based on the topology-dependent container, and the routing entry of the topology-dependent container is used, so that a route of a lower-level container of a home container of the local node is used as an internal route of the local node and does not flood out of the home container of the local node; where, the topology-dependent container is a container forming a topological relationship with other containers, where the topological relationship includes: one upper-level container including one or more lower-level containers, and/or one lower-level container being included by one or more upper-level containers.

With reference to the second possible implementation manner of the third aspect, in a third possible implementation manner, the routing entry of the topology-dependent container includes a lower-level container identifier of the lower-level container relative to the home container of the local node and a second port corresponding to the lower-level container identifier, where the second port is a port connecting the local node to the lower-level container; and the using the routing entry of the topology-dependent container, so that a route of a lower-level container of a home container of the local node is used as an internal route of the local node and does not flood out of the home container of the local node, includes: using the lower-level container identifier and the second port corresponding to the lower-level container identifier in the routing entry of the topology-dependent container, so that the route of the lower-level container of the home container of the local node is used as an internal route of the local node and does not flood out of the home container of the local node.

With reference to the second or third possible implementation manner of the third aspect, in a fourth possible implementation manner, a container identifier corresponding to the topology-dependent container is capable of reflecting a level of the topology-dependent container, thereby indicating the topological relationship between the topology-dependent container and other containers.

With reference to the third aspect or any one possible implementation manner of the first to fourth possible implementation manners of the third aspect, in a fifth possible implementation manner, the routing table further includes a routing entry of a topology-independent small container, where the routing entry of the topology-independent small container includes a container identifier of the topology-independent small container and a third port corresponding to the container identifier of the topology-independent small container, where the third port is a port connecting the local node to a next-hop routing node of the topology-independent small container.

In a fourth aspect, an embodiment of the present disclosure provides a method for acquiring content, where the method includes: generating a content request packet, where the content request packet carries a content name of requested content and container information of the requested content, where the container information of the requested content includes a container identifier used to identify a container that stores the requested content; and sending the content request packet to a network device, so that the network device determines a forwarding route for the content request packet according to the content name of the requested content and the container information of the requested content.

With reference to the fourth aspect, in a first possible implementation manner, the container includes at least one routing node, where the requested content is capable of being routed in the container through one or more routing nodes in the at least one routing node, or the requested content is capable of being routed through the container.

With reference to the fourth aspect, in a second possible implementation manner, the content name of the requested content corresponds to one or more home containers, where a home container of the requested content is a container that is capable of directly routing the requested content.

With reference to the fourth aspect or the first or second possible implementation manner of the fourth aspect, in a third possible implementation manner, the container information further includes a resolution identifier corresponding to the container identifier, where the resolution identifier is used to identify whether the container corresponding to the container identifier is resolvable.

With reference to the fourth aspect or any one possible implementation manner of the first to third possible implementation manners of the fourth aspect, in a fourth possible implementation manner, before the generating a content request packet, the method further includes: acquiring the container information of the requested content; and the generating a content request packet includes: generating the content request packet according to the acquired container information of the requested content.

With reference to the fourth possible implementation manner of the fourth aspect, in a fifth possible implementation manner, the method further includes: determining, according to the container information of the requested content, an access container of the container corresponding to the container information of the requested content, and adding container information of the access container to the container information of the requested content; where the generating a content request packet includes: generating the content request packet according to the container information of the requested content after the container information of the access container is added.

With reference to the fourth possible implementation manner of the fourth aspect, in a sixth possible implementation manner, the method further includes: determining, according to the container information of the requested content, access containers of all resolvable containers of the requested content, and adding container information of the access containers of all the resolvable containers to the container information of the requested content; where the generating a content request packet includes: generating the content request packet according to the container information of the requested content after the container information of the access containers of all the resolvable containers is added.

In a fifth aspect, an embodiment of the present disclosure provides a method for publishing content, where the method includes: determining a container set of content and container information of each container in the container set, where the container set includes at least one container that stores the content; and publishing the content and information about the content, where the information about the content includes a content name of the content and the container information of each container in the container set, so that a user equipment generates a content request packet according to the information about the content and sends the content request packet to a network device and that a routing node determines a forwarding route for the content request packet according to the information about the content carried in the content request packet.

With reference to the fifth aspect, in a first possible implementation manner, the container includes at least one routing node, where the requested content is capable of being routed in the container through one or more routing nodes in the at least one routing node, or the requested content is capable of being routed through the container.

With reference to the fifth aspect, in a second possible implementation manner, the content name of the content corresponds to one or more home containers, where a home container of the content is a container that can directly route the content.

With reference to the fifth aspect or the first or second possible implementation manner of the fifth aspect, in a third possible implementation manner, the method further includes: registering the at least one container in the container set and an access container of the at least one container with a resolution system, so that a user or routing node acquires the access container of the at least one container by querying the resolution system.

With reference to the third possible implementation manner of the fifth aspect, in a fourth possible implementation manner, the container information includes a container identifier and a resolution identifier, where the resolution identifier is used to identify whether a container is resolvable.

In a sixth aspect, an embodiment of the present disclosure provides a router, where the router includes: a receiving module, configured to receive a content request packet, where the content request packet carries a content name of requested content and container information of the requested content, where the container information of the requested content includes a container identifier used to identify a container that stores the requested content; a first determining module, configured to determine whether any forwarding entry that matches the content name of the requested content which is carried in the content request packet received by the receiving module exists in a forwarding information base FIB; a second determining module, configured to: when the first determining module determines that no forwarding entry that matches the content name of the requested content exists in the FIB, determine whether any forwarding entry that matches the container identifier in the container information of the requested content exists in the FIB, where a forwarding entry in the FIB includes a preset container identifier and a port corresponding to the preset container identifier; and a sending module, configured to: when the second determining module determines that a forwarding entry that matches the container identifier in the container information of the requested content exists in the FIB, send the content request packet according to a port in the matched forwarding entry.

With reference to the sixth aspect, in a first possible implementation manner, the container is a storage space used to store a group of content.

With reference to the sixth aspect or the first possible implementation manner of the sixth aspect, in a second possible implementation manner, the container includes at least one routing node, where the requested content is capable of being routed in the container through one or more routing nodes in the at least one routing node, or the requested content is capable of being routed through the container.

With reference to the sixth aspect or the first possible implementation manner of the sixth aspect, in a third possible implementation manner, the content name of the requested content corresponds to one or more home containers, where a home container of the requested content is a container that is capable of directly routing the requested content.

With reference to the sixth aspect or any one possible implementation manner of the first to third possible implementation manners of the sixth aspect, in a fourth possible implementation manner, the container is an access container of one or more first other containers; and/or one or more second other containers are access containers of the container; where, the access container is a container including another container in a topological relationship and having a forwarding entry for routing the content request packet to the another container.

With reference to the sixth aspect or any one possible implementation manner of the first to fourth possible implementation manners of the sixth aspect, in a fifth possible implementation manner, the container information further includes a resolution identifier corresponding to the container identifier, where the resolution identifier is used to identify whether the container corresponding to the container identifier is resolvable; and the second determining module includes: a first resolving unit, configured to acquire, by resolution according to the resolution identifier, container identifiers of access containers of all resolvable containers of the requested content; and a first determining unit, specifically configured to match the container identifier in the container information of the requested content and the container identifiers of the access containers of all the resolvable containers of the requested content which are acquired by resolution by the first resolving unit with the preset container identifiers in the FIB to determine whether any forwarding entry that matches the container identifier in the container information of the requested content and the container identifier of the access container exists in the FIB.

With reference to the fifth possible implementation manner of the sixth aspect, in a sixth possible implementation manner, the router further includes: a first adding module, configured to add container information, which is acquired by resolution by the first resolving unit, of the access containers of all the resolvable containers of the requested content, to the container information of the requested content.

With reference to the sixth aspect or any one possible implementation manner of the first to fourth possible implementation manners of the sixth aspect, in a seventh possible implementation manner, the container information further includes a resolution identifier corresponding to the container identifier, where the resolution identifier is used to identify whether the container corresponding to the container identifier is resolvable; the router further includes: a first resolving module, configured to: when the second determining module determines that no forwarding entry that matches the container identifier in the container information of the requested content exists in the FIB, acquire, by resolution according to the resolution identifier, a container identifier of an access container of the container; and the second determining module is further configured to match the container identifier of the access container which is acquired by resolution by the first resolving module, with the preset container identifiers in the FIB to determine whether any forwarding entry that matches the container identifier of the access container which is acquired by resolution exists in the FIB.

With reference to the seventh possible implementation manner of the sixth aspect, in an eighth possible implementation manner, the router further includes: a second adding module, configured to add container information of the access container which is acquired by resolution by the first resolving module, to the container information of the requested content.

With reference to the sixth aspect or any one possible implementation manner of the first to eighth possible implementation manners of the sixth aspect, in a ninth possible implementation manner, the forwarding entries in the FIB include content name prefixes and ports corresponding to the content name prefixes; the first determining module is specifically configured to determine, according to whether a prefix of the content name of the requested content matches any content name prefix in the forwarding entries in the FIB, whether any forwarding entry that matches the content name of the requested content exists in the FIB; and the sending module is further configured to: when the first determining module determines that a forwarding entry that matches the content name of the requested content exists in the FIB, send the content request packet according to a port in the matched forwarding entry.

With reference to the sixth aspect or any one possible implementation manner of the first to ninth possible implementation manners of the sixth aspect, in a tenth possible implementation manner, the router further includes: a third determining module, configured to: before the first determining module determines whether any forwarding entry that matches the content name of the requested content exists in the FIB, determine whether any content that matches the content name of the requested content exists in a content store table CS; where the sending module is further configured to: when the third determining module determines that content that matches the content name of the requested content exists in the CS, send the matched content to a sender of the content request packet; and the first determining module is further configured to: when the third determining module determines that no content that matches the content name of the requested content exists in the CS, perform the step of determining whether any forwarding entry that matches the content name of the requested content exists in the FIB.

With reference to the tenth possible implementation manner of the sixth aspect, in an eleventh possible implementation manner, the router further includes: a fourth determining module, configured to: when the third determining module determines that no content that matches the content name of the requested content exists in the CS, determine whether any PIT entry that matches the content name of the requested content exists in a pending information table PIT; and an updating module, configured to: when the fourth determining module determines that a PIT entry that matches the content name of the requested content exists in the PIT, add a port corresponding to the sender of the content request packet to the matched PIT entry; where the first determining module is further configured to: when the fourth determining module determines that no PIT entry that matches the content name of the requested content exists in the PIT, perform the step of determining whether any forwarding entry that matches the content name of the requested content exists in the FIB.

With reference to the sixth aspect or any one possible implementation manner of the first to eleventh possible implementation manners of the sixth aspect, in a twelfth possible implementation manner, the sending module is further configured to send the content request packet according to a default port when no forwarding entry that matches the container identifier in the container information of the requested content exists in the FIB; or the router further includes a discarding module configured to discard the content request packet when no forwarding entry that matches the container identifier in the container information of the requested content exists in the FIB.

With reference to the sixth aspect or any one possible implementation manner of the first to twelfth possible implementation manners of the sixth aspect, in a thirteenth possible implementation manner, the FIB includes a forwarding entry of a global container, where the forwarding entry of the global container includes a container identifier of the global container and a first port corresponding to the container identifier of the global container, where the first port is a port connecting a local node to a next-hop routing node of the global container, the global container is a container capable of global routing, and the global container includes a topology-dependent global container and/or a topology-independent global container.

With reference to the thirteenth possible implementation manner of the sixth aspect, in a fourteenth possible implementation manner, the FIB further includes a forwarding entry of the topology-dependent container, for routing based on the topology-dependent container, and the forwarding entry of the topology-dependent container is used, so that a route of a lower-level container of a home container of the local node is used as an internal route of the local node and does not flood out of the home container of the local node; where, the topology-dependent container is a container forming a topological relationship with other containers, where the topological relationship includes: one upper-level container including one or more lower-level containers, and/or one lower-level container being included by one or more upper-level containers.

With reference to the fourteenth possible implementation manner of the sixth aspect, in a fifteenth possible implementation manner, the forwarding entry of the topology-dependent container includes a container identifier of the lower-level container relative to the home container of the local node and a second port corresponding to the container identifier of the lower-level container, where the second port is a port connecting the local node to the lower-level container; and the using the forwarding entry of the topology-dependent container, so that a route of a lower-level container of a home container of the local node is used as an internal route of the local node and does not flood out of the home container of the local node, includes: using the container identifier of the lower-level container and the second port corresponding to the container identifier of the lower-level container in the forwarding entry of the topology-dependent container, so that the route of the lower-level container of the home container of the local node is used as an internal route of the local node and does not flood out of the home container of the local node.

With reference to the fourteenth or fifteenth possible implementation manner of the sixth aspect, in a sixteenth possible implementation manner, a container identifier corresponding to the topology-dependent container is capable of reflecting a level of the topology-dependent container, thereby indicating the topological relationship formed between the topology-dependent container and other containers.

With reference to any one possible implementation manner of the thirteenth to sixteenth possible implementation manners of the sixth aspect, in a seventeenth possible implementation manner, the FIB further includes a forwarding entry of a topology-independent small container, where the forwarding entry of the topology-independent small container includes a container identifier of the topology-independent small container and a third port corresponding to the container identifier of the topology-independent small container, where the third port is a port connecting the local node to a next-hop routing node of the topology-independent small container.

In a seventh aspect, an embodiment of the present disclosure provides a router, where the router includes: a receiving module, configured to receive a content request packet, where the content request packet carries a content name of requested content and container information of the requested content, where the container information of the requested content includes a container identifier used to identify a container that stores the requested content, where the container includes at least one routing node, where the requested content is capable of being routed in the container through one or more routing nodes in the at least one routing node, or the requested content is capable of being routed through the container; and a determining module, configured to determine a forwarding route for the content request packet according to the content name of the requested content and the container information of the requested content which are carried in the content request packet received by the receiving module.

With reference to the seventh aspect, in a first possible implementation manner, the container is a storage space used to store a group of content.

With reference to the seventh aspect or the first possible implementation manner of the seventh aspect, in a second possible implementation manner, the content name of the requested content corresponds to one or more home containers, where a home container of the requested content is a container that is capable of directly routing the requested content.

With reference to the seventh aspect or the first or second possible implementation manner of the seventh aspect, in a third possible implementation manner, the container is an access container of one or more first other containers; and/or one or more second other containers are access containers of the container; where, the access container is a container including another container in a topological relationship and having a forwarding entry for routing the content request packet to the another container.

With reference to the seventh aspect or any one possible implementation manner of the first to third possible implementation manners of the seventh aspect, in a fourth possible implementation manner, the determining module includes: a first determining unit, configured to determine whether any forwarding entry that matches the content name of the requested content exists in a forwarding information base FIB; a second determining unit, configured to: when the first determining unit determines that no forwarding entry that matches the content name of the requested content exists in the FIB, determine whether any forwarding entry that matches the container identifier in the container information of the requested content exists in the FIB, where a forwarding entry in the FIB includes a preset container identifier and a port corresponding to the preset container identifier; and a sending unit, configured to: when the second determining unit determines that a forwarding entry that matches the container identifier in the container information of the requested content exists in the FIB, send the content request packet according to a port in the matched forwarding entry.

With reference to the seventh aspect or any one possible implementation manner of the first to fourth possible implementation manners of the seventh aspect, in a fifth possible implementation manner, a tree with the content name of the requested content as a root node is formed by the content name of the requested content and the container information of the requested content, where a child node of the root node represents container information of the home container of the requested content, and a container corresponding to container information represented by a first node is an access container of a container corresponding to container information represented by a parent node of the first node, where the first node is a node in the tree other than the root node and the child node of the root node.

With reference to the seventh aspect or any one possible implementation manner of the first to fourth possible implementation manners of the seventh aspect, in a sixth possible implementation manner, a directed acyclic graph with the content name of the requested content as an entrance vertex is formed by the content name of the requested content and the container information of the requested content, where an endpoint of a directed edge originated from the entrance vertex represents container information of the home container of the requested content, and a container corresponding to container information represented by a second vertex in the directed acyclic graph is an access container of a container corresponding to container information represented by a first vertex, where the first vertex is a vertex in the directed acyclic graph other than the entrance vertex, and the second vertex is an endpoint of a directed edge originated from the first vertex.

In an eighth aspect, an embodiment of the present disclosure provides an apparatus for establishing a routing table, where the apparatus includes: a generating module, configured to generate a routing table of a local node, so that a forwarding information base FIB is generated according to the routing table, where the routing table includes a routing entry of a global container, where the routing entry of the global container includes a container identifier of the global container and a first port corresponding to the container identifier of the global container, where the first port is a port connecting the local node to a next-hop routing node of the global container, the global container is a container capable of global routing, and the global container includes a topology-dependent global container and/or a topology-independent global container; and a storing module, configured to store the routing table generated by the generating module.

With reference to the eighth aspect, in a first possible implementation manner, when the local node receives a content request packet, the FIB table is used to match a content name of requested content and a container identifier in container information which are carried in the content request packet with forwarding entries in the FIB to determine a forwarding route for the content request packet.

With reference to the eighth aspect or the first possible implementation manner of the eighth aspect, in a second possible implementation manner, the routing table further includes a routing entry of the topology-dependent container, for routing based on the topology-dependent container, and the routing entry of the topology-dependent container is used, so that a route of a lower-level container of a home container of the local node is used as an internal route of the local node and does not flood out of the home container of the local node; where, the topology-dependent container is a container forming a topological relationship with other containers, where the topological relationship includes: one upper-level container including one or more lower-level containers, and/or one lower-level container being included by one or more upper-level containers.

With reference to the second possible implementation manner of the eighth aspect, in a third possible implementation manner, the routing entry of the topology-dependent container includes a lower-level container identifier of the lower-level container relative to the home container of the local node and a second port corresponding to the lower-level container identifier, where the second port is a port connecting the local node to the lower-level container; and the using the routing entry of the topology-dependent container, so that a route of a lower-level container of a home container of the local node is used as an internal route of the local node and does not flood out of the home container of the local node, includes: using the lower-level container identifier and the second port corresponding to the lower-level container identifier in the routing entry of the topology-dependent container, so that the route of the lower-level container of the home container of the local node is used as an internal route of the local node and does not flood out of the home container of the local node.

With reference to the second or third possible implementation manner of the eighth aspect, in a fourth possible implementation manner, a container identifier corresponding to the topology-dependent container is capable of reflecting a level of the topology-dependent container, thereby indicating the topological relationship between the topology-dependent container and other containers.

With reference to the eighth aspect or any one possible implementation manner of the first to fourth possible implementation manners of the eighth aspect, in a fifth possible implementation manner, the routing table further includes a routing entry of a topology-independent small container, where the routing entry of the topology-independent small container includes a container identifier of the topology-independent small container and a third port corresponding to the container identifier of the topology-independent small container, where the third port is a port connecting the local node to a next-hop routing node of the topology-independent small container.

In a ninth aspect, an embodiment of the present disclosure provides a user equipment, where the user equipment includes: a generating module, configured to generate a content request packet, where the content request packet carries a content name of requested content and container information of the requested content, where the container information of the requested content includes a container identifier used to identify a container that stores the requested content; and a sending module, configured to send the content request packet generated by the generating module to a network device, so that the network device determines a forwarding route for the content request packet according to the content name of the requested content and the container information of the requested content.

With reference to the ninth aspect, in a first possible implementation manner, the container includes at least one routing node, where the requested content is capable of being routed in the container through one or more routing nodes in the at least one routing node, or the requested content is capable of being routed through the container.

With reference to the ninth aspect, in a second possible implementation manner, the content name of the requested content corresponds to one or more home containers, where a home container of the requested content is a container that is capable of directly routing the requested content.

With reference to the ninth aspect or the first or second possible implementation manner of the ninth aspect, in a third possible implementation manner, the container information further includes a resolution identifier corresponding to the container identifier, where the resolution identifier is used to identify whether the container corresponding to the container identifier is resolvable.

With reference to the ninth aspect or any one possible implementation manner of the first to third possible implementation manners of the ninth aspect, in a fourth possible implementation manner, the user equipment further includes: an acquiring module, configured to acquire the container information of the requested content before the generating module generates the content request packet; where the generating module is specifically configured to generate the content request packet according to the container information of the requested content which is acquired by the acquiring module.

With reference to the fourth possible implementation manner of the ninth aspect, in a fifth possible implementation manner, the user equipment further includes: a first determining module, configured to determine an access container of the container according to the container information of the requested content which is acquired by the acquiring module; and a first updating module, configured to add container information of the access container which is determined by the first determining module, to the container information of the requested content; where the generating module is specifically configured to generate the content request packet according to the container information of the requested content updated by the first updating module.

With reference to the fourth possible implementation manner of the ninth aspect, in a sixth possible implementation manner, the user equipment further includes: a second determining module, configured to determine, according to the container information of the requested content which is acquired by the acquiring module, access containers of all resolvable containers of the requested content; and a second updating module, configured to add container information of the access containers of all the resolvable containers which are determined by the second determining module, to the container information of the requested content; where the generating module is specifically configured to generate the content request packet according to the container information of the requested content updated by the second updating module.

In a tenth aspect, an embodiment of the present disclosure provides an apparatus for publishing content, where the apparatus includes: a determining module, configured to determine a container set of content and container information of each container in the container set, where the container set includes at least one container that stores the content; and a publishing module, configured to publish the content and information about the content, where the information about the content includes a content name of the content and the container information of each container in the container set determined by the determining module, so that a user generates a content request packet according to the information about the content and sends the content request packet to a network device and that a routing node determines a forwarding route for the content request packet according to the information about the content carried in the content request packet.

With reference to the tenth aspect, in a first possible implementation manner, the container includes at least one routing node, where the requested content is capable of being routed in the container through one or more routing nodes in the at least one routing node, or the requested content is capable of being routed through the container.

With reference to the tenth aspect, in a second possible implementation manner, the content name of the content corresponds to one or more home containers, where a home container of the content is a container that can directly route the content.

With reference to the tenth aspect or the first or second possible implementation manner of the tenth aspect, in a third possible implementation manner, the apparatus further includes: a registering module, configured to register the at least one container in the container set and an access container of the at least one container with a resolution system, so that a user or routing node acquires the access container of the at least one container by querying the resolution system.

With reference to the third possible implementation manner of the tenth aspect, in a fourth possible implementation manner, the container information includes a container identifier and a resolution identifier, where the resolution identifier is used to identify whether a container is resolvable.

Based on the above technical solutions, according to the method for routing and forwarding, the method for processing a content request, the method for establishing a routing table, the method for acquiring content, and the method for publishing content, the router, the apparatus for establishing a routing table, the user equipment, and the apparatus for publishing content in the embodiments of the present disclosure, container information of content is added on the basis of a content name to extend attributes of content in an ICN system, so that routing and forwarding are less dependent upon the content name. Therefore, routing entries in a routing table may be reduced, and it is possible to solve routing scalability and mobility problems and the like that are caused by the content name.

BRIEF DESCRIPTION OF DRAWINGS

To illustrate the technical solutions in the embodiments of the present disclosure more clearly, the following briefly introduces the accompanying drawings required for describing the embodiments or the prior art.

FIG. 12 is a schematic diagram of a network architecture according to an embodiment of the present disclosure;

FIG. 13 is a schematic flowchart of a method for processing a content request according to an embodiment of the present disclosure;

DESCRIPTION OF EMBODIMENTS

The following clearly describes the technical solutions in the embodiments of the present disclosure with reference to the accompanying drawings in the embodiments of the present disclosure. Apparently, the described embodiments are merely a part rather than all of the embodiments of the present disclosure.

It should be understood that, in the embodiments of the present disclosure, a user equipment (User Equipment, "UE" for short) may be referred to as a terminal (Terminal), a mobile station (Mobile Station, "MS" for short), a mobile terminal (Mobile Terminal), and so on. The user equipment may communicate with one or more core networks through a radio access network (Radio Access Network, "RAN" for short). For example, the user equipment may be a mobile phone (or called a "cellular" phone) or a computer equipped with a mobile terminal, such as a portable, pocket-sized, handheld, computer-embedded, or vehicle-mounted mobile apparatus, which exchanges voices and/or data with the radio access network. It should also be understood that, the technical solutions in the embodiments of the present disclosure are applicable to various information centric network systems.

Figure 1:
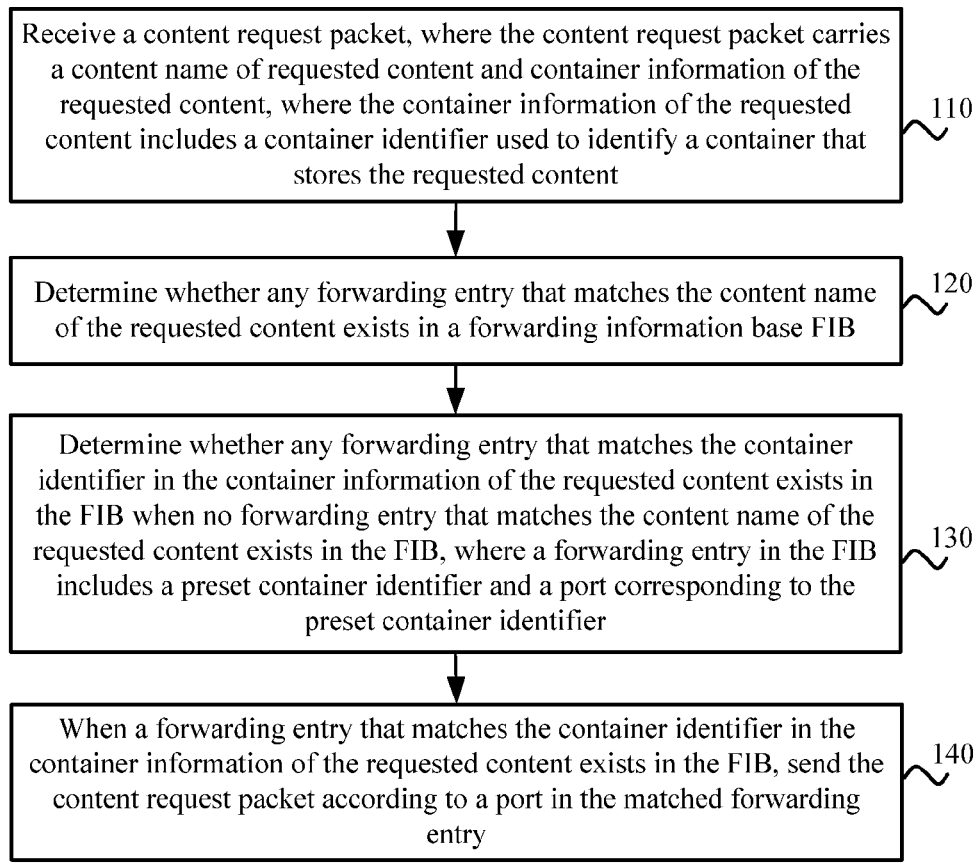
FIG. 1 is a schematic flowchart of a method for routing and forwarding according to an embodiment of the present disclosure.

FIG. 1 is a schematic flowchart of a method 100 for routing and forwarding according to an embodiment of the present disclosure. The method in FIG. 1 may be performed by a routing node. For ease of description, the routing node performing the method 100 is hereinafter referred to as a local node. As shown in FIG. 1, the method 100 includes the following:

S110. Receive a content request packet, where the content request packet carries a content name of requested content and container information of the requested content, where the container information of the requested content includes a container identifier used to identify a container that stores the requested content.

S120. Determine whether any forwarding entry that matches the content name of the requested content exists in a forwarding information base FIB.

S130. Determine whether any forwarding entry that matches the container identifier in the container information of the requested content exists in the FIB when no forwarding entry that matches the content name of the requested content exists in the FIB, where a forwarding entry in the FIB includes a preset container identifier and a port corresponding to the preset container identifier.

S140. When a forwarding entry that matches the container identifier in the container information of the requested content exists in the FIB, send the content request packet according to a port in the matched forwarding entry.

Therefore, according to the method for routing and forwarding in the embodiment of the present disclosure, container information of content is added on the basis of a content name to extend attributes of content in an ICN system, so that routing and forwarding are less dependent upon the content name. Therefore, routing entries in a routing table may be reduced, and it is possible to solve routing scalability and mobility problems and the like that are caused by the content name.

In the embodiment of the present disclosure, the container is a storage space used to store a group of content, where the group of content may be one or more pieces of content. For example, the whole network of a country may be considered as a country-level container, where the container is a storage space of all content within the network of the country. Similarly, the whole network of a province may be considered as a province-level container, where the province-level container is a storage space of all content within the network of the province. In addition, the whole network of a company or an organization may also be considered as a storage space of all content within the network of the company or organization. A network covering mobile devices, such as an airplane, a train, or a ship, may be considered as a storage space of all content within the network covering the mobile devices. A network covering a mobile phone, a host, or other electronic devices storing content may also be considered as a storage space of all content within the network, which is not limited by the embodiment of the present disclosure. Correspondingly, a container identifier of a container may be any content identifier prefix, for example, fanlingyuan.com/blog, or may also be a company or an organization, for example, huawei.com, tsinghua.edu, or may also be a mobile network, for example, an airplane, a train, or a ship, such as airchina/ca1314, or may also be a mobile phone, a host, or other electronic devices storing content, for example, chinamobile/fanlingyuan, and may also be a network domain, for example, cn, cn/gd, and cn/sd. One container may correspond to one container identifier, or may also correspond to more than one container identifier, which is not limited by the embodiment of the present disclosure. However, for ease of description, in the following description, it is assumed that containers correspond to container identifiers on a one-to-one basis, and that a container identifier is used to represent a container.

In addition, a container may include another container in a topological relationship, for example, a province-level network is a part of a country-level network. Therefore, it may be considered that the country-level container includes the province-level container in a topological relationship. The container may further include an access container, where, the access container is a container including another container in a topological relationship and having a forwarding entry for routing the content request packet to the another container. That is to say, the access container of a particular container is a container including particular container in a topological relationship and having a forwarding entry for routing the content request packet to the particular container. Specifically, when container B includes container A, and a forwarding entry for routing the content request packet to container A exists in container B, container B is defined as an access container of container A, and container B provides an access service for container A. One container may provide an access service for one or more other containers, and one or more other containers may provide an access service for a same container. In other words, one container may be an access container of one or more other containers, and one or more other containers may be access containers of a same container.

In a network architecture, a container includes at least one routing node, where one or more routing nodes in the at least one routing node are responsible for forwarding of a content request packet, and the container is referred to as a home container of the at least one routing node. The content request packet can be routed to the container through the one or more routing nodes in the at least one routing node included in the access container of the container. For example, a country-level container "cn" includes province-level containers "cn/gd" and "cn/sd", and the content request packet can be routed to the province-level containers "cn/gd" and "cn/sd" and so on through one or more routing nodes included in the country-level container "cn". Therefore, the country-level container "cn" provides an access service for the province-level containers "cn/gd" and "cn/sd" and so on. Containers "huawei.com/cn" and "huawei.com/us" include a container "huawei.com" in a topological relationship, and the content request packet can be routed to the container "huawei.com" through one or more routing nodes included in the containers "huawei.com/cn" and "huawei.com/us". Therefore, the containers "huawei.com/cn" and "huawei.com/us" provide an access service for the container "huawei.com". However, the embodiment of the present disclosure is not limited to this.

In step S110, the content request packet received by the local node may be sent by other routing nodes or sent by a user equipment, which is not limited by the embodiment of the present disclosure. Containers corresponding to the container identifiers included in the container information of the requested content which is carried in the content request packet constitute a container set of the requested content, where the container set may include one or more containers. Optionally, the one or more containers in the container set are access containers of one or more first other containers; and/or one or more second other containers are access containers of the container. Herein, the "first other containers" and the "second other containers" may be containers in the container set, or may also be other containers out of the container set.

Specifically, the container set may include a home container of the requested content, where the home container of the requested content is a container that is capable of directly routing the requested content. A forwarding entry corresponding to the content name of the requested content exists in the home container of the requested content, and the content name of the requested content corresponds to the home container of the requested content. The requested content may have one or more home containers. Correspondingly, the content name of the requested content may correspond to one or more home containers, where the requested content can be routed in the home container corresponding to the content name of the requested content.

The access container of the home container of the requested content may also be considered as a container that stores the requested content, where the requested content can be routed indirectly through the access container of the home container. Optionally, in step S110, the container set may further include the access container of the home container of the requested content, or further include an access container of the access container. Through the access container of the home container or through one or more routing nodes included in the access container of the access container, the requested content can be routed through the access container. For example, a home container of content "fanlingyuan.com/myson/2012/June01/happy.jpg" is "chinamobile/fanlingyuan", while an access container of the container "chinamobile/fanlingyuan" is "cloudsrv.com". In this case, the content can be routed to the container "chinamobile/fanlingyuan" through one or more routing nodes included in the container "cloudsrv.com" and can be routed in the container "chinamobile/fanlingyuan" through one or more routing nodes included in the container "chinamobile/fanlingyuan". Similarly, from the perspective of the container, the content stored by the container includes content that can be routed directly in the container and includes content that can be routed indirectly through the container. Optionally, the container set may further include all containers that store the content, which is not limited by the embodiment of the present disclosure.

However, locations of some containers, for example, an airplane or a ship, may change frequently. Correspondingly, access containers of the containers may also change accordingly. When the container set of the requested content includes the access containers of the containers, persistence of the container set cannot be ensured and mobility of content cannot be supported well. Therefore, when an access container of at least one container in the container set changes frequently, a content publisher may register correspondence between the at least one container and its access container with a resolution system. When the access container of the at least one container changes, the at least one container may notify the resolution system of the change. Therefore, the resolution system may update the correspondence between the at least one container and its access container in real time. Alternatively, the container set of the requested content which is carried in the content request packet may include only the at least one container but does not include the access container of the at least one container, so as to ensure persistence of the container set of the requested content. In addition, the content request packet may carry a resolution identifier of the at least one container, where the resolution identifier indicates that the at least one container is resolvable. Therefore, the user equipment or routing node may acquire the access container of the at least one container by querying, according to the resolution identifier, the resolution system and resolving the at least one container. Therefore, the content request packet can be always routed to the at least one container through the routing node in the access container of the at least one container, so that mobility of content is supported well. However, the embodiment of the present disclosure is not limited to this.

It should be understood that, in the embodiment of the present disclosure, the home container of the requested content, the access container of the home container, and the access container of the access container may all be considered as containers that store the requested content. However, only a container that includes a routing node is a home container of the routing node, but the access container of the container is not a home container of the routing node. For example, a container "cn/gd" includes routing nodes R12 and R13, and an access container "cn" of the container "cn/gd" includes routing nodes R1 and R2. When a home container of content is "cn/gd", containers "cn" and "cn/gd" are both containers that store the content, but home containers of routing nodes R12 and R13 are "cn/gd". However, the embodiment of the present disclosure is not limited to this.

In step S110, the container information of the requested content may carry a container identifier of each container in the container set. Optionally, the container information may further include a resolution identifier corresponding to the container identifier, where the resolution identifier is used to identify whether the container corresponding to the container identifier is resolvable. Specifically, the content request packet may carry a resolution identifier of a resolvable container, but the container of the resolution identifier is irresolvable by default. Optionally, the content request packet may also carry resolution identifiers of all containers, and use different resolution identifiers to indicate whether containers are resolvable or irresolvable. For example, a resolution identifier "resolvable=yes" indicates that the container is resolvable, but "resolvable=no" indicates that the container is irresolvable. However, the embodiment of the present disclosure is not limited to this.

Figure 2:
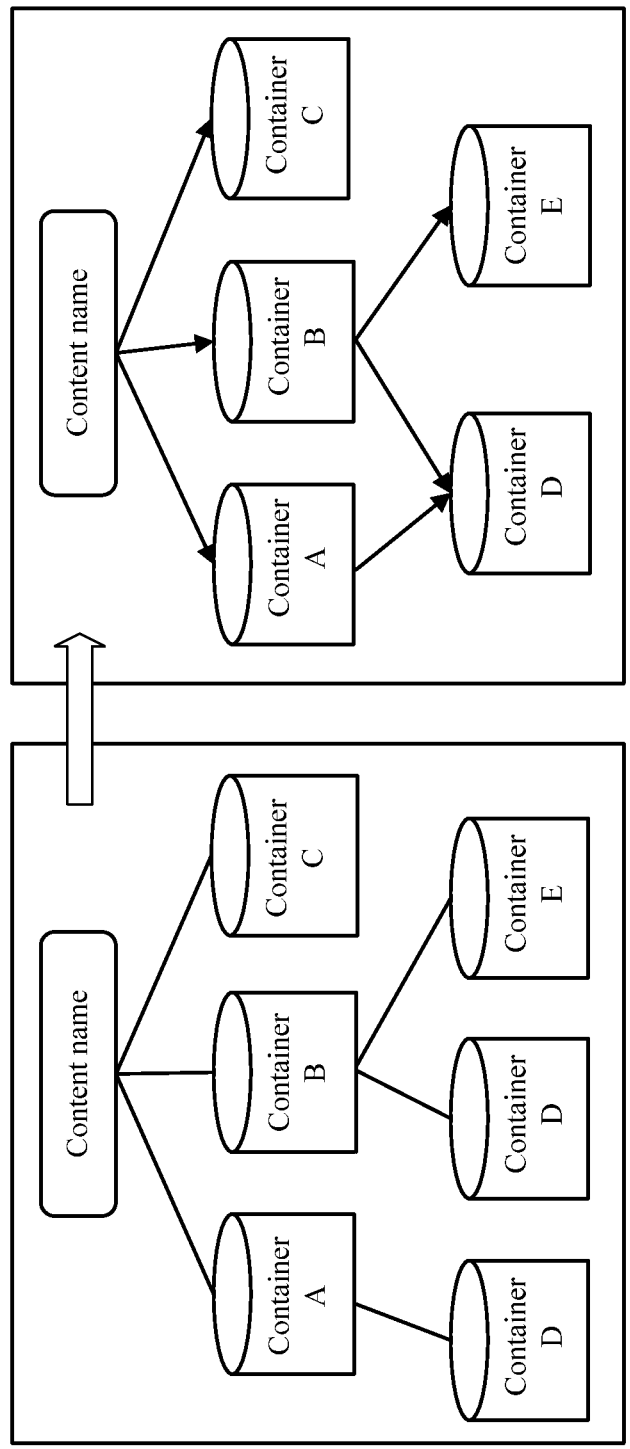
FIG. 2(a) is a schematic structural diagram of a tree formed by a content name and a container set according to an embodiment of the present disclosure.
FIG. 2(b) is a schematic structural diagram of a directed acyclic graph formed by a content name and a container set according to an embodiment of the present disclosure.

A relationship between the content name of the requested content and the container set of the requested content may be indicated by a tree. As shown in FIG. 2(a), the content name of the requested content is used as a root node of the tree, and containers in the container set of the requested content are used as child nodes of the root node, where a child node of the root node represents a home container of the requested content. A relationship between container X represented by any node in the tree and container Y represented by its child node is that container Y is an access container of container X. For example, in FIG. 2(a), container A, container B, and container C are home containers of the requested content. An access container of container A is container D, and access containers of container B are container D and container E. It should be noted that, two containers D appear in the tree structure because container D is an access container of both container A and container B.

Correspondingly, a relationship between the content name of the requested content and the container information of the requested content may also be represented by the above tree structure. Specifically, a tree with the content name of the requested content as a root node may be formed by the content name of the requested content and the container information of the requested content, where a child node of the root node represents container information of a home container of the requested content, and a container corresponding to container information represented by a first node is an access container of a container corresponding to container information represented by a parent node of the first node, where the first node is a node in the tree other than the root node and the child node of the root node.

As can be seen from FIG. 2(a), the tree representation method is simple and clear. However, when more than two containers have a same access container, the tree representation method may include duplicate nodes, for example, containers D in FIG. 2(a). When a large number of duplication nodes exist, the tree representation method is inefficient. Optionally, to avoid duplicate nodes, the relationship between the content name of the requested content and the container set of the requested content may also be represented by a directed acyclic graph. As shown in FIG. 2(b), the content name of the requested content is used as an entrance vertex of the directed acyclic graph, and the containers in the container set of the requested content are used as other vertexes of the directed acyclic graph, where endpoints of all directed edges originated from the entrance vertex represent home containers of the content, and containers represented by endpoints of directed edges originated from other vertexes in the directed acyclic graph than the entrance vertex are access containers of the containers represented by the start points of the directed edges. For example, endpoints of two directed edges originated from container B in FIG. 2(b) point to container D and container E, indicating that access containers of container B are container D and container E.

Correspondingly, the relationship between the content name of the requested content and the container information of the requested content may also be represented by a directed acyclic graph. Specifically, a directed acyclic graph with the content name of the requested content as an entrance vertex is formed by the content name of the requested content and the container information of the requested content, where an endpoint of a directed edge originated from the entrance vertex represents container information of the home container of the requested content, and a container corresponding to container information represented by a second vertex in the directed acyclic graph is an access container of a container corresponding to container information represented by a first vertex, where the first vertex is a vertex in the directed acyclic graph other than the entrance vertex, and the second vertex is an endpoint of a directed edge originated from the first vertex.

Optionally, other methods may be used to represent the relationship between the content name of the requested content and the container set of the requested content or the relationship between the content name of the requested content and the container information of the requested content. The embodiment of the present disclosure is not limited to this.

When the relationship between the content name of the requested content and the container information of the requested content is represented by a tree, in a content request packet, depth traversal of the tree is used to arrange the content name of the requested content and the container information of the requested content into a sequence, and any two nodes in the tree are separated by a separator, where a layer-n node and a previous node of the layer-n node are separated by an $(n-1)^{th}$ separator, where 1≤n≤m, where m is depth of the tree. Specifically, depth traversal of the tree may be used to arrange the content name of the requested content and the container information of the requested content into a sequence in { }, and "|" is used as a separator between nodes. The number of separators "|" between the root node and its child nodes is 1. The number of separators "|" also increases level by level with the increase of depth of the tree. For example, Name1={huawei.com/products/index.html-|huawei.com/cn|huawei.com/us|cn/gd} indicates that home containers of content "huawei.com/products/index.html" are "huawei.com/cn", "huawei.com/us" and "cn/gd", where the three containers are all child nodes of the content name. For another example, Name2={fanlingyuan.com/blog/2012/June01/main.html|hosting.com||cn/gd||cn/beijing||us/ca-|cloudsrv.com} indicates that home containers of content "fanlingyuan.com/blog/2012/June01/main.html" are "hosting.com" and "cloudsrv.com", where "hosting.com" has three data centers globally, which are respectively located in containers "cn/gd", "cn/beijjing", and "us/ca", that is, the three containers "cn/gd", "cn/beijjing" and "us/ca" provide an access service for "hosting.com", and the three containers are child nodes of the container "hosting.com".

Optionally, many other methods may be used to represent the tree structure in the text form, for example, an XML format is used or "( )" is used as a separator to replace "|". The present disclosure is not limited to a specific representation method.

Optionally, when a directed acyclic graph is used to represent the relationship between the content name of the requested content and the container information of the requested content, in a content request packet, the content name represented by an entrance vertex of the directed acyclic graph and the container information of the requested content which is represented by other vertexes in the directed acyclic graph than the entrance vertex are arranged into a sequence, where all vertexes of the directed acyclic graph are separated by separators. In addition, an access parameter is carried after all vertexes of the directed acyclic graph that are used as start points of directed edges, where the access parameter is used to indicate sequence numbers of endpoints of directed edges originated from the vertex in the sequence.

Specifically, the content name of the requested content and the container information of the requested content may be arranged into a sequence in { }, where the content name of the requested content is arranged in the first position of the sequence, and the container information of the requested content is arranged after the content name. "|" is used as a separator between the content name of the requested content and container information of each container, where the number of separators "|" is fixed to 1. In addition, a parameter pointing to other vertexes is added after the content name of the requested content and the container information of the requested content, for example, in=n1, n2, . . . , where n1 or n2 is a sequence number of the next vertex in the sequence, and the sequence number of the content name of the requested content in the sequence is 0. If the in parameter is not carried after the container information, the container information is an exit vertex by default. For example, if Name1={fanlingyuan.com/blog/2012/June01/main.html; in=1, 2|hosting.com; in=3, 4 | cloudsrv.com; in=4, 5|cn/gd|cn/beijing|us/ca}, and a parameter in=1, 2" is carried after content "fanlingyuan.com/blog/2012/June01/main.html", where 1 and 2 are respectively sequence numbers of containers "hosting.com" and "cloudsrv.com" in the container sequence, it indicates that the two containers are home containers of the content. However, if a parameter in=3, 4" is carried after "hosting.com", it indicates that access containers of "hosting.com" are "cn/gd" and "cn/Beijing"; if a parameter in=4, 5" is carried after "cloudsrv.com", it indicates that access containers of "cloudsrv.com" are "cn/Beijing" and "us/ca", where "cn/Beijing" provides an access service for "hosting.com" and "cloudsrv.com" simultaneously. However, the embodiment of the present disclosure is not limited to this.

In step S120, the local node matches the content name of the requested content with the forwarding entries in the FIB of the local node. In step S130, when no forwarding entry that matches the content name of the requested content exists in the FIB, the local node may match the container identifier of each container in the container set of the requested content with the forwarding entries in the FIB in turn according to a priority policy. Herein, the matching refers to longest matching. When a forwarding entry that matches a container identifier of a container in the container set of the requested content exists in the FIB, the local node may send the content request packet according to a port in the matched forwarding entry, and stop the matching process. Optionally, the local node may also continue to perform the matching process until container identifiers of all containers in the container set are matched with the preset container identifiers in the FIB. In this case, a forwarding entry that matches container identifiers of more than two containers may exist in the FIB, and the local node may send the content request packet according to a port in the matched forwarding entry respectively, so as to increase the probability of routing the requested content. In an actual application, the specific matching method may be dynamically configured according to requirements, and is not limited by the embodiment of the present disclosure.

Figure 3:
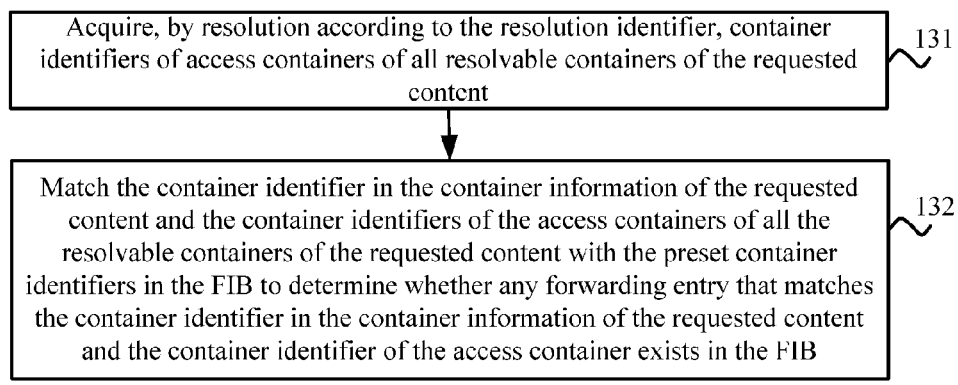
FIG. 3 is another schematic flowchart of a method for routing and forwarding according to an embodiment of the present disclosure.

Optionally, as shown in FIG. 3, in method 100, in step S130, the determining whether any forwarding entry that matches the container identifier in the container information of the requested content exists in the FIB includes the following:

S131. Acquire, by resolution according to the resolution identifier, container identifiers of access containers of all resolvable containers of the requested content.

S132. Match the container identifier in the container information of the requested content and the container identifiers of the access containers of all the resolvable containers of the requested content with the preset container identifiers in the FIB to determine whether any forwarding entry that matches the container identifier in the container information of the requested content and the container identifier of the access container exists in the FIB.

When the local node determines, according to a resolution identifier of a container in the container set, that the container is a resolvable container, the local node may acquire an access container of the container by querying the resolution system, and further determine whether the access container is a resolvable container. When the access container is still a resolvable container, the local node continues to acquire an access container of the access container by querying the resolution system. This iterative resolution process is performed until the access container acquired by resolution is irresolvable. Up to now, the complete resolution process is ended, and the local node has acquired the access containers of all the resolvable containers of the requested content. Then the local node matches, in turn according to a priority policy, the container identifier in the container information of the requested content and the container identifiers of the access containers of all the resolvable containers with the preset container identifiers included in the FIB.

The following describes steps S131 and S132 in detail by using an example in which the relationship between the content name and the container information is represented by a tree in a content request packet and the content request packet carries only a resolution identifier of a resolvable container. It is assumed that the initial form of the content request packet received by the local node is as follows: Name={fanlingyuan.com/blog/2012/June01/main.html|chinamobile/fanlingyuan; resolvable=yes}. According to the resolution identifier "resolvable=yes", the local node may know that the container "chinamobile/fanlingyuan" is resolvable. Therefore, the local node acquires its access containers "airchina/ca1314; resolvable=yes" and "cloudsrv.com" by querying the resolution system. Because the container "airchina/ca1314" is still resolvable, the local node acquires its access container "cn/beijing" by continuing to query the resolution system. Because "cn/beijing" is irresolvable, the complete resolution process is ended, and the local node has acquired all resolvable containers "chinamobile/fanlingyuan" and "airchina/ca1314" of the requested content, and access containers "airchina/ca1314", "cloudsrv.com", and "airchina/ca1314" of all the resolvable containers. Then, the local node matches the container identifier "chinamobile/fanlingyuan" in the container information of the requested content and the container identifiers "airchina/ca1314", "cloudsrv.com", and "airchina/ca1314" of the access containers of all the resolvable containers of the requested content with the forwarding entries of the FIB in turn.

Optionally, the local node may further add container information of the access containers of all the resolvable containers acquired through the resolution system, to the content request packet for use by subsequent routing nodes. Therefore, the subsequent routing nodes may directly match the container identifier in the container information of the requested content with the forwarding entries in the FIB without performing the resolution process. Therefore, optionally, the method 100 further includes the following:

S145. Add container information of the access containers of all the resolvable containers acquired by resolution, to the container information of the requested content.

For example, the local node may insert the access containers acquired by resolution in the above example into the container information of the content request packet, thereby acquiring the final content request packet: Name {fanlingyuan.com/blog/2012/June01/main.html|chinamobile/fanlingyuan; resolvable=yes||airchina/ca1314; resolvable=yes|||cn/beijing||cloudsrv.com}.

In addition, optionally, for the access containers acquired through the resolution system, container information of the access containers acquired by resolution may further include buffer capacity and time to live (Time To Live, TTL), used to indicate that a user equipment or network side may cache the resolution result and time of caching the resolution result is time to live, so as to share the resolution result with other user equipments or routing nodes. Herein, the network side may include the local node, or may also include other routing nodes, which is not limited by the embodiment of the present disclosure. Access containers that can perform caching may be represented by "cachable=yes" and "TTL=T", where T represents time of caching the resolution result by the local node, that is, time of caching the correspondence between resolvable containers and the access containers by the local node is T. For example, "TTL=1 hour" indicates that the time of caching the resolution result is one hour. Optionally, T may also be set to other time, and T may also be in units of minutes or seconds, which is not limited by the embodiment of the present disclosure. Containers that can perform caching may be represented by default buffer capacity and "TTL=0". Optionally, the buffer capacity and the time to live may also be represented in other manners, which is not limited by the embodiment of the present disclosure.

Optionally, in the embodiment of the present disclosure, the local node may also first match the container identifiers in the container set carried in the content request packet with the forwarding entries in the FIB. When no forwarding entry that matches any container identifier in the container set exists in the FIB, the local node may perform the above complete resolution and matching process. Specifically, when no forwarding entry that matches the container identifier carried in the content request packet exists in the FIB, the local node determines, according to the resolution identifier carried in the content request packet, container information of access containers of resolvable containers. When the access containers of the resolvable containers are resolvable, the local node resolves the access containers of the resolvable containers; and when the access containers acquired by resolution are resolvable, the local node further resolves the access containers acquired by resolution, until an access container acquired by the further resolution is irresolvable, so as to acquire the container identifiers of the access containers of all the resolvable containers of the requested content. The local node matches the container identifiers of the access containers of all the resolvable containers with the preset container identifiers in the FIB to determine whether any forwarding entry that matches at least one container identifier in the container identifiers of the access containers of all the resolvable containers exists in the FIB; and when a forwarding entry that matches at least one container identifier in the container identifiers of the access containers of all the resolvable containers exists in the FIB, sends the content request packet according to a port in the matched forwarding entry.

Optionally, the local node may also resolve only a part of resolvable containers of the requested content to acquire their access containers, and then match the container identifier in the container information of the requested content and container identifiers of the access containers that are acquired by partial resolution with the forwarding entries in the FIB. When a forwarding entry that matches the above container identifiers exists in the FIB, the local node may send the content request packet according to a port in the matched forwarding entry. Optionally, when no forwarding entry that matches the above container identifiers exists in the FIB, the local node may resolve the part of resolvable containers that are not resolved, and match the access containers acquired by resolution with the forwarding entries in the FIB. However, the embodiment of the present disclosure is not limited to this.

Therefore, according to the method for routing and forwarding in the embodiment of the present disclosure, container information of content is added on the basis of a content name to extend attributes of content in an ICN system, so that routing and forwarding are less dependent upon the content name. Therefore, routing entries in a routing table may be reduced, and it is possible to solve routing scalability and mobility problems and the like that are caused by the content name.

Figure 4:
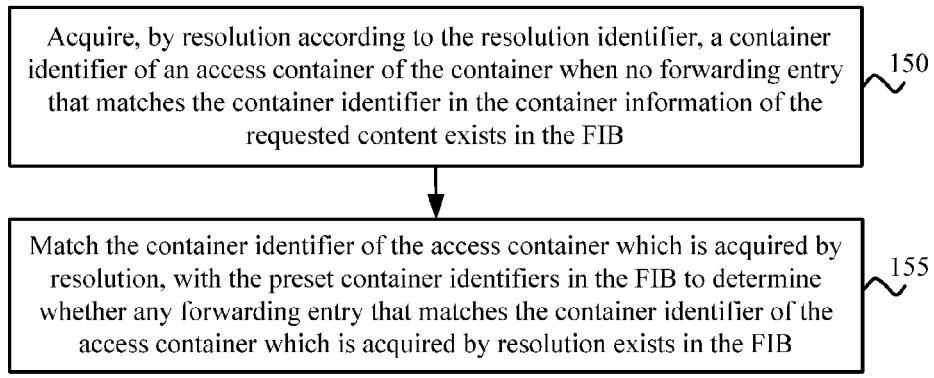
FIG. 4 is still another schematic flowchart of a method for routing and forwarding according to an embodiment of the present disclosure.

In the above embodiment, the local node first performs complete resolution for the container set of the requested content to acquire the access containers of all the resolvable containers of the requested content, and then performs the matching process. Optionally, the local node may also first perform the matching process. When no forwarding entry in the FIB matches any container in the container set, the local node resolves the resolvable containers in the container set. Therefore, optionally, as shown in FIG. 4, in another embodiment, the method 100 further includes the following:

S150. Acquire, by resolution according to the resolution identifier, a container identifier of an access container of the container when no forwarding entry that matches the container identifier in the container information of the requested content exists in the FIB.

S155. Match the container identifier of the access container which is acquired by resolution, with the preset container identifiers in the FIB to determine whether any forwarding entry that matches the container identifier of the access container which is acquired by resolution exists in the FIB.

Steps S150 and S155 may be performed cyclically. That is to say, when no forwarding entry that matches any one of the containers in the container set exists in the FIB, the local node determines the resolvable containers in the container set according to the resolution identifier in the container information, and matches the container identifier of the access container which is acquired by resolution, with the preset container identifiers in the FIB to determine whether any forwarding entry that matches the container identifier of the access container which is acquired by resolution exists in the FIB. When no forwarding entry that matches the container identifier of the access container which is acquired by resolution exists in the FIB and the access container acquired by resolution is resolvable, the local node further resolves the access container acquired by resolution, until the access container acquired by further resolution is irresolvable or a forwarding entry that matches the container identifier of the access container acquired by further resolution exists in the FIB. When a forwarding entry that matches the container identifier of the access container which is acquired by resolution or by further resolution exists in the FIB, the local node sends the content request packet according to a port in the matched forwarding entry. Specifically, the local node first matches the container identifier of each container in the container set carried in the content request packet with the forwarding entries in the FIB in turn. When no forwarding entry that matches any one of the containers in the container set exists in the FIB, the local node determines a resolvable container in the container set according to the resolution identifier in the container information, and acquires an access container of the resolvable container by querying the resolution system. Then, the local node matches the access container with the forwarding entries in the FIB. When still no forwarding entry that matches the access container exists in the FIB, the local node determines, according to the resolution identifier of the access container, whether the access container is resolvable, and continues to resolve the access container when the access container is resolvable, until a forwarding entry that matches the access container acquired by resolution is found in the FIB or the access container acquired by resolution is irresolvable.

Optionally, in another embodiment, the method 100 further includes the following:

S160. Add container information of the access container which is acquired by resolution to the container information of the requested content.

The local node may add container information of the access container which is acquired by resolution every time to the container information of the requested content.

The following describes the cyclic execution process of steps S150, S155, and S160 in detail by using an example in which the relationship between the content name and the container information is represented by a directed acyclic graph in a content request packet and the content request packet carries only a resolution identifier of a resolvable container. The initial form of the content request packet received by the local node is: Name={fanlingyuan.com/blog/2012/June01/main.html; in=1|chinamobile/fanlingyuan; resolvable=yes}. The local node first matches the container identifier "chinamobile/fanlingyuan" with the forwarding entries in the FIB, and the result indicates that no forwarding entry that matches the container identifier exists in the FIB. However, according to the resolution identifier "resolvable=yes", the local node finds that the container "chinamobile/fanlingyuan" is resolvable. Therefore, the local node queries the resolution system to resolve the container, and acquires access containers of the container: "airchina/ca1314; resolvable=yes" and "cloudsrv.com". The local node may insert the access containers into the container information of the requested content, and the result is Name={fanlingyuan.com/blog/2012/June01/main.html; in=1|chinamobile/fanlingyuan; resolvable=yes; in=2, 3|airchina/ca1314; resolvable=yes|cloudsrv.com}. In addition, the local node matches the container identifiers "airchina/ca1314" and "cloudsrv.com" with the forwarding entries in the FIB in turn. The matching result indicates that still no forwarding entry that matches the two container identifiers exists in the FIB but the container "airchina/ca1314" is resolvable. Therefore, the local node continues to resolve the container "airchina/ca1314" and acquires the access container "cn/beijing" of the container. The local node inserts the access container into the container information of the requested content, and the content request packet changes to: Name={fanlingyuan.com/blog/2012/June01/main.html; in=1|chinamobile/fanlingyuan; resolvable=yes; in=2, 3|airchina/ca1314; resolvable=yes; in=4|cloudsrv.com|cn/beijing}, and the local node matches the container identifier "cn/beijing" with the forwarding entries in the FIB. Because the container "cn/beijing" is irresolvable, no matter whether any forwarding entry that matches the container identifier exists in the FIB, the above cyclic process ends and goes to the next step.

Optionally, in the embodiment of the present disclosure, the local node may also perform iterative resolution and matching according to depth traversal of the tree, for resolvable containers carried in the content request packet. Specifically, the local node may perform iterative resolution and matching for a resolvable container carried in the content request packet, until the access container acquired by iterative resolution is irresolvable or a forwarding entry that matches the access container acquired by iterative resolution exists in the FIB; when the access container acquired by iterative resolution is irresolvable and no forwarding entry that matches the access container acquired by iterative resolution exists in the FIB, the local node may perform the iterative resolution and matching process for another resolvable container carried in the content request packet. However, the embodiment of the present disclosure is not limited to this.

Therefore, according to the method for routing and forwarding in the embodiment of the present disclosure, container information of content is added on the basis of a content name to extend attributes of content in an ICN system, so that routing and forwarding are less dependent upon the content name. Therefore, routing entries in a routing table may be reduced, and it is possible to solve routing scalability and mobility problems and the like that are caused by the content name. In addition, in most circumstances, the local node may know, by only performing partial resolution, that a forwarding entry that matches the access container exists in the FIB. Therefore, this embodiment can reduce the times of resolution for the container and times of querying the resolution system in the forwarding procedure as compared with the above embodiment in which matching is performed after complete resolution.

In step S120, the local node matches the content name of the requested content with the forwarding entries in the FIB. Optionally, a forwarding entry in the FIB may include a content name prefix and a port corresponding to the content name prefix. Correspondingly, step S120 includes the following:

S121. Determine, according to whether a prefix of the content name of the requested content matches any content name prefix in the forwarding entries in the FIB, whether any forwarding entry that matches the content name of the requested content exists in the FIB.

The method 100 further includes the following:

S165. When it is determined that a forwarding entry that matches the content name of the requested content exists in the FIB, send the content request packet according to a port in the matched forwarding entry.

Figure 5:
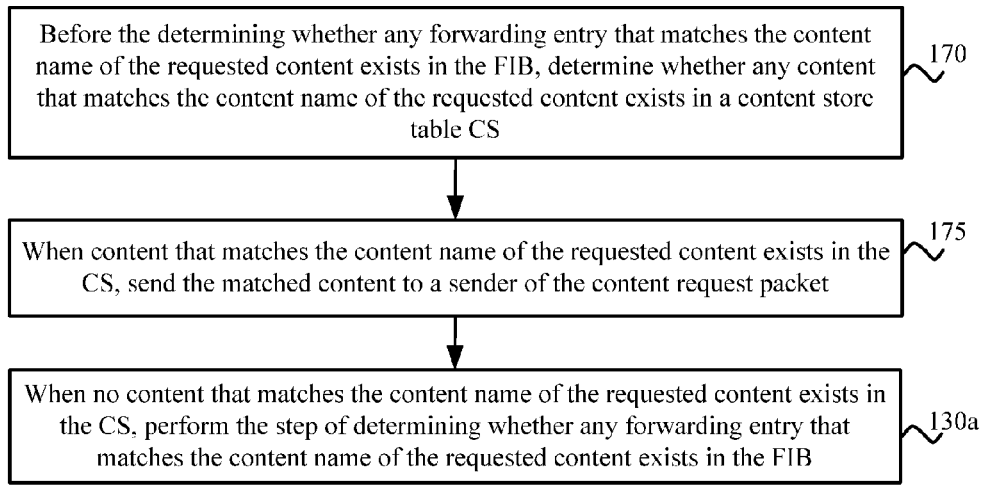
FIG. 5 is still another schematic flowchart of a method for routing and forwarding according to an embodiment of the present disclosure.

Optionally, the local node may further cache the requested content through a CS. Therefore, when the routing node receives a request for same content, the routing node may directly send the requested content stored in the CS to a sender of the content request packet, so that the content request process is simpler and faster. Therefore, optionally, as shown in FIG. 5, in another embodiment, the method 100 further includes the following:

S170. Before the determining whether any forwarding entry that matches the content name of the requested content exists in the FIB, determine whether any content that matches the content name of the requested content exists in a content store table CS.

S175. When content that matches the content name of the requested content exists in the CS, send the matched content to a sender of the content request packet.

S130a. When no content that matches the content name of the requested content exists in the CS, perform the step of determining whether any forwarding entry that matches the content name of the requested content exists in the FIB.

Therefore, according to the method for routing and forwarding in the embodiment of the present disclosure, container information of content is added on the basis of a content name to extend attributes of content in an ICN system, so that routing and forwarding are less dependent upon the content name. Therefore, routing entries in a routing table may be reduced, and it is possible to solve routing scalability and mobility problems and the like that are caused by the content name.

Figure 6:
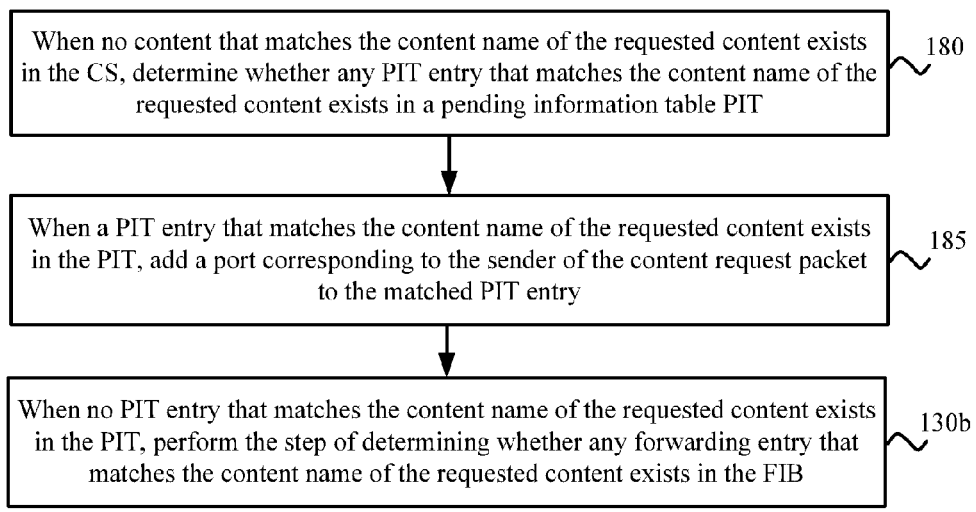
FIG. 6 is still another schematic flowchart of a method for routing and forwarding according to an embodiment of the present disclosure.

Optionally, the local node is further compatible with a method for routing and forwarding in an NDN in the prior art. The local node stores routing information of the sender of the content request packet in a pending information table (Pending Information Table, "PIT" for short), searches a same content request only once, and determines a next-hop port of the requested content according to information in the PIT when returning the requested content. Therefore, repetitive searches for the same requested content are avoided, and the next-hop port of the returned requested content can also be determined. Therefore, optionally, as shown in FIG. 6, in another embodiment, the method 100 further includes the following:

S180. When no content that matches the content name of the requested content exists in the CS, determine whether any PIT entry that matches the content name of the requested content exists in a pending information table PIT.

S185. When a PIT entry that matches the content name of the requested content exists in the PIT, add a port corresponding to the sender of the content request packet to the matched PIT entry.

S130b. When no PIT entry that matches the content name of the requested content exists in the PIT, perform the step of determining whether any forwarding entry that matches the content name of the requested content exists in the FIB.

Figure 7:
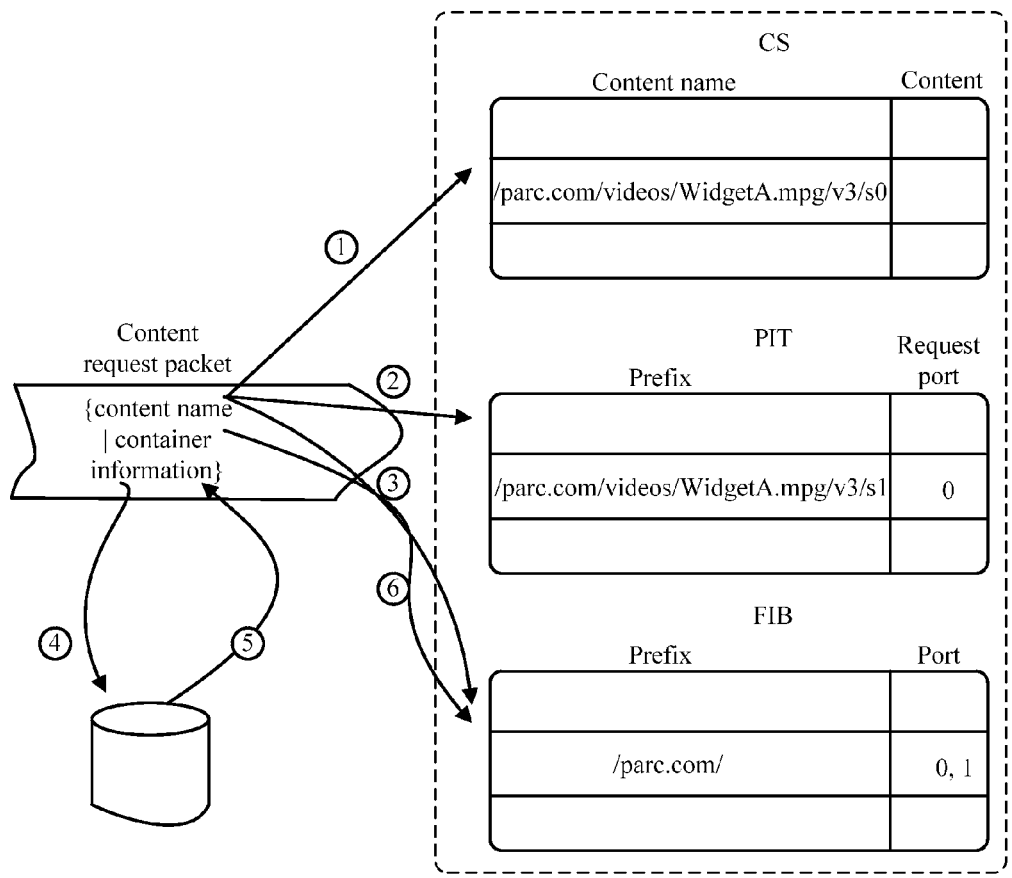
FIG. 7 is a schematic flowchart of a method for routing and forwarding according to another embodiment of the present disclosure.

The following describes in detail the method for routing and forwarding in the embodiment of the present disclosure with reference to an example in FIG. 7. The local node receives a content request packet, where the content request packet carries a content name and container information of requested content. First the local node performs step a Content entries in the CS may include preset content names and content corresponding to the preset content names. The local node may match the content name of the requested content with the preset content names in the CS to determine whether any content that matches the content name of the requested content exists in the CS. When no content that matches the content name of the requested content exists in the CS, the local node performs step $\hat{2}$. A PIT entry in the PIT may include a content name prefix and a request port corresponding to the content name prefix, where the request port represents a port corresponding to a sender of the content request packet that carries a content name with the content name prefix as a prefix. The local node matches the prefix of the content name of the requested content with the content name prefixes in the PIT entries to determine whether any PIT entry that matches the content name of the requested content exists in the PIT. When no PIT entry that matches the content name of the requested content exists in the PIT, the local node performs step $\hat{3}$. A forwarding entry in the FIB includes a content name prefix and a port corresponding to the content name prefix, or a forwarding entry in the FIB includes a preset container identifier and a port corresponding to the preset container identifier. The local node matches the prefix of the content name of the requested content with the content name prefixes in the forwarding entries to determine whether any forwarding entry that matches the content name of the requested content exists in the FIB. When no forwarding entry that matches the content name of the requested content exists in the FIB, the local node performs steps $\hat{4}$ and $\hat{5}$, and performs complete resolution for the container set of the requested content, and acquires all resolvable containers of the requested content and access containers of all the resolvable containers. Then the local node performs step $\hat{6}$ to match container identifiers of containers in the container set of the requested content and container identifiers of the access containers of all the resolvable containers with the forwarding entries in the FIB in turn according to a priority policy to find a matched forwarding entry in the FIB. When at least one container identifier matches a forwarding entry in the FIB, the local node forwards the content request packet according to a port in the matched forwarding entry. Otherwise, the local node discards the content request packet or sends the content request packet according to a default port. Up to now, the procedure for routing and forwarding the content request packet is ended.

Therefore, according to the method for routing and forwarding in the embodiment of the present disclosure, container information of content is added on the basis of a content name to extend attributes of content in an ICN system, so that routing and forwarding are less dependent upon the content name. Therefore, routing entries in a routing table may be reduced, and it is possible to solve routing scalability and mobility problems and the like that are caused by the content name.

Optionally, in another embodiment, the method 100 further includes the following:

S190. Send the content request packet according to a default port, or discard the content request packet when no forwarding entry that matches the container identifier in the container information of the requested content exists in the FIB.

When the local node performs step S190 after performing step S132 in the above embodiment, the local node does not have a forwarding entry that matches the container identifier in the container information of the requested content and the container information of the access containers of all the resolvable containers of the requested content, in the FIB. However, when the local node performs step S190 after performing step S155 in the above embodiment, the local node does not have a forwarding entry that matches the container identifier in the container information of the requested content, in the FIB, and when the access containers acquired by resolution are irresolvable, sends the content request packet according to the default port, or discards the content request packet.

Therefore, according to the method for routing and forwarding in the embodiment of the present disclosure, container information of content is added on the basis of a content name to extend attributes of content in an ICN system, so that routing and forwarding are less dependent upon the content name. Therefore, routing entries in a routing table may be reduced, and it is possible to solve routing scalability and mobility problems and the like that are caused by the content name.

It should be understood that, in the embodiment of the present disclosure, the matching between the content name of requested content and the container identifier in container information of the requested content and a forwarding entry in the FIB is longest matching, but the matching between the content name of the requested content and the CS and the matching between the content name of the requested content and the PIT may be longest matching or precise matching, which is not limited by the embodiment of the present disclosure. In addition, the container information of the requested content is used only when the content name of the requested content fails to match the FIB or fails to match the CS and FIB or fails to match all the CS, PIT, and FIB, for matching a forwarding entry in the FIB to determine a forwarding route for the content request packet. Therefore, the container information plays only the role of an auxiliary route. In some circumstances where the requested content can be found when the content name of the requested content is used, the content request packet may carry only the content name of the requested content, thereby guaranteeing convenience of an ICN system such as an NDN that directly uses the content name for routing.

In addition, in the embodiment of the present disclosure, in scenarios of local routing such as a home network, an enterprise network, and Adhoc, intervention of the resolution system is also not necessary. For example, in a radio network at home, if a mobile phone stores content with a content name "fanlingyuan.com/myson/2012/June01/happyjpg", where the prefix "fanlingyuan.com/myson" of the content name and a corresponding port are stored in the FIB of a radio routing node at home, when a computer user wants to acquire the content, the user sends a content request packet to the network in the following form: {fanlingyuan.com/myson/2012/June01/happyjpg|chinamobile/fanlingyuan; resolvable=yes}. Although the content request packet carries container information of a resolvable container, because a content name of the requested content may match "fanlingyuan.com/myson" in the FIB of the radio routing node, the content request packet may be sent according to the port in the matched forwarding entry, and it is unnecessary to match the container or resolve the container. Therefore, in this case, the resolvable container may not be resolved, and the content request packet may also carry only the content name of the requested content without carrying container information of the requested content.

Figure 8:
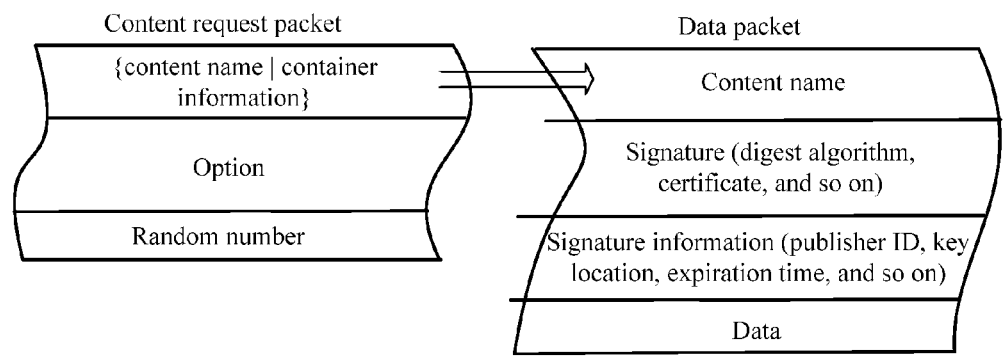
FIG. 8 is a schematic diagram of a content request packet and a data packet according to an embodiment of the present disclosure.

In addition, as shown in FIG. 8, the embodiment of the present disclosure extends only a content attribute of the content request packet, where the content request packet carries the content name and the container information of the requested content and may carry an option and a random number in the prior art. However, a data packet may still carry a content name in an existing ICN system such as an NDN but does not carry container information of any container, and the data packet still carries signature information, for example, a publisher ID, key location, and expiration time. Because the signature in the data packet is still acquired by calculation based on the content name in the data packet, data itself, and private key of the user, but the container information of the requested content which is carried in the content request packet does not appear in the data packet and also does not participate in signature calculation, security of an existing ICN system such as an NDN is not affected.

Figure 9:
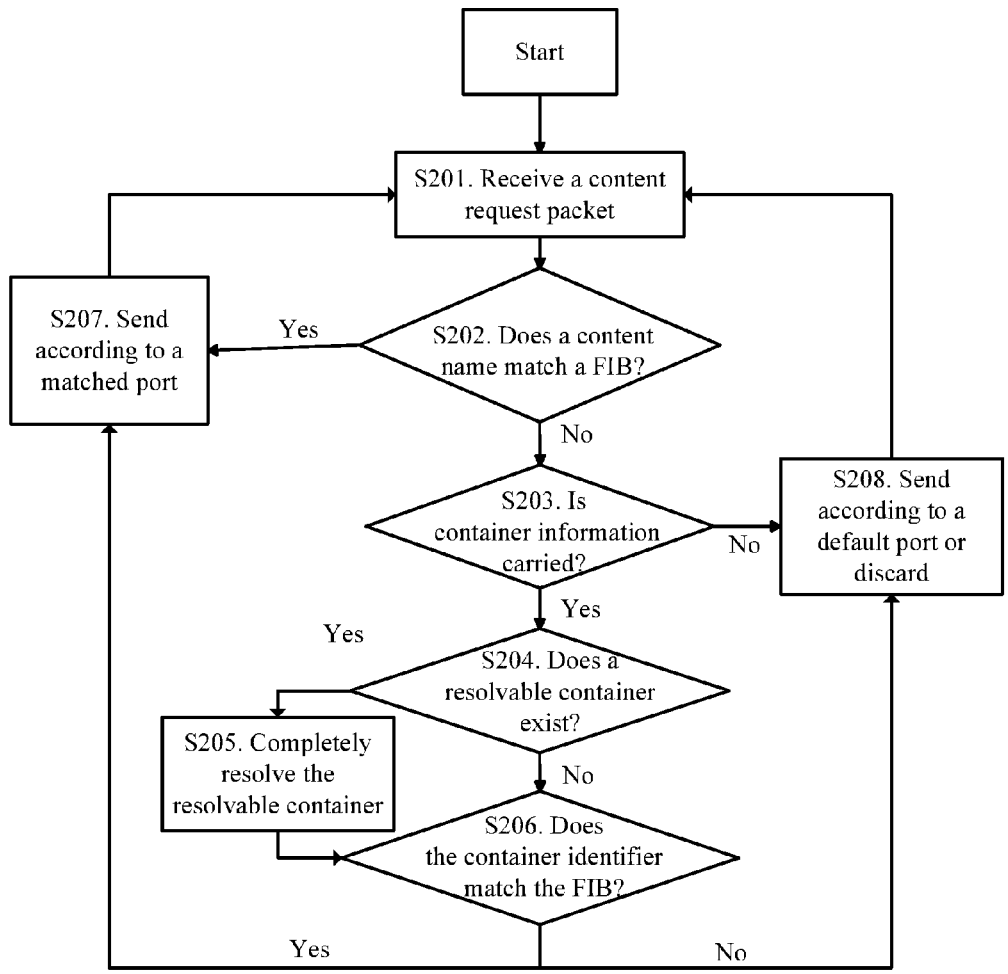
FIG. 9 is a schematic flowchart of a method for routing and forwarding according to still another embodiment of the present disclosure.
Figure 10:
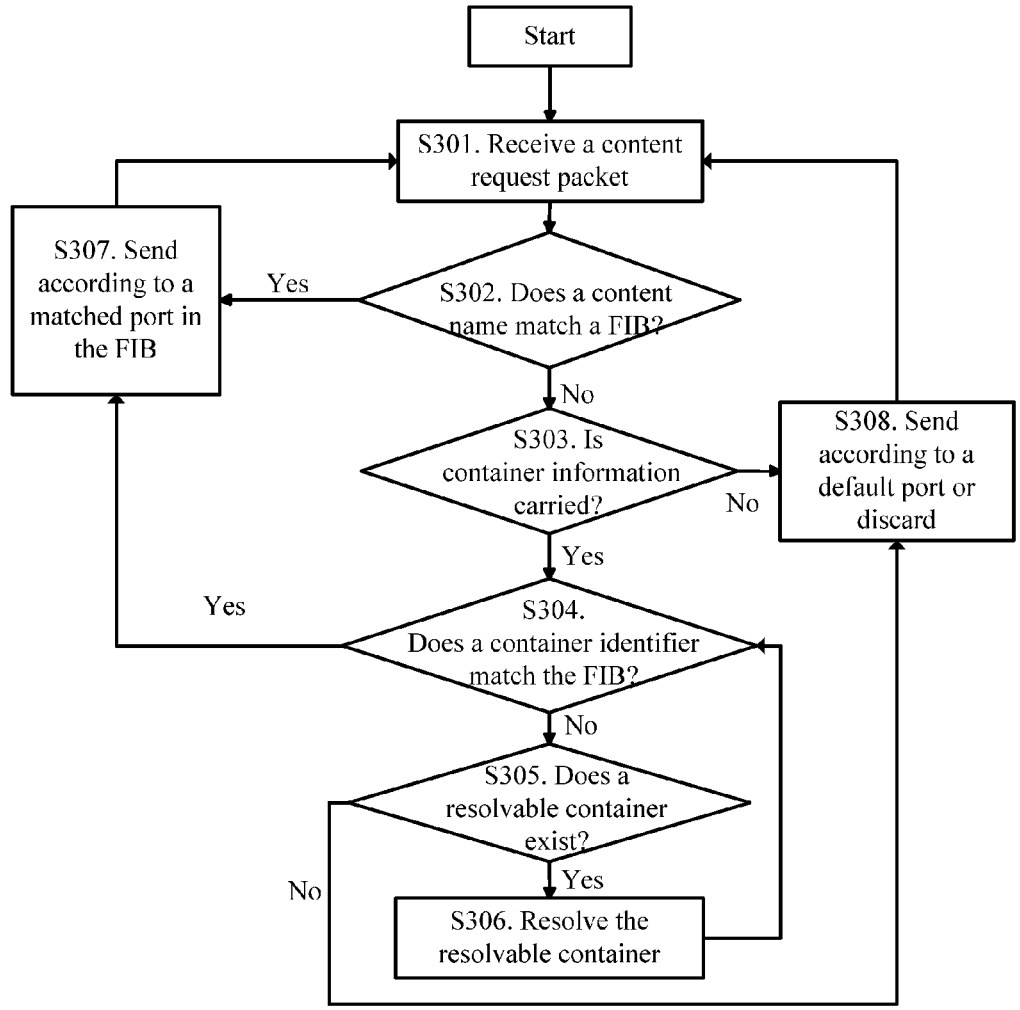
FIG. 10 is a schematic flowchart of a method for routing and forwarding according to still another embodiment of the present disclosure.
Figure 11:
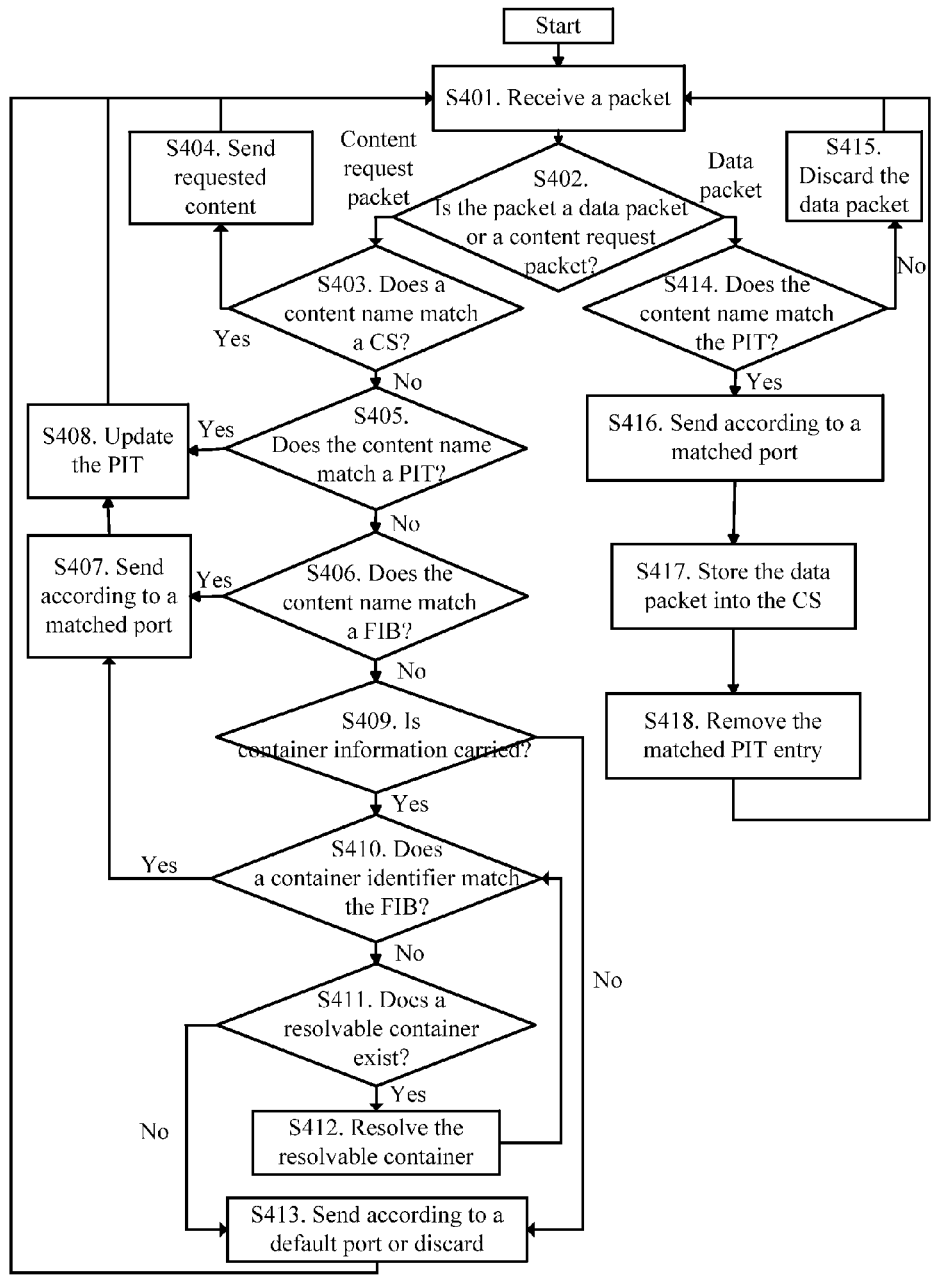
FIG. 11 is a schematic flowchart of a method for routing and forwarding according to still another embodiment of the present disclosure.

The following describes in detail the method for routing and forwarding according to embodiments of the present disclosure with reference to specific examples shown in FIG. 9 to FIG. 11.

FIG. 9 is a schematic flowchart of a method 200 for routing and forwarding according to an embodiment of the present disclosure. As shown in FIG. 9, the method 200 includes the following:

S201. Receive a content request packet.

The content request packet may carry only a content name of requested content, or may also carry a content name of requested content and container information of the requested content, where containers corresponding to the container information of the requested content constitute a container set, where the container set includes at least one container. The container information of the requested content includes a container identifier of each container in the container set. Optionally, the container information may further include a resolution identifier of each container in the container set, or include a resolution identifier of a resolvable container in the container set, which is not limited by the embodiment of the present disclosure.

S202. Match a content name of requested content with forwarding entries in a FIB.

Specifically, a prefix of the content name of the requested content may be matched with content name prefixes in the forwarding entries of the FIB. If a content name prefix that matches the prefix of the content name of the requested content exists in the FIB, step S207 is performed, or otherwise, step S203 is performed.

S203. Determine whether the content request packet carries container information of the requested content.

If the content request packet carries the container information of the requested content, step S204 is performed, or otherwise, step S208 is performed.

S204. Determine, according to a resolution identifier in the container information, whether a resolvable container exists in a container set.

If at least one resolvable container exists in the container set, steps S205 and S206 are performed, or otherwise, step S206 is directly performed.

S205. Completely resolve the resolvable container in the container set.

Complete resolution is performed for at least one resolvable container in the container set, which means first acquiring an access container of the at least one resolvable container, and adding container information of the access container to the content request packet, and then determining whether the access container is resolvable, and if the access container is resolvable, continuing to resolve the access container to acquire an access container of the access container, and adding container information of the access container of the access container to the container information of the requested content, until an access container acquired by resolution is irresolvable. Therefore, access containers of all resolvable containers of the requested content and container information of the updated requested content are acquired.

S206. Match container identifiers in the container information of the requested content with forwarding entries in the FIB.

Specifically, a container identifier of each container in the container set corresponding to the container information is matched with preset container identifiers in the FIB in turn according to a policy. When step S206 is performed after step S204, the container information in step S206 is specifically the container information of the requested content which is carried in the content request packet received by a local routing node; when step S206 is performed after step S205, the container information in step S206 is specifically container information of the updated requested content. If at least one container identifier matches a forwarding entry in the FIB, step S207 is performed, or otherwise, step S208 is performed.

S207. Send the content request packet according to a port in the matched forwarding entry.

Up to now, the procedure for routing and forwarding the content request packet is ended. It should be understood that, although herein, the sent content request packet is still referred to as the content request packet, because the content request packet at this time may include added container information of the access container of the resolvable container acquired in the above complete resolution process, the content request packet at this time may be different from the content request packet received in step 201.

S208. Send the content request packet according to a default port, or discard the content request packet.

Therefore, according to the method for routing and forwarding in the embodiment of the present disclosure, container information of content is added on the basis of a content name to extend attributes of content in an ICN system, so that routing and forwarding are less dependent upon the content name. Therefore, routing entries in a routing table may be reduced, and it is possible to solve routing scalability and mobility problems and the like that are caused by the content name.

FIG. 10 is a schematic flowchart of a method 300 for routing and forwarding according to another embodiment of the present disclosure, where the implementation process of steps 301 to 303 is basically the same as that of steps 201 to 203 in the method 200, and is not further described herein. The following describes in detail the subsequent steps involving container resolution.

S304. Match a container identifier of each container in a container set with the forwarding entries in the FIB in turn.

If a forwarding entry that matches a container identifier of at least one container exists in the FIB, step S307 is performed, or otherwise, step S305 is performed.

S305. Determine whether a resolvable container exists in the container set.

If at least one resolvable container exists in the container set, steps S306 and S304 are performed, or otherwise, step S308 is performed.

S306. Resolve the at least one resolvable container respectively to acquire an access container of the at least one resolvable container.

Step S304 is performed after step S306, which means matching container identifiers of access containers of the at least one resolvable container with the forwarding entries in the FIB respectively. If a forwarding entry that matches the container identifier of one or more access containers in the container identifiers of the access containers of the at least one resolvable container exists in the FIB, step S307 is performed, or otherwise, steps S305 and S306 continue to be performed. Steps S305, S306, and S304 are performed cyclically until a forwarding entry that matches the container identifier of the access container acquired in the resolution process exists in the FIB or the access container acquired in the resolution process is irresolvable.

S307. Send the content request packet according to a port in the matched forwarding entry.

Up to now, the procedure for routing and forwarding the content request packet is ended.

S308. Send the content request packet according to a default port, or discard the content request packet.

Up to now, the procedure for routing and forwarding the content request packet is ended.

Therefore, according to the method for routing and forwarding in the embodiment of the present disclosure, container information of content is added on the basis of a content name to extend attributes of content in an ICN system, so that routing and forwarding are less dependent upon the content name. Therefore, routing entries in a routing table may be reduced, and it is possible to solve routing scalability and mobility problems and the like that are caused by the content name. In addition, compared with the method 200 in the above embodiment, the method 300 can reduce the times of resolution for the container in most cases, thereby saving overheads and increasing the speed of forwarding the content request packet.

FIG. 11 is a schematic flowchart of a method 400 for routing and forwarding according to still another embodiment of the present disclosure. As shown in FIG. 11, the method 400 includes the following:

S401. Receive a packet.

The packet may be a content request packet or a data packet, where the content request packet may carry a content name and container information of requested content, but the data packet carries only a content name of content and does not carry container information.

S402. Determine whether the received packet is a data packet or a content request packet.

If the packet is a content request packet, step S403 is performed; if the packet is a data packet, step S414 is performed.

S403. Match a content name of requested content with content in a CS.

A local node matches the content name of the requested content with preset content names in the CS to determine whether any content that matches the content name exists in the CS. When content that matches the content name of the requested content exists in the CS, step S404 is performed, and the procedure for routing and forwarding the content request packet by the local node is ended; otherwise, step S405 is performed.

S404. Send the requested content in the CS to a sender of the content request packet.

S405. Match the content name of the requested content with PIT entries in a PIT.

The local node matches a prefix of the content name of the requested content with content name prefixes in the PIT entries to determine whether any PIT entry that matches the content name of the requested content exists in the PIT. If a PIT entry that matches the content name exists in the PIT, it indicates that a search for the requested content has been performed and therefore step S408 is performed, and the procedure for routing and forwarding the content request packet is ended. Therefore, the search for the same content may be performed only once, and repetitive searches are avoided. Otherwise, step S406 is performed.

S406. Match the content name of the requested content with forwarding entries in a FIB.

The local node matches the prefix of the content name of the requested content with content name prefixes in forwarding entries to determine whether any forwarding entry that matches the content name exists in the FIB. If a forwarding entry that matches the content name exists in the FIB, steps S407 and S408 are performed; otherwise, step S409 is performed.

S407. Send the content request packet according to a port in the matched forwarding entry.

S408. Update the PIT.

Specifically, if step S408 is performed after step S407, updating the PIT is specifically adding the prefix of the content name of the requested content and a port corresponding to the sender of the content request packet to the PIT to form a new PIT entry. However, if step S408 is performed after step S405, updating the PIT is specifically adding the port corresponding to the sender of the content request packet to the PIT entry that matches the content name of the requested content.

S409. Determine whether the content request packet carries container information of the requested content.

If the content request packet carries the container information of the requested content, step S410 is performed, or otherwise, step S413 is performed.

S410. Match container identifiers in the container information with forwarding entries in the FIB.

The local node matches a container identifier of each container in a container set corresponding to the container information with preset container identifiers in the forwarding entries to determine whether any forwarding entry that matches container identifiers in the container information exists in the FIB. If at least one container in the container set matches a forwarding entry in the FIB, steps S407 and S408 are performed, or otherwise, step S411 is performed.

S411. Determine whether a resolvable container exists in a container set of the requested content.

The container information may further include a resolution identifier of containers. The local node determines, according to the resolution identifier, whether a resolvable container exists in the container set. If at least one resolvable container exists in the container set, steps S412 and S410 are performed, or otherwise, step S413 is performed.

S412. Resolve the at least one resolvable container respectively to acquire an access container of the at least one resolvable container.

Then step S410 is performed, which means matching container identifiers of access containers of the at least one resolvable container with the forwarding entries in the FIB in turn according to a priority policy to find a matched forwarding entry in the FIB. If no forwarding entry that matches the container identifier of the access container of the at least one resolvable container exists in the FIB, step S411 continues to be performed. Steps S410, S411, and S412 will be performed cyclically until a forwarding entry that matches the container identifier of the access container acquired by resolution is found in the FIB or the access container acquired by resolution is irresolvable, and then step S413 is performed.

S413. Send the content request packet according to a default port, or discard the content request packet.

Up to now, the procedure for routing and forwarding the content request packet is ended.

S414. Match the content name of the content with PIT entries of the PIT.

If a PIT entry that matches the content name exists in the PIT, steps S416, S417, and S418 are performed; otherwise, step S415 is performed.

S415. Discard the data packet.

Up to now, the procedure for routing and forwarding the data packet is ended.

S416. Send the data packet according to a port in the matched PIT entry.

S417. Store the data packet into a CS table.

In this way, the local node may cache content in the data packet, so that the local node can directly return the content in the data packet when receiving a request for the content in the data packet during caching of the content, and therefore a next search for the content in the data packet is avoided.

S418. Remove the matched PIT entry.

Steps S416, S417, and S418 may be performed in any sequence. The embodiment of the present disclosure does not limit the sequence of performing the three steps. Up to now, the procedure for forwarding the data packet by the local node is ended.

It should be understood that, the values of the sequence numbers in the above processes do not mean the execution sequence; the execution sequence of each process should be determined by the function and internal logic of the process, and shall not be construed as a limitation to the implementation process of the embodiment of the present disclosure.

It should further be understood that, examples in FIG. 9 to FIG. 11 are only used to help a person skilled in the art understand the embodiment of the present disclosure but is not used to limit the scope of the embodiment of the present disclosure. Obviously, a person skilled in the art can make various equivalent modifications and variations according to the examples in FIG. 9 to FIG. 11. The modifications and variations shall still fall within the scope of the embodiment of the present disclosure.

Therefore, according to the method for routing and forwarding in the embodiment of the present disclosure, container information of content is added on the basis of a content name to extend attributes of content in an ICN system, so that routing and forwarding are less dependent upon the content name. Therefore, routing entries in a routing table may be reduced, and it is possible to solve routing scalability and mobility problems and the like that are caused by the content name.

As can be seen from the above embodiment, by adding container information of content on the basis of the content name to extend attributes of content in an ICN system, the embodiment of the present disclosure is capable of reducing dependence of routing and forwarding upon the content name, thereby solving the problem of routing scalability caused by the content name. Specifically, to reduce routing entries in the routing table, in the embodiment of the present disclosure, all containers are classified into three types: topology-dependent container, topology-independent large container, and topology-independent small container. Different routing policies are used respectively for the three different types of containers.

First, a level-by-level nesting and hierarchical aggregation method is used for topology-dependent containers. The topology-dependent containers are containers forming a topological relationship with other containers, where the topological relationship includes: one upper-level container including one or more lower-level containers, and/or one lower-level container being included by one or more upper-level containers. Specifically, all containers forming the topological relationship may be classified into different levels, and each container is located at a specific level. When one container is one level away from another container, the container at a lower level is referred to as a lower-level container of the container at a higher level, and the container at the higher level is referred to as an upper-level container of the container at the lower level. The container at the lower level may be provided with an access service by its upper-level container, that is, the container at the higher level is an access container of the lower-level container. It should be understood that, herein, the lower-level container and upper-level container are relative. For example, container A may be a lower-level container of container B and may also be an upper-level container of container C. However, the embodiment of the present disclosure is not limited to this.

Optionally, a container identifier corresponding to the topology-dependent container may be capable of reflecting a level of the topology-dependent container, thereby indicating the topological relationship formed between the topology-dependent container and other containers. Specifically, a container identifier of the lower-level container may include a container identifier of the upper-level container, for example, a container identifier "cn/gd/sz" of a city-level container Shenzhen includes a container identifier "cn/gd" of an upper-level container Guangdong. However, the embodiment of the present disclosure is not limited to this.

As shown in FIG. 12, the whole network of China may be considered as a country-level topology-dependent container "cn", where the "cn" aggregates province-level containers such as Guangdong province "cn/gd" and Beijing city "cn/beijing", while "cn/gd" further aggregates lower-level topology-dependent containers such as "cn/gd/sz", and so on. Similarly, the network of America may also be considered as a country-level topology-dependent container "us", where the container "us" further includes a lower-level topology-dependent container "us/ca". In addition, large ISPs may also be aggregated by levels according to topology-related containers. For example, China Telecom, as a large container "ct", aggregates province-level containers such as "ct/gd" and "ct/sd", where "ct/gd" further aggregates city-level containers such as "ct/gd/sz". The embodiment of the present disclosure is not limited to this. Due to the longest matching feature of the FIB table, in the container "us" of America, only one route to "cn" is required to match all containers that have the prefix "cn". Therefore, the topology-dependent container at the highest level in the topological relationship such as "cn", "us", or "ct" may be used as a global container, whose route may be used as a global route for flooding. The global container is a container capable of global routing. Its route, as a global route, is a routing entry of the global container and is included in routing tables of all routing nodes. The global container does not have an access container.

Optionally, according to requirements of actual deployment, in addition to the topology-dependent container at the highest level in the topological relationship, some topology-dependent containers at high levels, such as province-level containers "cn/gd", "cn/sd", or "us/ca", may also be used as topology-dependent global containers, and their routes may be used as global routes for flooding. However, the embodiment of the present disclosure is not limited to this. In the embodiment of the present disclosure, the above topology-dependent container used as a global container is referred to as a topology-dependent global container.

Optionally, the global container may further include a topology-independent global container, where the topology-independent global container includes a topology-independent large container. Topology-independent large containers refer to few topology-independent containers with heavy access traffic in an existing network, such as an ISP, a large company, and a large al website, for example, "sina.com", "google.com", and "baidu.com". Their access traffic is heavier than that of ordinary containers by one thousand to ten thousand times. They may be used as topology-independent global containers, and their routes may also be used as global routes for flooding.

Optionally, the above topology-independent large containers may also be provided with access services by topology-dependent containers at higher levels. Therefore, routes of the topology-independent large containers may be used as local routes of routing nodes included in the access containers of the topology-independent large containers. However, the topology-independent large containers are used as global containers, which can greatly improve matching efficiency of routing tables of the whole network, and can also facilitate free and flexible route adjustment by the large companies, so as to better provide services such as multi-homing, load sharing, and anycast. In addition, because the number of such containers is small, the size of a core routing table does not grow greatly. However, the embodiment of the present disclosure is not limited to this.

To conclude, the routing table of the local node includes a routing entry of a global container, where the routing entry of the global container includes a container identifier of the global container and a first port corresponding to the container identifier of the global container, where the first port is a port connecting the local node to a next-hop routing node of the global container, the global container is a container capable of global routing, and the global container includes a topology-dependent global container and/or a topology-independent global container. Using a routing node R121 included in the container "cn/gd/sz" in FIG. 12 as an example, the routing table of the routing node includes routing entries of containers "cn" and "us", but because the routing node R121 can reach the routing nodes R1 and R2 of the container "cn" and reach the container "us" only through a routing node R12, the first port corresponding to container identifiers "cn" and "us" is a port connecting R121 to R12.

The lower-level container of the topology-dependent global container is provided with an access service by the above topology-dependent global container, and correspondingly, its route may be used as an internal route of a routing node included in the topology-dependent global container and does not need to flood out of the topology-dependent global container. Specifically, the route of the lower-level container may be included only in the routing table of the routing node included in the topology-dependent global container. Generally, any topology-dependent container in the topological relationship other than the above topology-dependent global container provides an access service for its lower-level container. Correspondingly, all routes of the lower-level container may be used as internal routes of the topology-dependent container and do not need to flood out of the topology-dependent container. For ease of description, the following topology-dependent container refers to other topology-dependent containers in the topological relationship than the above topology-dependent global container. From the perspective of the local node, the routing table of the local node may include a routing entry of the topology-dependent container, for routing based on the topology-dependent container, and the routing entry of the topology-dependent container is used, so that a route of a lower-level container of a home container of the local node is used as an internal route of the local node and does not flood out of the home container of the local node. Not flooding out of the home container of the local node means that no routing entry of the lower-level container of the home container of the local node exists in the routing table of the routing node out of the home container of the local node. Therefore, the routing node out of the home container of the local node needs to reach the lower-level container through an auxiliary route of the home container of the local node. For example, routing tables of routing nodes R1 and R2 may include routing entries of province-level containers such as "cn/sd" and "cn/gd" that are used as lower-level containers of the home container "cn" of R1 and R2. Routes of the lower-level containers may be used as local routes of routing nodes R1 and R2 and do not need to flood out of the container "cn". Similarly, routing tables of routing nodes R12 and R13 may include a routing entry of "cn/gd/sz" that is used as a lower-level container of the home container "cn/gd" of R12 and R13. The route of the lower-level container may also be used as a local route of R12 and R13 and does not need to flood out of the container "cn/gd". Therefore, routing nodes R1 and R2 of the container "cn" can only find the route of "cn/gd/sz" in the routing tables of routing nodes R12 and R13 by entering the container "cn/gd".

Specifically, the routing table of the local node may include a route of the lower-level container of the home container of the local node. The routing entry of the lower-level container includes a container identifier of the lower-level container and a second port corresponding to the container identifier of the lower-level container, where the second port is a port connecting the local node to the lower-level container. For example, the routing entry of the routing table of the routing node R12 may include a container identifier "cn/gd/sz" and a port connecting R12 to R121.

The topology-independent small container refers to a topology-independent container with light access traffic. Such containers exist in the network in large quantities, for example, a small company, an organization, a home network, and a personal digital device. This is also one of main factors causing the routing scalability problem in an existing ICN system such as an NDN. In the embodiment of the present disclosure, this type of containers may be provided with access services by topology-dependent containers. Correspondingly, routes of this type of containers may be restricted within the access containers of this type of containers and do not need to flood out of the access containers, so that the size of the core routing table can be reduced greatly. For example, as shown in FIG. 12, the container "hostsrv.com" has its own enterprise networks in two places, and it may be considered that two topology-dependent containers "cn/gd" and "us/ca" provide access services for the container. Therefore, only the routing entry of the container "hostsrv.com" exists in the routing tables of the routing nodes included in the two containers, and containers other than the two containers can only reach the container "hostsrv.com" through the auxiliary routes of the topology-dependent containers "cn/gd" and "us/ca". Therefore, the routing table of the local node may further include a routing entry of a topology-independent small container. The routing entry of the topology-independent small container includes a container identifier of the topology-independent small container and a third port corresponding to the container identifier of the topology-independent small container, where the third port is a port connecting the local node to a next-hop routing node of the topology-independent small container. For example, the routing table of the routing node R4 may include a container identifier "hostsrv.com" and a port connecting R4 to R6.

To conclude, in the embodiment of the present disclosure, the number of routing entries of the core routing table is basically equal to "the number of routes of the topology-dependent global containers" plus "the number of routes of the topology-independent global containers". Because the numbers of routes of the two types are small, the total size of the routing table may be even smaller than the number of entries of the core routing table in a present Internet router. Therefore, in the embodiment of the present disclosure, container information of content is added on the basis of the content name to extend attributes of content in an ICN system, and the route of the topology-independent small container is restricted within the topology-dependent container providing the access service for the topology-independent small container, and the route of the lower-level container of the topology-dependent container is restricted within the topology-dependent container; therefore, the number of entries of the core routing table is reduced greatly, and the routing scalability problem in an existing ICN system such as an NDN is solved effectively.

Because the FIB table is a subset of the routing table, in the embodiment of the present disclosure, the forwarding entry of the FIB table also has a feature similar to that of the routing table. Specifically, the FIB includes a forwarding entry of a global container, where the forwarding entry of the global container includes a container identifier of the global container and a first port corresponding to the container identifier of the global container, where the first port is a port connecting the local node to a next-hop routing node of the global container, the global container is a container capable of global routing, and the global container includes a topology-dependent global container and/or a topology-independent global container.

Optionally, the FIB further includes a forwarding entry of the topology-dependent container, for routing based on the topology-dependent container, and the forwarding entry of the topology-dependent container is used, so that a route of a lower-level container of a home container of the local node is used as an internal route of the local node and does not flood out of the home container of the local node; where, the topology-dependent container is a container forming a topological relationship with other containers, where the topological relationship includes: one upper-level container including one or more lower-level containers, and/or one lower-level container being included by one or more upper-level containers. Optionally, the forwarding entry of the topology-dependent container includes a container identifier of the lower-level container relative to the home container of the local node and a second port corresponding to the container identifier of the lower-level container, where the second port is a port connecting the local node to the lower-level container; and the using the forwarding entry of the topology-dependent container, so that a route of a lower-level container of a home container of the local node is used as an internal route of the local node and does not flood out of the home container of the local node is specifically: using the container identifier of the lower-level container and the second port corresponding to the container identifier of the lower-level container in the forwarding entry of the topology-dependent container, so that the route of the lower-level container of the home container of the local node is used as an internal route of the local node and does not flood out of the home container of the local node. Optionally, the container identifier corresponding to the topology-dependent container is capable of reflecting a level of the topology-dependent container, thereby indicating the topological relationship formed between the topology-dependent container and other containers.

Optionally, the FIB further includes a forwarding entry of a topology-independent small container, where the forwarding entry of the topology-independent small container includes a container identifier of the topology-independent small container and a third port corresponding to the container identifier of the topology-independent small container, where the third port is a port connecting the local node to a next-hop routing node of the topology-independent small container.

The following uses Table 1 and Table 2 as examples to respectively describe forms of the routing table and the FIB according to the embodiment of the present disclosure. Table 1 is a possible form of a routing table of a routing node R12 of a container "cn/gd". The routing entry of the routing table includes three columns. The first column includes container identifiers or content name prefixes, and the second column includes route attributes of the container identifiers or content name prefixes, where the route attributes include global or local. The third column includes next-hop routing nodes of containers corresponding to the container identifiers that the local node reaches. Optionally, the third column may also be ports corresponding to the next-hop routing nodes. However, the embodiment of the present disclosure is not limited to this.

Table 2 is a possible form of a FIB of a routing node R12. The routing entry of the FIB includes two columns. The first column includes container identifiers or content name prefixes (prefix), and the second column includes ports corresponding to the container identifiers or content name prefixes, where the ports corresponding to the container identifiers are ports connecting the local node to the next-hop routing nodes of the containers corresponding to the container identifiers. In the embodiment of the present disclosure, one container identifier or content name prefix may correspond to one or more ports. However, the embodiment of the present disclosure is not limited to this.

TABLE 1

Example of the form of the routing table

| Container Identifier/Prefix | Route Attribute | Next-Hop Routing Node |
|---|---|---|
| hostsrv.com | Local | R5 |
| cn/gd/sz | Local | R121 |
| cn/gd/gz | Local | R13 |
| cn | Global | R1, R2 |
| us | Global | R1, R2 |
| sina.com | Global | R1, R2 |

TABLE 2

Example of the form of the FIB

| Container Identifier/Prefix | Port |
|---|---|
| hostsrv.com | 1 |
| cn/gd/sz | 2, 3 |
| cn/gd/gz | 4 |
| cn | 5, 6, 7 |
| us | 5, 6, 7 |
| sina.com | 5, 6, 7 |

It should be noted that, after a routing table is constructed by using the above manner, in the embodiment of the present disclosure, whether a container is resolvable may be a feature of the container. For example, a topology-dependent container is generally irresolvable, but a topology-independent small container is generally resolvable. Optionally, the resolution feature of some containers may also change according to a policy. For example, when an access container of a topology-independent small container is relatively fixed, the container may be set as an irresolvable container; when a content publisher publishes content stored by the container, the content publisher may publish the container and the access container of the container simultaneously. Therefore, a user equipment or routing node may not query the resolution system to resolve the container. However, the embodiment of the present disclosure is not limited to this.

In addition, in the embodiment of the present disclosure, the content name prefix of the requested content may match the container identifier of the home container of the requested content, or may also mismatch the container identifier of the home container of the content. For example, the container "hostsrv.com" may store content "hostsrv.com/ main.html" matching the container identifier, or may also store content "fanlingyuan.org/blog/2012/June01/main.html" not matching the container identifier. The following describes a forwarding procedure when a content name prefix of X mismatches a container identifier of a home container S (such as hostsrv.com) of X by using an example in which requested content is X. It is assumed that an access container of S is T (such as "cn/gd" and "cn/beijing"). First, when T is relatively fixed, the content request packet may carry container information of X, S, and T; optionally, when the location of S changes, that is, T is not fixed, the content request packet may also carry only X and S (resolvable=yes) to be resolved, and the routing node queries the resolution system to acquire T and inserts T into the content request packet. Before the content request packet enters T from an extranet, auxiliary routing is performed with the assistance of T carried in the content request packet, because a FIB of a routing node of the extranet does not include a route that matches X and S but definitely includes a route of T after topology aggregation. After X and S fail to be matched in sequence, T is certainly used to search the FIB table for a next hop; after the content request packet enters T, because T must have a route to S, the content request packet successfully matches S after X fails to be matched. In this case, the content request packet is routed with the assistance of S. After entering S, the content request packet is routed by using X. The FIB table of S definitely has a prefix that matches X.

It should be understood that, the values of the sequence numbers in the above embodiment do not mean the execution sequence; the execution sequence of each process should be determined by the function and internal logic of the process, and shall not be construed as a limitation to the implementation process of the embodiment of the present disclosure.

Therefore, according to the method for routing and forwarding in the embodiment of the present disclosure, container information of content is added on the basis of a content name to extend attributes of content in an ICN system, so that routing and forwarding are less dependent upon the content name. Therefore, routing entries in a routing table may be reduced, and it is possible to solve routing scalability and mobility problems and the like that are caused by the content name.

The method for routing and forwarding according to the embodiments of the present disclosure is hereinbefore described in detail with reference to FIG. 1 to FIG. 12. A method for processing a content request according to the embodiments of the present disclosure is hereinafter described in detail with reference to FIG. 13 and FIG. 14.

FIG. 13 is a schematic flowchart of a method 500 for processing a content request according to an embodiment of the present disclosure. The method may be executed by a routing node. As shown in FIG. 13, the method 500 includes the following:

S510. Receive a content request packet, where the content request packet carries a content name of requested content and container information of the requested content, where the container information of the requested content includes a container identifier used to identify a container that stores the requested content, where the container includes at least one routing node, where the requested content is capable of being routed in the container through one or more routing nodes in the at least one routing node, or the requested content is capable of being routed through the container.

S520. Determine a forwarding route for the content request packet according to the content name of the requested content and the container information of the requested content.

Therefore, according to the method for processing a content request in the embodiment of the present disclosure, container information of content is added on the basis of a content name to extend attributes of content in an ICN system, so that routing and forwarding are less dependent upon the content name. Therefore, routing entries in a routing table may be reduced, and it is possible to solve routing scalability and mobility problems and the like that are caused by the content name.

In the embodiment of the present disclosure, containers corresponding to the container identifiers included in the container information of the requested content which is carried in the content request packet constitute a container set of the requested content. The containers in the container set are storage spaces used to store a group of content.

The container set may include only one container or may also include more than two containers. Specifically, the container set may include only a home container of the requested content, or the container set may also further include an access container of a home container of the requested content, or the container set may further include all containers that store the requested content. The requested content may have one or more home containers. Correspondingly, the content name of the requested content may correspond to one or more home containers. The requested content can be routed in a home container corresponding to the content name of the requested content through one or more routing nodes included in the home container. The home container may also have one or more access containers. The requested content can be routed through the access container through one or more routing nodes included in the access container. Specifically, the content request packet can be routed to the home container through one or more routing nodes of the access container of the home container. Because a forwarding entry corresponding to the content name of the requested content exists in the home container, the requested content can be directly routed in the home container through one or more routing nodes in the home container. However, the embodiment of the present disclosure is not limited to this.

In addition, when the container set includes a home container of the requested content and an access container of the home container, the container in the container set may be an access container of one or more first other containers; and/or one or more second other containers are access containers of the container; where, the access container is a container including another container in a topological relationship and having a forwarding entry for routing the content request packet to the another container. Specifically, when a second container includes a first container and the second container has a forwarding entry for routing the content request packet to the first container, the second container is an access container of the first container. However, the embodiment of the present disclosure is not limited to this.

The container information of the requested content includes container information of each container in the container set, where the container information may include a container identifier of the container. Optionally, the container information may further include a resolution identifier, where the resolution identifier is used to identify whether the container is resolvable. However, the embodiment of the present disclosure is not limited to this.

Optionally, a tree with the content name of the requested content as a root node may be formed by the content name of the requested content and the container information of the requested content, where a child node of the root node represents container information of the home container of the requested content, and a container corresponding to container information represented by a first node is an access container of a container corresponding to container information represented by a parent node of the first node, where the first node is a node in the tree other than the root node and the child node of the root node. Optionally, a directed acyclic graph with the content name of the requested content as an entrance vertex may also be formed by the content name of the requested content and the container information of the requested content, where an endpoint of a directed edge originated from the entrance vertex represents container information of the home container of the requested content, and a container corresponding to container information represented by a second vertex in the directed acyclic graph is an access container of a container corresponding to container information represented by a first vertex, where the first vertex is a vertex in the directed acyclic graph other than the entrance vertex, and the second vertex is an endpoint of a directed edge originated from the first vertex.

Figure 14:
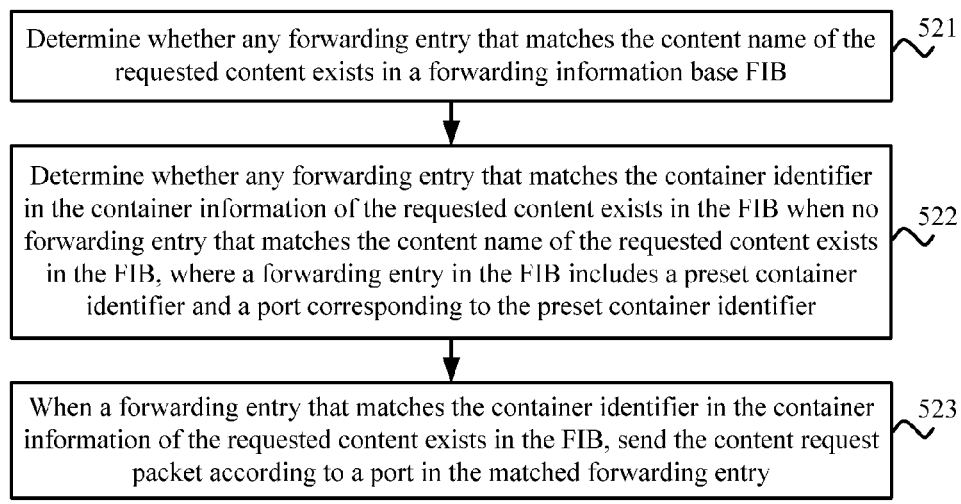
FIG. 14 is another schematic flowchart of a method for processing a content request according to an embodiment of the present disclosure.

The specific method for representing the two structures is not further described herein. For details, reference may be made to the above embodiment.

optionally, as shown in FIG. 14, in the embodiment of the present disclosure, in step S520, the determining a forwarding route for the content request packet according to the content name of the requested content and the container information of the requested content includes the following:

S521. Determine whether any forwarding entry that matches the content name of the requested content exists in a forwarding information base FIB.

S522. Determine whether any forwarding entry that matches the container identifier in the container information of the requested content exists in the FIB when no forwarding entry that matches the content name of the requested content exists in the FIB, where a forwarding entry in the FIB includes a preset container identifier and a port corresponding to the preset container identifier.

S523. When a forwarding entry that matches the container identifier in the container information of the requested content exists in the FIB, send the content request packet according to a port in the matched forwarding entry.

The routing node first matches a prefix of the content name of the requested content with content name prefixes in the forwarding entries of the FIB. When no forwarding entry that matches the content name of the requested content exists in the FIB, the routing node matches a container identifier of each container in the container set of the requested content and preset container identifiers in the forwarding entries of the FIB in turn. When a container identifier of at least one container in the container set matches a forwarding entry in the FIB, the routing node sends the content request packet according to a port in the matched forwarding entry. The specific matching method is not further described herein. For details, reference may be made to the above embodiment.

It should be understood that, the embodiment of the present disclosure extends only the content name of the content request packet, but a content name in a data packet still uses a name in an ICN system such as an NDN in the prior art and does not include any container. Therefore, the technical solution of the embodiment of the present disclosure may guarantee security of an existing ICN system such as an NDN.

Therefore, according to the method for processing a content request in the embodiment of the present disclosure, container information of content is added on the basis of a content name to extend attributes of content in an ICN system, so that routing and forwarding are less dependent upon the content name. Therefore, routing entries in a routing table may be reduced, and it is possible to solve routing scalability and mobility problems and the like that are caused by the content name.

Figure 15:
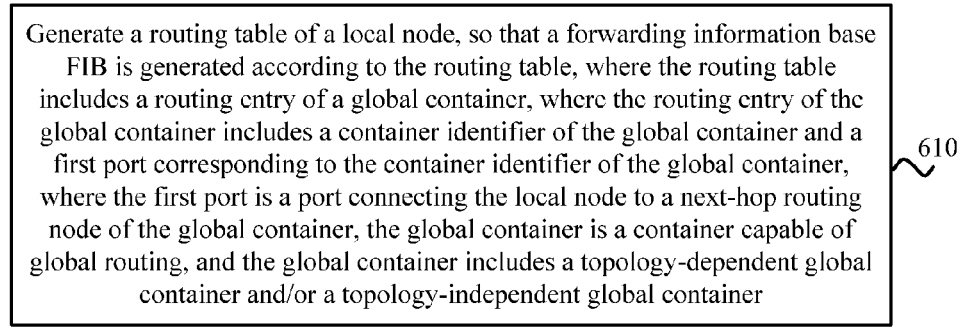
FIG. 15 is a schematic flowchart of a method for establishing a routing table according to an embodiment of the present disclosure.

FIG. 15 is a schematic flowchart of a method 600 for establishing a routing table according to an embodiment of the present disclosure. The method may be executed by any proper apparatus, for example, by a routing node, or by an independent apparatus for establishing a routing table, which is not limited by the embodiment of the present disclosure. For ease of description, a routing node that executes the method 600 or a routing node corresponding to a generated routing table is referred to as a local node hereinafter. As shown in FIG. 15, the method 600 includes the following:

S610. Generate a routing table of a local node, so that a forwarding information base FIB is generated according to the routing table, where the routing table includes a routing entry of a global container, where the routing entry of the global container includes a container identifier of the global container and a first port corresponding to the container identifier of the global container, where the first port is a port connecting the local node to a next-hop routing node of the global container, the global container is a container capable of global routing, and the global container includes a topology-dependent global container and/or a topology-independent global container.

Therefore, according to the method for establishing a routing table in the embodiment of the present disclosure, container information of content is added on the basis of a content name to extend attributes of content in an ICN system, so that routing and forwarding are less dependent upon the content name. Therefore, routing entries in a routing table may be reduced, and it is possible to solve routing scalability and mobility problems and the like that are caused by the content name.

Because the FIB is a subset of the routing table, the FIB of the local node may be generated according to the routing table generated in the embodiment of the present disclosure. The FIB may be a FIB in the method for routing and forwarding and the method for processing a content request according to the embodiments of the present disclosure. The FIB is specifically used to: when the local node receives the content request packet, match the content name of requested content which is carried in the content request packet and the container identifier in the container information with the forwarding entries in the FIB to determine a forwarding route for the content request packet.

In the embodiment of the present disclosure, all containers are classified into three types: topology-dependent container, topology-independent large container, and topology-independent small container. The topology-dependent container is a container forming a topological relationship with other containers, where the topological relationship includes: one upper-level container including one or more lower-level containers, and/or one lower-level container being included by one or more upper-level containers. When one container is one level away from another container, the container at a lower level is referred to as a lower-level container of the container at a higher level, and the container at the higher level is referred to as an upper-level container of the container at the lower level. The container at the lower level may be provided with an access service by its upper-level container, that is, the container at the higher level is an access container of the lower-level container.

The global container is a container capable of global routing, and includes a topology-dependent global container at the highest level in the topological relationship and a topology-independent large container. Other topology-dependent containers in the topological relationship than the topology-dependent global container are provided with access services by their upper-level containers, and topology-independent small containers may be provided with access services by topology-dependent containers. Correspondingly, routes may be classified into global routes and local routes, where global routes include routes of global containers, and local routes include routes of topology-dependent containers and routes of topology-independent small containers. Global routes may flood in the whole network, but local routes may flood only in a part of areas in the network, that is, routing tables of all routing nodes may include global routes, but routing tables of only a part of routing nodes include local routes. Specifically, routes of global containers may exist in a routing table of any routing node, but routes of other topology-dependent containers in the topological relationship than the global containers and routes of topology-independent small containers exist only in routing tables of routing nodes included by access containers thereof, and do not flood out of the access containers thereof.

The routing table of the local node may include a routing entry of a global container, where the routing entry of the global container includes a container identifier of the global container and a first port corresponding to the container identifier of the global container, where the first port is a port connecting the local node to a next-hop routing node of the global container.

Optionally, the routing table of the local node may further include a local route, that is, may further include a routing entry of a topology-dependent container and a routing entry of a topology-independent small container. Specifically, the routing table further includes a routing entry of the topology-dependent container, for routing based on the topology-dependent container, and the routing entry of the topology-dependent container is used, so that a route of a lower-level container of a home container of the local node is used as an internal route of the local node and does not flood out of the home container of the local node.

Optionally, the routing entry of the topology-dependent container includes a lower-level container identifier of the lower-level container relative to the home container of the local node and a second port corresponding to the lower-level container identifier, where the second port is a port connecting the local node to the lower-level container; and the using the routing entry of the topology-dependent container, so that a route of a lower-level container of a home container of the local node is used as an internal route of the local node and does not flood out of the home container of the local node, includes:

using the lower-level container identifier and the second port corresponding to the lower-level container identifier in the routing entry of the topology-dependent container, so that the route of the lower-level container of the home container of the local node is used as an internal route of the local node and does not flood out of the home container of the local node.

Optionally, a container identifier corresponding to the topology-dependent container is capable of reflecting a level of the topology-dependent container, thereby indicating the topological relationship between the topology-dependent container and other containers.

Optionally, the routing table further includes a routing entry of a topology-independent small container. The routing entry of the topology-independent small container includes a container identifier of the topology-independent small container and a third port corresponding to the container identifier of the topology-independent small container, where the third port is a port connecting the local node to a next-hop routing node of the topology-independent small container.

Optionally, according to the actual application or deployment policy requirements, some topology-independent large containers may also be provided with access services by topology-dependent containers. In this case, the topology-independent large containers are used as internal routes of access containers of the topology-independent large containers and do not need to flood out of the access containers. However, the embodiment of the present disclosure is not limited to this.

Therefore, in the embodiment of the present disclosure, the number of routing entries of the core routing table is basically equal to "the number of routes of the topology-dependent global containers" plus "the number of routes of the topology-independent global containers". Because the numbers of routes of the two types are small, the total size of the routing table may be even smaller than the number of entries of the core routing table in a present Internet router. Therefore, in the embodiment of the present disclosure, container information of content is added on the basis of the content name to extend attributes of content in an ICN system, and the route of the topology-independent container with light access traffic is restricted within the topology-dependent container providing the access service for the topology-independent small container, and the route of the lower-level container of the topology-dependent container is restricted within the topology-dependent container; therefore, the number of entries of a core routing table is reduced greatly, and the routing scalability problem in an existing ICN system such as an NDN is solved effectively.

The method for routing and forwarding, the method for processing a content request, and the method for establishing a routing table according to the embodiments of the present disclosure are hereinbefore described in detail with reference to FIG. 1 to FIG. 15 from the perspective of a routing node. A method for acquiring content according to the embodiments of the present disclosure is hereinafter described in detail with reference to FIG. 16 to FIG. 18 from the perspective of a user equipment.

Figure 16:
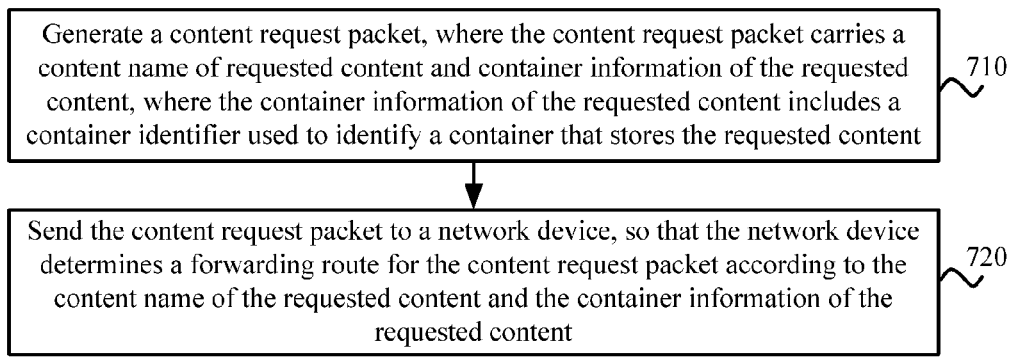
FIG. 16 is a schematic flowchart of a method for acquiring content according to an embodiment of the present disclosure.

FIG. 16 is a schematic flowchart of a method 700 for acquiring content according to an embodiment of the present disclosure. The method may be executed by a user equipment. As shown in FIG. 16, the method 700 includes the following:

S710. Generate a content request packet, where the content request packet carries a content name of requested content and container information of the requested content, where the container information of the requested content includes a container identifier used to identify a container that stores the requested content.

S720. Send the content request packet to a network device, so that the network device determines a forwarding route for the content request packet according to the content name of the requested content and the container information of the requested content.

Therefore, according to the method for acquiring content in the embodiment of the present disclosure, container information of content is added on the basis of a content name to extend attributes of content in an ICN system, so that routing and forwarding are less dependent upon the content name. Therefore, routing entries in a routing table may be reduced, and it is possible to solve routing scalability and mobility problems and the like that are caused by the content name.

In step S710, in the embodiment of the present disclosure, containers corresponding to the container identifiers included in the container information of the requested content which is carried in the content request packet constitute a container set of the requested content. The containers in the container set are storage spaces used to store a group of content.

The container set may include only one container or may also include more than two containers. Specifically, the container set may include only a home container of the requested content, or the container set may also further include an access container of a home container of the requested content, or the container set may further include all containers that store the requested content. The requested content may have one or more home containers. Correspondingly, the content name of the requested content may correspond to one or more home containers. The requested content can be routed in a home container corresponding to the content name of the requested content through one or more routing nodes included in the home container. The home container may also have one or more access containers. The requested content can be routed through the access container through one or more routing nodes included in the access container. Specifically, the content request packet can be routed to the home container through one or more routing nodes of the access container of the home container. Because a forwarding entry corresponding to the content name of the requested content exists in the home container, the requested content can be directly routed in the home container through one or more routing nodes in the home container. However, the embodiment of the present disclosure is not limited to this.

In addition, when the container set includes a home container of the requested content and an access container of the home container, the container in the container set may be an access container of one or more first other containers; and/or one or more second other containers are access containers of the container; where, the access container is a container including another container in a topological relationship and having a forwarding entry for routing the content request packet to the another container. Specifically, when a second container includes a first container and the second container has a forwarding entry for routing the content request packet to the first container, the second container is an access container of the first container. However, the embodiment of the present disclosure is not limited to this.

The container information of the requested content includes container information of each container in the container set, where the container information may include a container identifier of the container. Optionally, the container information may further include a resolution identifier, where the resolution identifier is used to identify whether the container is resolvable. However, the embodiment of the present disclosure is not limited to this.

Figure 17:
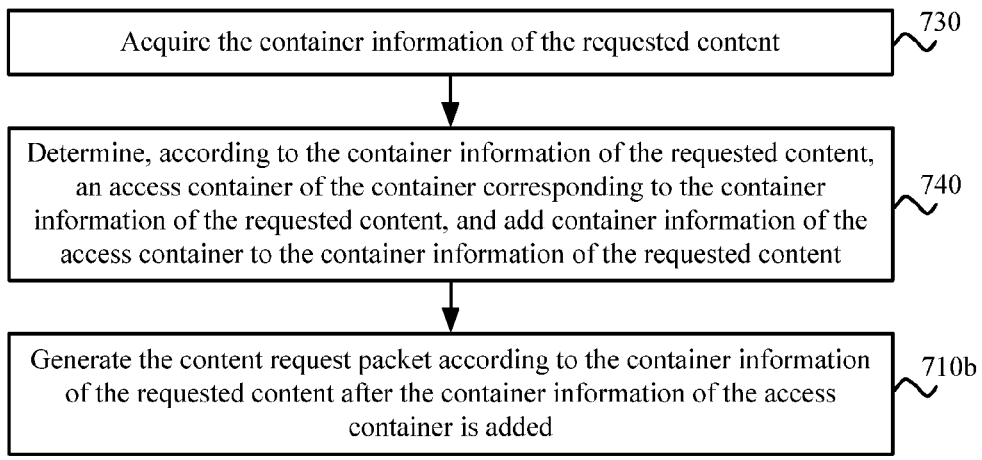
FIG. 17 is another schematic flowchart of a method for acquiring content according to an embodiment of the present disclosure.

Optionally, in the embodiment of the present disclosure, as shown in FIG. 17, before step S710, the method 700 further includes the following:

S730. Acquire the container information of the requested content.

Correspondingly, step S710 of generating a content request packet includes the following:

S710a. Generate the content request packet according to the acquired container information of the requested content.

Therefore, according to the method for acquiring content in the embodiment of the present disclosure, container information of content is added on the basis of a content name to extend attributes of content in an ICN system, so that routing and forwarding are less dependent upon the content name. Therefore, routing entries in a routing table may be reduced, and it is possible to solve routing scalability and mobility problems and the like that are caused by the content name.

Optionally, the container identifier in the acquired container information of the requested content may correspond to a resolvable container. The user equipment may query a resolution system and resolve the resolvable container to acquire an access container of the resolvable container, and add container information of the access container of the resolvable container to the container information of the requested content. Therefore, optionally, as shown in FIG. 17, in another embodiment, the method 700 further includes the following:

S740. Determine, according to the container information of the requested content, an access container of the container corresponding to the container information of the requested content, and add container information of the access container to the container information of the requested content.

Correspondingly, step S710 of generating a content request packet includes the following:

S710b. Generate the content request packet according to the container information of the requested content after the container information of the access container is added.

Figure 18:
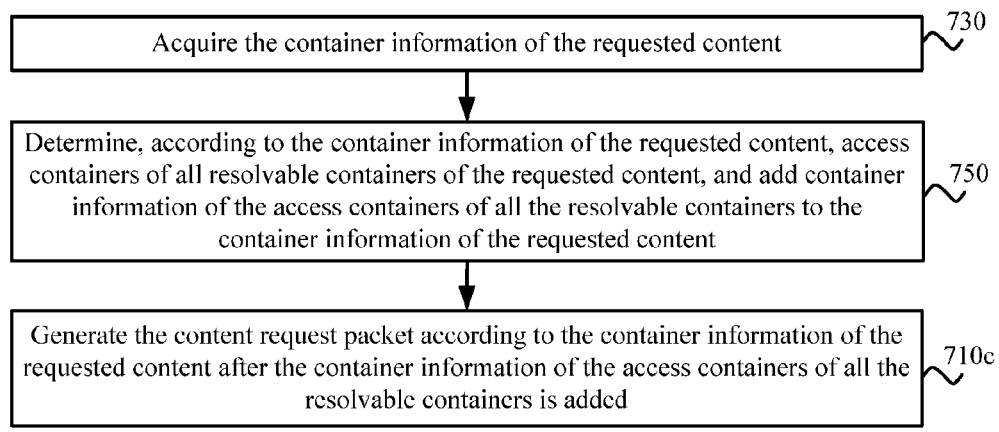
FIG. 18 is another schematic flowchart of a method for acquiring content according to an embodiment of the present disclosure.

Optionally, the user equipment may further continue to determine whether the access container acquired by resolution is resolvable, and when the access container is resolvable, resolve the access container to acquire an access container of the access container. The process is cyclic and repeated until an access container acquired by resolution is irresolvable. Up to now, complete resolution for the container corresponding to the container identifier in the container information is ended. Therefore, optionally, as shown in FIG. 18, in another embodiment, the method 700 further includes the following:

S750. Determine, according to the container information of the requested content, access containers of all resolvable containers of the requested content, and add container information of the access containers of all the resolvable containers to the container information of the requested content.

Correspondingly, step S710 of generating a content request packet includes the following:

S710c. Generate the content request packet according to the container information of the requested content after the container information of the access containers of all the resolvable containers is added.

Therefore, according to the method for acquiring content in the embodiment of the present disclosure, container information of content is added on the basis of a content name to extend attributes of content in an ICN system, so that routing and forwarding are less dependent upon the content name. Therefore, routing entries in a routing table may be reduced, and it is possible to solve routing scalability and mobility problems and the like that are caused by the content name. In addition, because the user equipment adds the access container of the resolvable container to the content request packet, the number of times of resolving the container by the routing node can be reduced when the routing node forwards the content request packet or the number of times of resolution is reduced to zero, thereby speeding up the forwarding of the content request packet.

The method for acquiring content according to the embodiments of the present disclosure is hereinbefore described in detail with reference to FIG. 16 to FIG. 18 from the perspective of a user equipment. A method for publishing content according to the embodiments of the present disclosure is hereinafter described in detail with reference to FIG. 19 and FIG. 20 from the perspective of a content publisher.

Figure 19:
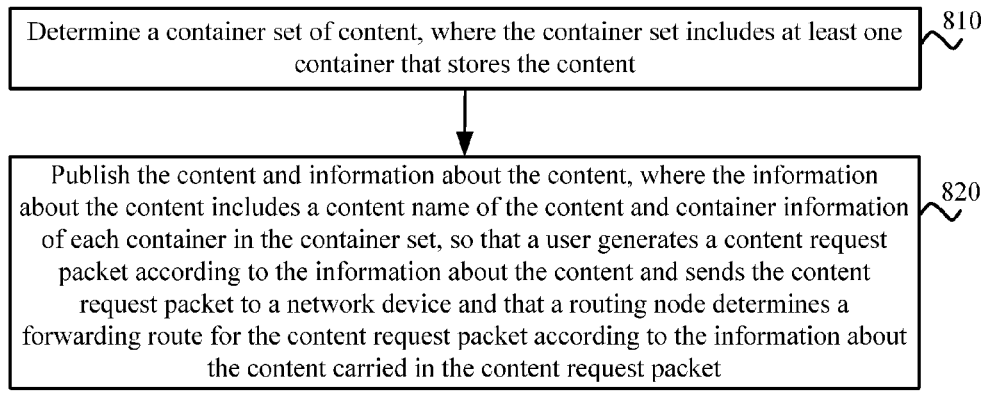
FIG. 19 is a schematic flowchart of a method for publishing content according to an embodiment of the present disclosure.

FIG. 19 is a schematic flowchart of a method 800 for publishing content according to an embodiment of the present disclosure. The method may be executed by any proper apparatus, for example, by a content publisher, or by an independent apparatus for publishing content, which is not limited by the embodiment of the present disclosure. The following uses an example in which the method is executed by a content publisher for description. As shown in FIG. 19, the method 800 includes the following:

S810. Determine a container set of content and container information of each container in the container set, where the container set includes at least one container that stores the content.

S820. Publish the content and information about the content, where the information about the content includes a content name of the content and the container information of each container in the container set, so that a user equipment generates a content request packet according to the information about the content and sends the content request packet to a network device and that a routing node determines a forwarding route for the content request packet according to the information about the content carried in the content request packet.

Therefore, according to the method for publishing content in the embodiment of the present disclosure, container information of content is added on the basis of a content name to extend attributes of content in an ICN system, so that routing and forwarding are less dependent upon the content name. Therefore, routing entries in a routing table may be reduced, and it is possible to solve routing scalability and mobility problems and the like that are caused by the content name.

In step S810, the containers in the container set are storage spaces used to store a group of content.

The container set may include only one container or may also include more than two containers. Specifically, the container set may include only a home container of the requested content, where the requested content may have one or more home containers. Correspondingly, the content name of the requested content may correspond to one or more home containers. The requested content can be routed in a home container corresponding to the content name of the requested content through one or more routing nodes included in the home container. The home container may also have one or more access containers. The requested content can be routed through the access container through one or more routing nodes included in the access container. Specifically, the content request packet can be routed to the home container through one or more routing nodes of the access container of the home container. Because a forwarding entry corresponding to the content name of the requested content exists in the home container, the requested content can be directly routed in the home container through one or more routing nodes in the home container. However, the embodiment of the present disclosure is not limited to this.

Optionally, when the one or more access containers of the home container may remain unchanged for a long time, the container set may also further include an access container of the home container of the requested content. Optionally, the container set may further include all containers that store the requested content. The container information of the requested content includes container information of each container in the container set, where the container information may include a container identifier of a container.

Figure 20:
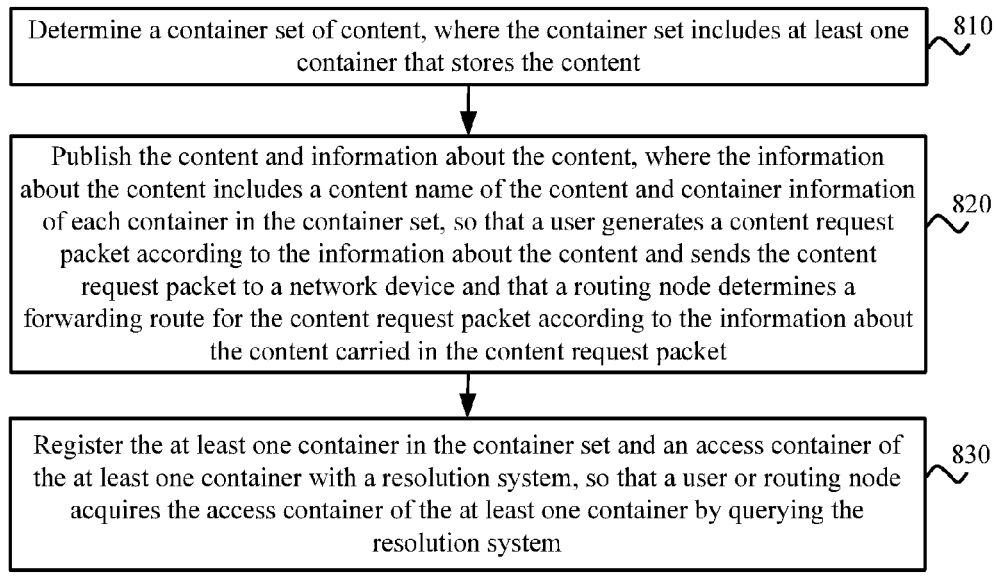
FIG. 20 is another schematic flowchart of a method for publishing content according to an embodiment of the present disclosure.

However, when an access container of at least one container in the container set changes frequently, the content publisher may not include the access container of the at least one container into the container set, so as to ensure persistence of the container set. In addition, the content publisher may further register correspondence between the at least one container and the access container of the at least one container with a resolution system, so that the at least one container is set as a resolvable container. The at least one container may notify the resolution system of the change of the access container in real time, and the user equipment and routing node query the resolution system to acquire the access container of the at least one container. Therefore, not only persistence of the container set of the content is ensured, but also flexibility of content routing is kept. Therefore, optionally, as shown in FIG. 20, the method 800 further includes the following:

S830. Register the at least one container in the container set and an access container of the at least one container with a resolution system, so that a user or routing node acquires the access container of the at least one container by querying the resolution system.

In this case, optionally, the container information may further include a resolution identifier, where the resolution identifier is used to identify whether the container is resolvable, which is not limited by the embodiment of the present disclosure.

Therefore, according to the method for publishing content in the embodiment of the present disclosure, container information of content is added on the basis of a content name to extend attributes of content in an ICN system, so that routing and forwarding are less dependent upon the content name. Therefore, routing entries in a routing table may be reduced, and it is possible to solve routing scalability and mobility problems and the like that are caused by the content name.

It should be understood that, the values of the sequence numbers in the above processes do not mean the execution sequence; the execution sequence of each process should be determined by the function and internal logic of the process, and shall not be construed as a limitation to the implementation process of the embodiment of the present disclosure.

The method for routing and forwarding, the method for processing a content request, the method for establishing a routing table, the method for acquiring content, and the method for publishing content according to the embodiments of the present disclosure are hereinbefore described in detail with reference to FIG. 1 to FIG. 20. A router, an apparatus for establishing a routing table, a user equipment, and an apparatus for publishing content according to the embodiments of the present disclosure are hereinafter described in detail with reference to FIG. 21 to FIG. 40.

Figure 21:
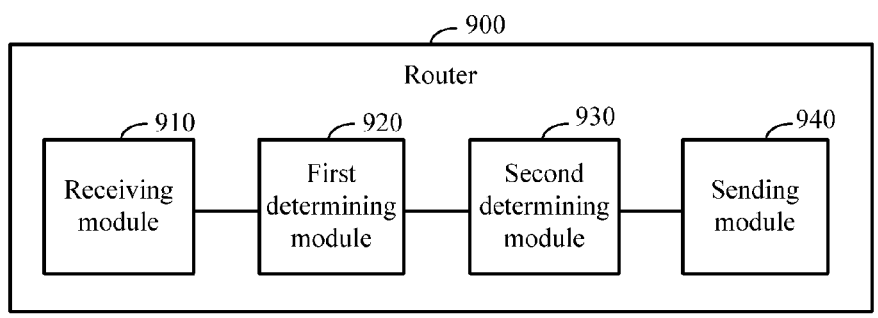
FIG. 21 is a schematic block diagram of a router according to an embodiment of the present disclosure.

FIG. 21 is a schematic block diagram of a router 900 according to an embodiment of the present disclosure, including:

a receiving module 910, configured to receive a content request packet, where the content request packet carries a content name of requested content and container information of the requested content, where the container information of the requested content includes a container identifier used to identify a container that stores the requested content;

a first determining module 920, configured to determine whether any forwarding entry that matches the content name of the requested content which is carried in the content request packet received by the receiving module 910 exists in a forwarding information base FIB;

a second determining module 930, configured to: when the first determining module 920 determines that no forwarding entry that matches the content name of the requested content exists in the FIB, determine whether any forwarding entry that matches the container identifier in the container information of the requested content exists in the FIB, where a forwarding entry in the FIB includes a preset container identifier and a port corresponding to the preset container identifier; and a sending module 940, configured to: when the second determining module 930 determines that a forwarding entry that matches the container identifier in the container information of the requested content exists in the FIB, send the content request packet according to a port in the matched forwarding entry.

Therefore, according to the router in the embodiment of the present disclosure, container information of content is added on the basis of a content name to extend attributes of content in an ICN system, so that routing and forwarding are less dependent upon the content name. Therefore, routing entries in a routing table may be reduced, and it is possible to solve routing scalability and mobility problems and the like that are caused by the content name.

In the embodiment of the present disclosure, the content request packet received by the receiving module 910 may carry container information of only one container, or may also carry container information of more than two containers, which is not limited by the embodiment of the present disclosure.

The container is a storage space used to store a group of content. The group of content includes one or more pieces of content. The container includes at least one routing node, where the requested content is capable of being routed in the container through one or more routing nodes in the at least one routing node, or the requested content is capable of being routed through the container. The container corresponds to one or more content names, where the content name of the requested content corresponds to one or more home containers, and the requested content can be routed in the home container corresponding to the content name of the requested content. The container is an access container of one or more first other containers; and/or one or more second other containers are access containers of the container; where, the access container is a container including another container in a topological relationship and having a forwarding entry for routing the content request packet to the another container. Specifically, when a second container includes a first container and the second container has a forwarding entry for routing the content request packet to the first container, the second container is an access container of the first container.

Figure 22:
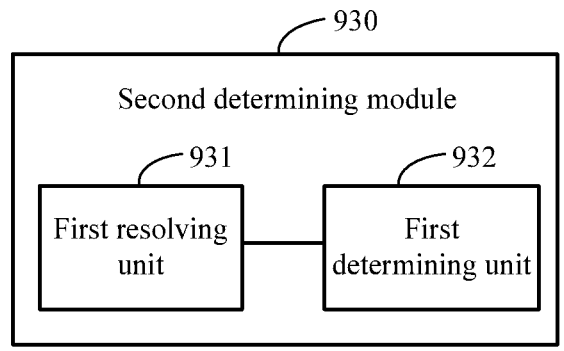
FIG. 22 is a schematic block diagram of a second determining module of a router according to an embodiment of the present disclosure.

In the embodiment of the present disclosure, container information of the container includes a container identifier of the container. Optionally, the container information further includes a resolution identifier corresponding to the container identifier, where the resolution identifier is used to identify whether the container corresponding to the container identifier is resolvable. As shown in FIG. 22, the second determining module 930 includes:

a first resolving unit 931, configured to acquire, by resolution according to the resolution identifier, container identifiers of access containers of all resolvable containers of the requested content; and a first determining unit 932, specifically configured to match the container identifier in the container information of the requested content and the container identifiers of the access containers of all the resolvable containers of the requested content which are acquired by resolution by the first resolving unit 931 with the preset container identifiers in the FIB to determine whether any forwarding entry that matches the container identifier in the container information of the requested content and the container identifier of the access container exists in the FIB.

Optionally, the router further includes:

a first adding module 945, configured to add container information, which is acquired by resolution by the first resolving unit 931, of the access containers of all the resolvable containers of the requested content, to the container information of the requested content.

Therefore, according to the router in the embodiment of the present disclosure, container information of content is added on the basis of a content name to extend attributes of content in an ICN system, so that routing and forwarding are less dependent upon the content name. Therefore, routing entries in a routing table may be reduced, and it is possible to solve routing scalability and mobility problems and the like that are caused by the content name.

Figure 23:
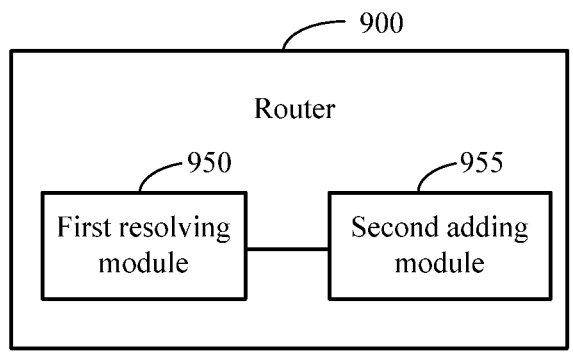
FIG. 23 is another schematic block diagram of a router according to an embodiment of the present disclosure.

Optionally, in another embodiment, the container information further includes a resolution identifier corresponding to the container identifier, where the resolution identifier is used to identify whether the container corresponding to the container identifier is resolvable. As shown in FIG. 23, the router 900 further includes:

a first resolving module 950, configured to: when the second determining module 930 determines that no forwarding entry that matches the container identifier in the container information of the requested content exists in the FIB, acquire, by resolution according to the resolution identifier, a container identifier of an access container of the container; where the second determining module 930 is further configured to match the container identifier of the access container which is acquired by resolution by the first resolving module 950, with the preset container identifiers in the FIB to determine whether any forwarding entry that matches the container identifier of the access container which is acquired by resolution exists in the FIB.

Optionally, as shown in FIG. 23, in another embodiment, the router 900 further includes:

a second adding module 955, configured to add container information of the access container which is acquired by resolution by the first resolving module 950, to the container information of the requested content.

Optionally, in another embodiment, the forwarding entries in the FIB include content name prefixes and ports corresponding to the content name prefixes. Correspondingly, the first determining module 920 is specifically configured to determine, according to whether a prefix of the content name of the requested content matches any content name prefix in the forwarding entries in the FIB, whether any forwarding entry that matches the content name of the requested content exists in the FIB; and the sending module 940 is configured to: when the first determining module 920 determines that a forwarding entry that matches the content name of the requested content exists in the FIB, send the content request packet according to a port in the matched forwarding entry.

Figure 24:
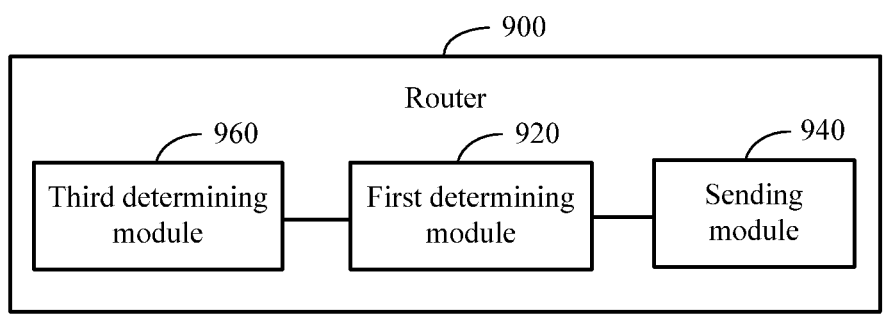
FIG. 24 is still another schematic block diagram of a router according to an embodiment of the present disclosure.

Optionally, as shown in FIG. 24, in another embodiment, the router 900 further includes:

a third determining module 960, configured to: before the first determining module 920 determines whether any forwarding entry that matches the content name of the requested content exists in the FIB, determine whether any content that matches the content name of the requested content exists in a content store table CS; where the sending module 940 is further configured to: when the third determining module 960 determines that content that matches the content name of the requested content exists in the CS, send the matched content to a sender of the content request packet; and the first determining module 920 is further configured to: when the third determining module 960 determines that no content that matches the content name of the requested content exists in the CS, perform the step of determining whether any forwarding entry that matches the content name of the requested content exists in the FIB.

Figure 25:
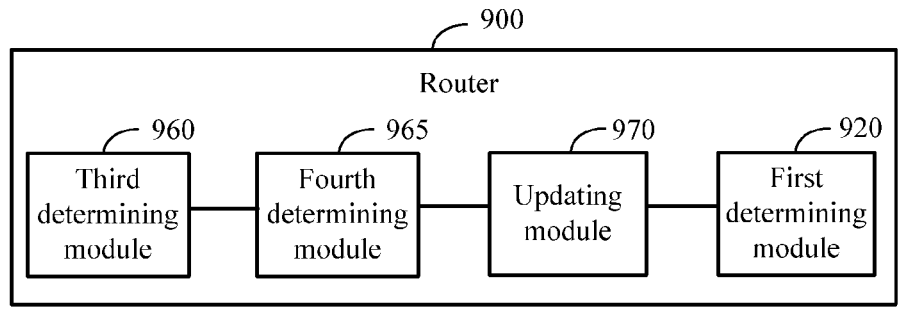
FIG. 25 is still another schematic block diagram of a router according to an embodiment of the present disclosure.

Optionally, as shown in FIG. 25, in another embodiment, the router 900 further includes:

a fourth determining module 965, configured to: when the third determining module 960 determines that no content that matches the content name of the requested content exists in the CS, determine whether any PIT entry that matches the content name of the requested content exists in a pending information table PIT; and an updating module 970, configured to: when the fourth determining module 965 determines that a PIT entry that matches the content name of the requested content exists in the PIT, add a port corresponding to the sender of the content request packet to the matched PIT entry; where the first determining module 920 is further configured to: when the fourth determining module 965 determines that no PIT entry that matches the content name of the requested content exists in the PIT, perform the step of determining whether any forwarding entry that matches the content name of the requested content exists in the FIB.

Optionally, in another embodiment, the sending module 940 is further configured to send the content request packet according to a default port when no forwarding entry that matches the container identifier in the container information of the requested content exists in the FIB; or the router 900 further includes:

a discarding module 975, configured to discard the content request packet when no forwarding entry that matches the container identifier in the container information of the requested content exists in the FIB.

Therefore, according to the router in the embodiment of the present disclosure, container information of content is added on the basis of a content name to extend attributes of content in an ICN system, so that routing and forwarding are less dependent upon the content name. Therefore, routing entries in a routing table may be reduced, and it is possible to solve routing scalability and mobility problems and the like that are caused by the content name.

In the embodiment of the present disclosure, all containers are classified into three types: topology-dependent container, topology-independent large container, and topology-independent small container. The topology-dependent container is a container forming a topological relationship with other containers, where the topological relationship includes: one upper-level container including one or more lower-level containers, and/or one lower-level container being included by one or more upper-level containers. When one container is one level away from another container, the container at a lower level is referred to as a lower-level container of the container at a higher level, and the container at the higher level is referred to as an upper-level container of the container at the lower level. The container at the lower level may be provided with an access service by its upper-level container, that is, the container at the higher level is an access container of the lower-level container.

The global container is a container capable of global routing, and includes a topology-dependent global container at the highest level in the topological relationship and a topology-independent large container. Other topology-dependent containers in the topological relationship than the topology-dependent global container are provided with access services by their upper-level containers, and topology-independent small containers may be provided with access services by topology-dependent containers. Correspondingly, routes of global containers may exist in a routing table of any routing node, but routes of other topology-dependent containers in the topological relationship than the global containers and routes of topology-independent small containers exist only in routing tables of routing nodes included by access containers thereof, and do not flood out of the access containers thereof.

Optionally, in the embodiment of the present disclosure, the FIB includes a forwarding entry of a global container, where the forwarding entry of the global container includes a container identifier of the global container and a first port corresponding to the container identifier of the global container, where the first port is a port connecting a local node to a next-hop routing node of the global container, the global container is a container capable of global routing, and the global container includes a topology-dependent global container and/or a topology-independent global container.

Optionally, the FIB further includes a forwarding entry of the topology-dependent container, for routing based on the topology-dependent container, and the forwarding entry of the topology-dependent container is used, so that a route of a lower-level container of a home container of the local node is used as an internal route of the local node and does not flood out of the home container of the local node;

where the topology-dependent container is a container forming a topological relationship with other containers, where the topological relationship includes: one upper-level container including one or more lower-level containers, and/or one lower-level container being included by one or more upper-level containers.

Optionally, the forwarding entry of the topology-dependent container includes a container identifier of the lower-level container relative to the home container of the local node and a second port corresponding to the container identifier of the lower-level container, where the second port is a port connecting the local node to the lower-level container; and correspondingly, the using the forwarding entry of the topology-dependent container, so that a route of a lower-level container of a home container of the local node is used as an internal route of the local node and does not flood out of the home container of the local node, includes:

using the container identifier of the lower-level container and the second port corresponding to the container identifier of the lower-level container in the forwarding entry of the topology-dependent container, so that the route of the lower-level container of the home container of the local node is used as an internal route of the local node and does not flood out of the home container of the local node.

Optionally, a container identifier corresponding to the topology-dependent container is capable of reflecting a level of the topology-dependent container, thereby indicating the topological relationship formed between the topology-dependent container and other containers.

Optionally, the FIB further includes a forwarding entry of a topology-independent small container. The forwarding entry of the topology-independent small container includes a container identifier of the topology-independent small container and a third port corresponding to the container identifier of the topology-independent small container, where the third port is a port connecting the local node to a next-hop routing node of the topology-independent small container.

Therefore, in the embodiment of the present disclosure, container information of content is added on the basis of the content name to extend attributes of content in an ICN system, and the route of the topology-independent small container is restricted within the topology-dependent container providing the access service for the topology-independent small container, and the route of the lower-level container of the topology-dependent container is restricted within the topology-dependent container; therefore, the number of entries of a core routing table is reduced greatly, and the routing scalability problem in an existing ICN system such as an NDN is solved effectively.

The router 900 according to the embodiment of the present disclosure may correspond to the apparatus in the method for routing and forwarding according to the embodiment of the present disclosure, and the above and other operations and/or functions of the modules in the router 900 are respectively used to implement the corresponding procedures of each method in FIG. 1 to FIG. 12, and are not further described herein for brevity.

Therefore, according to the router in the embodiment of the present disclosure, container information of content is added on the basis of a content name to extend attributes of content in an ICN system, so that routing and forwarding are less dependent upon the content name. Therefore, routing entries in a routing table may be reduced, and it is possible to solve routing scalability and mobility problems and the like that are caused by the content name.

Figure 26:
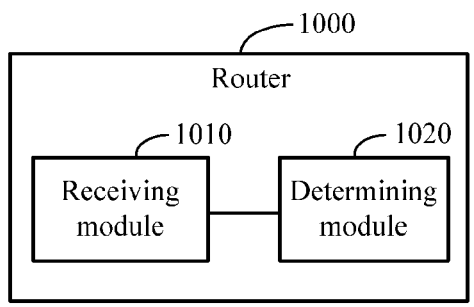
FIG. 26 is a schematic block diagram of a router according to another embodiment of the present disclosure.

FIG. 26 is a schematic block diagram of a router 1000 according to another embodiment of the present disclosure. As shown in FIG. 26, the router 1000 includes:

a receiving module 1010, configured to receive a content request packet, where the content request packet carries a content name of requested content and container information of the requested content, where the container information of the requested content includes a container identifier used to identify a container that stores the requested content, where the container includes at least one routing node, where the requested content is capable of being routed in the container through one or more routing nodes in the at least one routing node, or the requested content is capable of being routed through the container; and a determining module 1020, configured to determine a forwarding route for the content request packet according to the content name of the requested content and the container information of the requested content which are carried in the content request packet received by the receiving module 1010.

Therefore, according to the router in the embodiment of the present disclosure, container information of content is added on the basis of a content name to extend attributes of content in an ICN system, so that routing and forwarding are less dependent upon the content name. Therefore, routing entries in a routing table may be reduced, and it is possible to solve routing scalability and mobility problems and the like that are caused by the content name.

In the embodiment of the present disclosure, the content request packet may carry container information of only one container, or may also carry container information of more than two containers, which is not limited by the embodiment of the present disclosure. The container information of the container includes a container identifier of the container. Optionally, the container information of the container may further include a resolution identifier of the container, which is not limited by the embodiment of the present disclosure.

The container is a storage space used to store a group of content. Optionally, the content name of the requested content corresponds to one or more home containers, where a home container of the requested content is a container that is capable of directly routing the requested content. A forwarding entry corresponding to the content name of the requested content exists in the home container.

Optionally, the container is an access container of one or more first other containers; and/or one or more second other containers are access containers of the container; where, the access container is a container including another container in a topological relationship and having a forwarding entry for routing the content request packet to the another container. Specifically, when a second container includes a first container and the second container has a forwarding entry for routing the content request packet to the first container, the second container is an access container of the first container.

Figure 27:
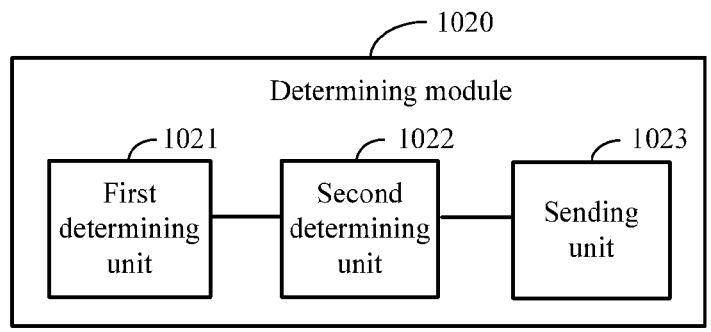
FIG. 27 is a schematic block diagram of a determining module of a router according to another embodiment of the present disclosure.

Optionally, in the embodiment of the present disclosure, as shown in FIG. 27, the determining module 1020 includes:

a first determining unit 1021, configured to determine whether any forwarding entry that matches the content name of the requested content exists in a forwarding information base FIB;

a second determining unit 1022, configured to: when the first determining unit 1021 determines that no forwarding entry that matches the content name of the requested content exists in the FIB, determine whether any forwarding entry that matches the container identifier in the container information of the requested content exists in the FIB, where a forwarding entry in the FIB includes a preset container identifier and a port corresponding to the preset container identifier; and a sending unit 1023, configured to: when the second determining unit 1022 determines that a forwarding entry that matches the container identifier in the container information of the requested content exists in the FIB, send the content request packet according to a port in the matched forwarding entry.

Optionally, a tree with the content name of the requested content as a root node is formed by the content name of the requested content and the container information of the requested content, where a child node of the root node represents container information of the home container of the requested content, and a container corresponding to container information represented by a first node is an access container of a container corresponding to container information represented by a parent node of the first node, where the first node is a node in the tree other than the root node and the child node of the root node.

Optionally, in another embodiment, a directed acyclic graph with the content name of the requested content as an entrance vertex is formed by the content name of the requested content and the container information of the requested content, where an endpoint of a directed edge originated from the entrance vertex represents container information of the home container of the requested content, and a container corresponding to container information represented by a second vertex in the directed acyclic graph is an access container of a container corresponding to container information represented by a first vertex, where the first vertex is a vertex in the directed acyclic graph other than the entrance vertex, and the second vertex is an endpoint of a directed edge originated from the first vertex.

Correspondingly, in the content request packet, the tree structure or directed acyclic graph structure may be represented in a text format, which is not limited by the embodiment of the present disclosure.

The router 1000 according to the embodiment of the present disclosure may correspond to the router in the method for processing a content request according to the embodiment of the present disclosure, and the above and other operations and/or functions of the modules in the router 1000 are respectively used to implement the corresponding procedures of each method in FIG. 13 and FIG. 14, and are not further described herein for brevity.

Therefore, according to the router in the embodiment of the present disclosure, container information of content is added on the basis of a content name to extend attributes of content in an ICN system, so that routing and forwarding are less dependent upon the content name. Therefore, routing entries in a routing table may be reduced, and it is possible to solve routing scalability and mobility problems and the like that are caused by the content name.

Figure 28:
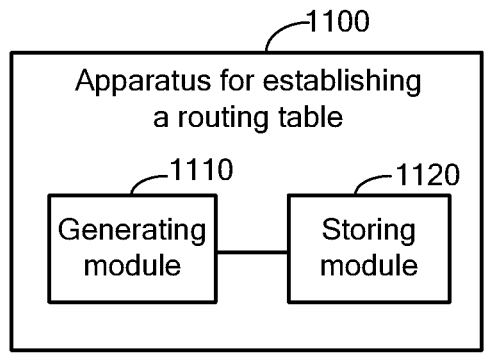
FIG. 28 is a schematic block diagram of an apparatus for establishing a routing table according to an embodiment of the present disclosure.

FIG. 28 is a schematic block diagram of an apparatus 1100 for establishing a routing table according to an embodiment of the present disclosure. The apparatus may be a router, or may also be an independent apparatus in a network, which is not limited by the embodiment of the present disclosure. As shown in FIG. 28, the apparatus 1100 includes:

a generating module 1110, configured to generate a routing table of a local node, so that a forwarding information base FIB is generated according to the routing table, where the routing table includes a routing entry of a global container, where the routing entry of the global container includes a container identifier of the global container and a first port corresponding to the container identifier of the global container, where the first port is a port connecting the local node to a next-hop routing node of the global container, the global container is a container capable of global routing, and the global container includes a topology-dependent global container and/or a topology-independent global container; and a storing module 1120, configured to store the routing table generated by the generating module 1110.

Because the FIB is a subset of the routing table, a FIB of the local node may be generated according to the routing table generated in the embodiment of the present disclosure. The FIB may be a FIB in the method for routing and forwarding and the method for processing a content request according to the embodiments of the present disclosure. The FIB is specifically used to: when the local node receives the content request packet, match the content name of requested content which is carried in the content request packet and the container identifier in the container information with the forwarding entries in the FIB to determine a forwarding route for the content request packet.

In the embodiment of the present disclosure, all containers are classified into three types: topology-dependent container, topology-independent large container, and topology-independent small container. The topology-dependent container is a container forming a topological relationship with other containers, where the topological relationship includes: one upper-level container including one or more lower-level containers, and/or one lower-level container being included by one or more upper-level containers. When one container is one level away from another container, the container at a lower level is referred to as a lower-level container of the container at a higher level, and the container at the higher level is referred to as an upper-level container of the container at the lower level. The container at the lower level may be provided with an access service by its upper-level container, that is, the container at the higher level is an access container of the lower-level container.

The global container is a container capable of global routing, and includes a topology-dependent global container at the highest level in the topological relationship and a topology-independent large container. Other topology-dependent containers in the topological relationship than the topology-dependent global container are provided with access services by their upper-level containers, and topology-independent small containers may be provided with access services by topology-dependent containers. Correspondingly, routes of global containers may exist in a routing table of any routing node, but routes of other topology-dependent containers in the topological relationship than the global containers and routes of topology-independent small containers exist only in routing tables of routing nodes included by access containers thereof, and do not flood out of the access containers thereof.

The routing table of the local node may include a routing entry of a global container, where the routing entry of the global container includes a container identifier of the global container and a first port corresponding to the container identifier of the global container, where the first port is a port connecting the local node to a next-hop routing node of the global container.

Optionally, the routing table of the local node may further include a local route, that is, may further include a routing entry of a topology-dependent container and a routing entry of a topology-independent small container. Specifically, the routing table further includes a routing entry of the topology-dependent container, for routing based on the topology-dependent container, and the routing entry of the topology-dependent container is used, so that a route of a lower-level container of a home container of the local node is used as an internal route of the local node and does not flood out of the home container of the local node.

Optionally, the routing entry of the topology-dependent container includes a lower-level container identifier of the lower-level container relative to the home container of the local node and a second port corresponding to the lower-level container identifier, where the second port is a port connecting the local node to the lower-level container; and the using the routing entry of the topology-dependent container, so that a route of a lower-level container of a home container of the local node is used as an internal route of the local node and does not flood out of the home container of the local node, includes:

using the lower-level container identifier and the second port corresponding to the lower-level container identifier in the routing entry of the topology-dependent container, so that the route of the lower-level container of the home container of the local node is used as an internal route of the local node and does not flood out of the home container of the local node.

Optionally, a container identifier corresponding to the topology-dependent container is capable of reflecting a level of the topology-dependent container, thereby indicating the topological relationship between the topology-dependent container and other containers.

Optionally, the routing table further includes a routing entry of a topology-independent small container. The routing entry of the topology-independent small container includes a container identifier of the topology-independent small container and a third port corresponding to the container identifier of the topology-independent small container, where the third port is a port connecting the local node to a next-hop routing node of the topology-independent small container.

Optionally, according to the actual application or deployment policy requirements, some topology-independent large containers may also be provided with access services by topology-dependent containers. In this case, the topology-independent large containers are used as internal routes of access containers of the topology-independent large containers and do not need to flood out of the access containers. However, the embodiment of the present disclosure is not limited to this.

Therefore, in the embodiment of the present disclosure, the number of routing entries of the core routing table is basically equal to "the number of routes of the topology-dependent global containers" plus "the number of routes of the topology-independent global containers". Because the numbers of routes of the two types are small, the total size of the routing table may be even smaller than the number of entries of the core routing table in a present Internet router. Therefore, in the embodiment of the present disclosure, container information of content is added on the basis of the content name to extend attributes of content in an ICN system, and the route of the topology-independent small container with light access traffic is restricted within the topology-dependent container providing the access service for the topology-independent small container, and the route of the lower-level container of the topology-dependent container is restricted within the topology-dependent container; therefore, the number of entries of a core routing table is reduced greatly, and the routing scalability problem in an existing ICN system such as an NDN is solved effectively.

The apparatus 1100 for establishing a routing table according to the embodiment of the present disclosure may correspond to the apparatus in the method for establishing a routing table according to the embodiment of the present disclosure, and the above and other operations and/or functions of the modules in the apparatus 1100 for establishing a routing table are respectively used to implement the corresponding procedures of each method in FIG. 14 and FIG. 15, and are not further described herein for brevity.

Figure 29:
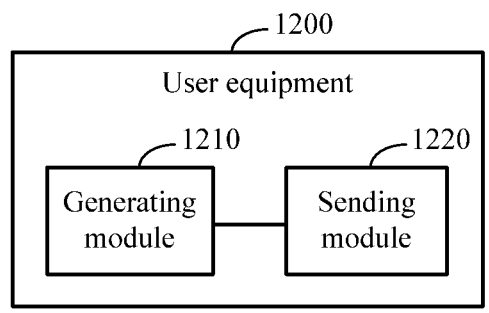
FIG. 29 is a schematic block diagram of a user equipment according to an embodiment of the present disclosure.

FIG. 29 is a schematic block diagram of a user equipment 1200 according to an embodiment of the present disclosure, including:

a generating module 1210, configured to generate a content request packet, where the content request packet carries a content name of requested content and container information of the requested content, where the container information of the requested content includes a container identifier used to identify a container that stores the requested content; and a sending module 1220, configured to send the content request packet generated by the generating module 1210 to a network device, so that the network device determines a forwarding route for the content request packet according to the content name of the requested content and the container information of the requested content.

Therefore, according to the user equipment in the embodiment of the present disclosure, container information of content is added on the basis of a content name to extend attributes of content in an ICN system, so that routing and forwarding are less dependent upon the content name. Therefore, routing entries in a routing table may be reduced, and it is possible to solve routing scalability and mobility problems and the like that are caused by the content name.

Optionally, in the embodiment of the present disclosure, the content name of the requested content corresponds to one or more home containers, where a home container of the requested content is a container that is capable of directly routing the requested content.

Optionally, the container includes at least one routing node, where the requested content is capable of being routed in the container through one or more routing nodes in the at least one routing node, or the requested content is capable of being routed through the container.

Optionally, the container information further includes a resolution identifier corresponding to the container identifier, where the resolution identifier is used to identify whether the container corresponding to the container identifier is resolvable.

Figure 30:
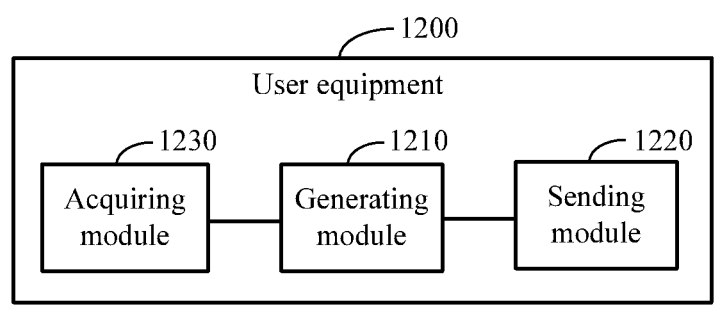
FIG. 30 is another schematic block diagram of a user equipment according to an embodiment of the present disclosure.

Optionally, as shown in FIG. 30, in another embodiment, the user equipment 1200 further includes:

an acquiring module 1230, configured to acquire the container information of the requested content before the generating module generates the content request packet; where the generating module 1210 is specifically configured to generate the content request packet according to the container information of the requested content which is acquired by the acquiring module 1230.

Figure 31:
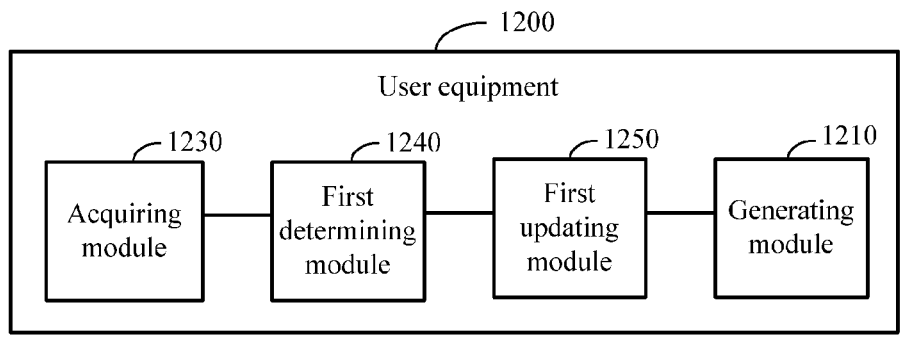
FIG. 31 is still another schematic block diagram of a user equipment according to an embodiment of the present disclosure.

Optionally, as shown in FIG. 31, in another embodiment, the user equipment 1200 further includes:

a first determining module 1240, configured to determine an access container of the container according to the container information of the requested content which is acquired by the acquiring module 1230; and a first updating module 1250, configured to add container information of the access container which is determined by the first determining module 1240, to the container information of the requested content; where the generating module 1210 is specifically configured to generate the content request packet according to the container information of the requested content updated by the first updating module 1250.

Figure 32:
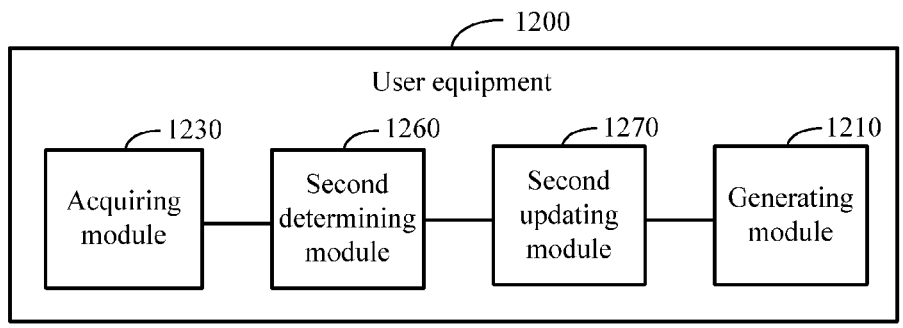
FIG. 32 is still another schematic block diagram of a user equipment according to an embodiment of the present disclosure.

Optionally, as shown in FIG. 32, in another embodiment, the user equipment 1200 further includes:

a second determining module 1260, configured to determine, according to the container information of the requested content which is acquired by the acquiring module 1230, access containers of all resolvable containers of the requested content; and a second updating module 1270, configured to add container information of the access containers of all the resolvable containers which are determined by the second determining module 1260, to the container information of the requested content; where the generating module 1210 is specifically configured to generate the content request packet according to the container information of the requested content updated by the second updating module 1270.

The user equipment 1200 according to the embodiment of the present disclosure may correspond to the apparatus in the method for acquiring content according to the embodiment of the present disclosure, and the above and other operations and/or functions of the modules in the user equipment 1200 are respectively used to implement the corresponding procedures of each method in FIG. 16 to FIG. 18, and are not further described herein for brevity.

Therefore, according to the user equipment in the embodiment of the present disclosure, container information of content is added on the basis of a content name to extend attributes of content in an ICN system, so that routing and forwarding are less dependent upon the content name. Therefore, routing entries in a routing table may be reduced, and it is possible to solve routing scalability and mobility problems and the like that are caused by the content name.

Figure 33:
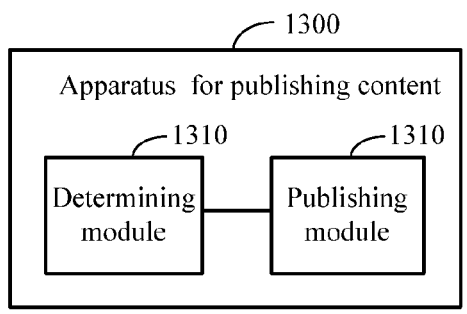
FIG. 33 is a schematic block diagram of an apparatus for publishing content according to an embodiment of the present disclosure.

FIG. 33 is a schematic block diagram of an apparatus 1300 for publishing content according to an embodiment of the present disclosure. As shown in FIG. 33, the apparatus 1300 includes:

a determining module 1310, configured to determine a container set of content and container information of each container in the container set, where the container set includes at least one container that stores the content; and a publishing module 1320, configured to publish the content and information about the content, where the information about the content includes a content name of the content and the container information of each container in the container set determined by the determining module 1310, so that a user generates a content request packet according to the information about the content and sends the content request packet to a network device and that a routing node determines a forwarding route for the content request packet according to the information about the content carried in the content request packet.

Therefore, according to the apparatus for publishing content in the embodiment of the present disclosure, container information of content is added on the basis of a content name to extend attributes of content in an ICN system, so that routing and forwarding are less dependent upon the content name. Therefore, routing entries in a routing table may be reduced, and it is possible to solve routing scalability and mobility problems and the like that are caused by the content name.

Optionally, in the embodiment of the present disclosure, the container information includes a container identifier.

Optionally, the container includes at least one routing node, where the requested content is capable of being routed in the container through one or more routing nodes in the at least one routing node, or the requested content is capable of being routed through the container.

Optionally, the content name of the content corresponds to one or more home containers, where a home container of the requested content is a container that is capable of directly routing the requested content.

Figure 34:
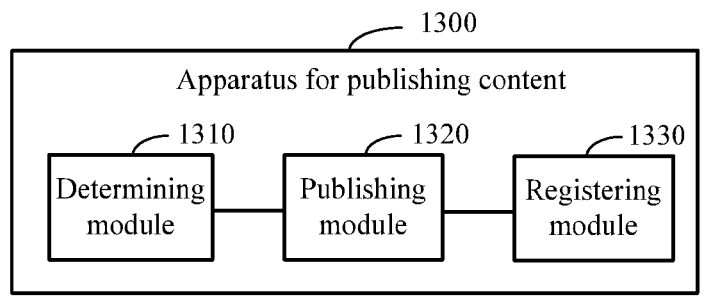
FIG. 34 is another schematic block diagram of an apparatus for publishing content according to an embodiment of the present disclosure.

Optionally, as shown in FIG. 34, in another embodiment, the apparatus 1300 further includes:

a registering module 1330, configured to register the at least one container in the container set and an access container of the at least one container with a resolution system, so that a user or routing node acquires the access container of the at least one container by querying the resolution system.

Optionally, the container information includes a container identifier and a resolution identifier, where the resolution identifier is used to identify whether the container is resolvable.

The apparatus 1300 for publishing content according to the embodiment of the present disclosure may correspond to the apparatus in the method for acquiring publishing content according to the embodiment of the present disclosure, and the above and other operations and/or functions of the modules in the apparatus 1300 for publishing content are respectively used to implement the corresponding procedures of each method in FIG. 19 and FIG. 20, and are not further described herein for brevity.

Therefore, according to the apparatus for publishing content in the embodiment of the present disclosure, container information of content is added on the basis of a content name to extend attributes of content in an ICN system, so that routing and forwarding are less dependent upon the content name. Therefore, routing entries in a routing table may be reduced, and it is possible to solve routing scalability and mobility problems and the like that are caused by the content name.

Figure 35:
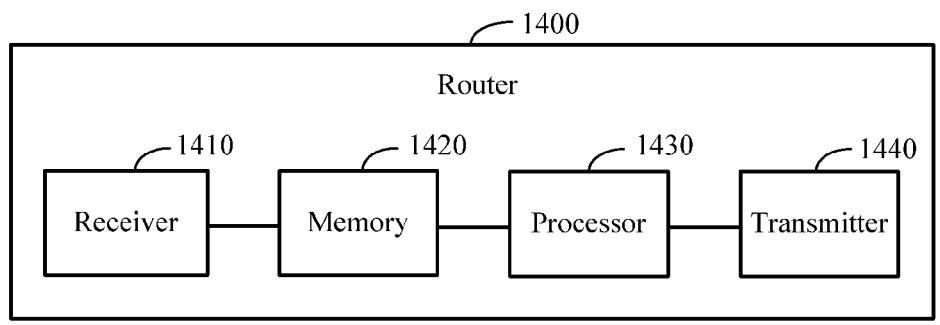
FIG. 35 is a schematic block diagram of a router according to still another embodiment of the present disclosure.

FIG. 35 is a schematic block diagram of a router 1400 according to an embodiment of the present disclosure. As shown in FIG. 35, the router 1400 includes: a receiver 1410, a memory 1420, a processor 1430 such as a CPU, and a transmitter 1440. The memory 1420 is configured to store an instruction for a forwarding engine, where the forwarding engine may include a forwarding information base FIB, or may also include a CS and a FIB, or may also include a CS, a PIT, and a FIB. The processor 1430 is configured to execute the instruction which is stored by the memory 1420 for the forwarding engine.

The receiver 1410 is configured to receive a content request packet, where the content request packet carries a content name of requested content and container information of the requested content, where the container information of the requested content includes a container identifier used to identify a container that stores the requested content;

the processor 1430 is configured to: determine whether any forwarding entry that matches the content name of the requested content which is carried in the content request packet received by the receiver 1410 exists in a forwarding information base FIB, and determine whether any forwarding entry that matches the container identifier in the container information of the requested content exists in the FIB when no forwarding entry that matches the content name of the requested content exists in the FIB, where a forwarding entry in the FIB includes a preset container identifier and a port corresponding to the preset container identifier; and the transmitter 1440 is configured to: when the processor 1430 determines that a forwarding entry that matches the container identifier in the container information of the requested content exists in the FIB, send the content request packet according to a port in the matched forwarding entry.

Optionally, in the embodiment of the present disclosure, the content request packet received by the receiving module 1410 may carry container information of only one container, or may also carry container information of more than two containers, which is not limited by the embodiment of the present disclosure.

The container is a storage space used to store a group of content. The container includes at least one routing node, where the requested content is capable of being routed in the container through one or more routing nodes in the at least one routing node, or the requested content is capable of being routed through the container. The content name of the requested content corresponds to one or more home containers, where a home container of the requested content is a container that is capable of directly routing the requested content. The container is an access container of one or more first other containers; and/or one or more second other containers are access containers of the container; where, the access container is a container including another container in a topological relationship and having a forwarding entry for routing the content request packet to the another container. Specifically, when a second container includes a first container and the second container has a forwarding entry for routing the content request packet to the first container, the second container is an access container of the first container.

In the embodiment of the present disclosure, container information of the container includes a container identifier of the container. Optionally, the container information further includes a resolution identifier corresponding to the container identifier, where the resolution identifier is used to identify whether the container corresponding to the container identifier is resolvable. Correspondingly, the processor 1430 is specifically configured to: acquire, by resolution according to the resolution identifier, container identifiers of access containers of all resolvable containers of the requested content; and match the container identifier in the container information of the requested content acquired by resolution and the container identifiers of the access containers of all the resolvable containers of the requested content with the preset container identifiers in the FIB to determine whether any forwarding entry that matches the container identifier in the container information of the requested content and the container identifier of the access container exists in the FIB.

Optionally, in another embodiment, the processor 1430 is further configured to add container information of the access containers of all the resolvable containers of the requested content to the container information of the requested content.

Optionally, in another embodiment, the processor 1430 is further configured to acquire, by resolution according to the resolution identifier, a container identifier of an access container of the container when no forwarding entry that matches the container identifier in the container information of the requested content exists in the FIB; and match the container identifier of the access container which is acquired by resolution, with the preset container identifiers in the FIB to determine whether any forwarding entry that matches the container identifier of the access container which is acquired by resolution exists in the FIB.

Optionally, in another embodiment, the forwarding entries in the FIB include content name prefixes and ports corresponding to the content name prefixes. The processor 1430 is further configured to determine, according to whether a prefix of the content name of the requested content matches any content name prefix in the forwarding entries in the FIB, whether any forwarding entry that matches the content name of the requested content exists in the FIB; and the transmitter 1440 is further configured to: when the processor 1430 determines that a forwarding entry that matches the content name of the requested content exists in the FIB, send the content request packet according to a port in the matched forwarding entry.

Optionally, in another embodiment, the forwarding engine may further include a content store table CS; the processor 1430 is further configured to: before the determining whether any forwarding entry that matches the content name of the requested content exists in the FIB, determine whether any content that matches the content name of the requested content exists in the CS;

the transmitter 1440 is further configured to: when the processor 1430 determines that content that matches the content name of the requested content exists in the CS, send the matched content to a sender of the content request packet; and the processor 1430 is further configured to: when no content that matches the content name of the requested content exists in the CS, perform the step of determining whether any forwarding entry that matches the content name of the requested content exists in the FIB.

Optionally, in another embodiment, the forwarding engine may further include a CS table and a PIT. the processor 1430 is specifically configured to: when no content that matches the content name of the requested content exists in the CS, determine whether any PIT entry that matches the content name of the requested content exists in a pending information table PIT; when a PIT entry that matches the content name of the requested content exists in the PIT, add a port corresponding to the sender of the content request packet to the matched PIT entry; and when no PIT entry that matches the content name of the requested content exists in the PIT, perform the step of determining whether any forwarding entry that matches the content name of the requested content exists in the FIB.

Optionally, in another embodiment, the transmitter 1440 is further configured to send the content request packet according to a default port when no forwarding entry that matches the container identifier in the container information of the requested content exists in the FIB; or the processor 1430 is further configured to discard the content request packet when no forwarding entry that matches the container identifier in the container information of the requested content exists in the FIB.

Therefore, according to the router in the embodiment of the present disclosure, container information of content is added on the basis of a content name to extend attributes of content in an ICN system, so that routing and forwarding are less dependent upon the content name. Therefore, routing entries in a routing table may be reduced, and it is possible to solve routing scalability and mobility problems and the like that are caused by the content name.

Optionally, in the embodiment of the present disclosure, the FIB includes a forwarding entry of a global container, where the forwarding entry of the global container includes a container identifier of the global container and a first port corresponding to the container identifier of the global container, where the first port is a port connecting a local node to a next-hop routing node of the global container, the global container is a container capable of global routing, and the global container includes a topology-dependent global container and/or a topology-independent global container.

Optionally, the FIB further includes a forwarding entry of the topology-dependent container, for routing based on the topology-dependent container, and the forwarding entry of the topology-dependent container is used, so that a route of a lower-level container of a home container of the local node is used as an internal route of the local node and does not flood out of the home container of the local node;

where the topology-dependent container is a container forming a topological relationship with other containers, where the topological relationship includes: one upper-level container including one or more lower-level containers, and/or one lower-level container being included by one or more upper-level containers.

Optionally, the forwarding entry of the topology-dependent container includes a container identifier of the lower-level container relative to the home container of the local node and a second port corresponding to the container identifier of the lower-level container, where the second port is a port connecting the local node to the lower-level container; and correspondingly, the using the forwarding entry of the topology-dependent container, so that a route of a lower-level container of a home container of the local node is used as an internal route of the local node and does not flood out of the home container of the local node, includes:

using the container identifier of the lower-level container and the second port corresponding to the container identifier of the lower-level container in the forwarding entry of the topology-dependent container, so that the route of the lower-level container of the home container of the local node is used as an internal route of the local node and does not flood out of the home container of the local node.

Optionally, a container identifier corresponding to the topology-dependent container is capable of reflecting a level of the topology-dependent container, thereby indicating the topological relationship formed between the topology-dependent container and other containers.

Optionally, the FIB further includes a forwarding entry of a topology-independent small container, where the forwarding entry of the topology-independent small container includes a container identifier of the topology-independent small container and a third port corresponding to the container identifier of the topology-independent small container, where the third port is a port connecting the local node to a next-hop routing node of the topology-independent small container.

The router 1400 according to the embodiment of the present disclosure may correspond to the apparatus in the method for routing and forwarding according to the embodiment of the present disclosure, and the above and other operations and/or functions of the modules in the router 1400 are respectively used to implement the corresponding procedures of each method in FIG. 1 to FIG. 12, and are not further described herein for brevity.

Therefore, in the embodiment of the present disclosure, container information of content is added on the basis of the content name to extend attributes of content in an ICN system, and the route of the topology-independent small container is restricted within the topology-dependent container providing the access service for the topology-independent small container, and the route of the lower-level container of the topology-dependent container is restricted within the topology-dependent container; therefore, the number of entries of the core routing table is reduced greatly, and the routing scalability problem in an existing ICN system such as an NDN is solved effectively.

Figure 36:
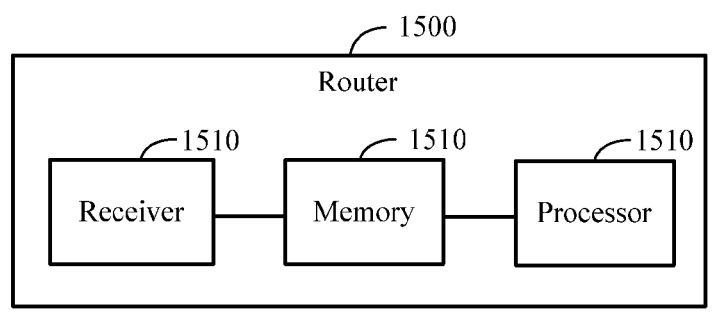
FIG. 36 is a schematic block diagram of a router according to still another embodiment of the present disclosure.

FIG. 36 is a schematic block diagram of a router 1500 according to another embodiment of the present disclosure. As shown in FIG. 36, the router 1500 includes: a receiver 1510, a memory 1520, and a processor 1530 such as a CPU. The memory 1520 is configured to store an instruction for a forwarding engine, where the forwarding engine may include a FIB, or may also include a FIB and a CS, or may also include a FIB, a CS, and a PIT. The processor 1530 is configured to execute the instruction stored by the memory 1520.

Specifically, the receiver 1510 is configured to receive a content request packet, where the content request packet carries a content name of requested content and container information of the requested content, where the container information of the requested content includes a container identifier used to identify a container that stores the requested content, where the container includes at least one routing node, where the requested content is capable of being routed in the container through one or more routing nodes in the at least one routing node, or the requested content is capable of being routed through the container; and the processor 1530 is configured to determine a forwarding route for the content request packet according to the content name of the requested content and the container information of the requested content which are carried in the content request packet received by the receiver 1510.

Therefore, according to the router in the embodiment of the present disclosure, container information of content is added on the basis of a content name to extend attributes of content in an ICN system, so that routing and forwarding are less dependent upon the content name. Therefore, routing entries in a routing table may be reduced, and it is possible to solve routing scalability and mobility problems and the like that are caused by the content name.

Optionally, the content request packet may carry container information of only one container, or may also carry container information of more than two containers, which is not limited by the embodiment of the present disclosure. The container information of the container includes a container identifier of the container. Optionally, the container information of the container may further include a resolution identifier of the container, which is not limited by the embodiment of the present disclosure.

The container is a storage space used to store a group of content. Optionally, the content name of the requested content corresponds to one or more home containers, where a home container of the requested content is a container that is capable of directly routing the requested content.

Optionally, the container is an access container of one or more first other containers; and/or one or more second other containers are access containers of the container; where, the access container is a container including another container in a topological relationship and having a forwarding entry for routing the content request packet to the another container. Specifically, when a second container includes a first container and the second container has a forwarding entry for routing the content request packet to the first container, the second container is an access container of the first container.

Figure 37:
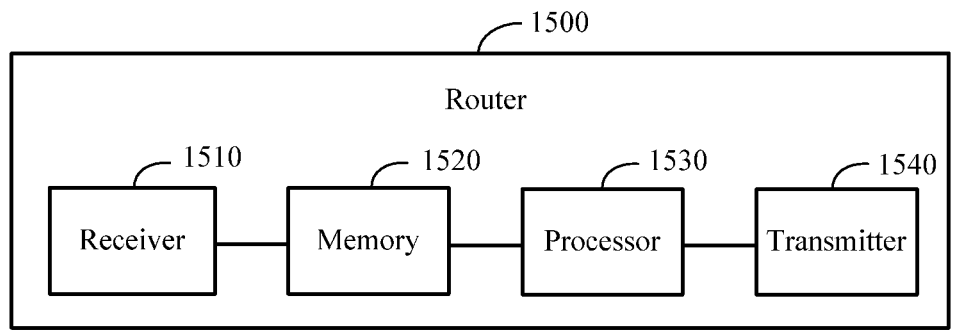
FIG. 37 is another schematic block diagram of a router according to still another embodiment of the present disclosure.

Optionally, in the embodiment of the present disclosure, the processor 1530 is specifically configured to: determine whether any forwarding entry that matches the content name of the requested content exists in a forwarding information base FIB, and determine whether any forwarding entry that matches the container identifier in the container information of the requested content exists in the FIB when no forwarding entry that matches the content name of the requested content exists in the FIB, where a forwarding entry in the FIB includes a preset container identifier and a port corresponding to the preset container identifier; and correspondingly, as shown in FIG. 37, the router 1500 further includes:

a transmitter 1540, configured to: when the processor 1530 determines that a forwarding entry that matches the container identifier in the container information of the requested content exists in the FIB, send the content request packet according to a port in the matched forwarding entry.

Optionally, a tree with the content name of the requested content as a root node is formed by the content name of the requested content and the container information of the requested content, where a child node of the root node represents container information of a home container of the requested content, and a container corresponding to container information represented by a first node is an access container of a container corresponding to container information represented by a parent node of the first node, where the first node is a node in the tree other than the root node and the child node of the root node.

Optionally, in another embodiment, a directed acyclic graph with the content name of the requested content as an entrance vertex is formed by the content name of the requested content and the container information of the requested content, where an endpoint of a directed edge originated from the entrance vertex represents container information of the home container of the requested content, and a container corresponding to container information represented by a second vertex in the directed acyclic graph is an access container of a container corresponding to container information represented by a first vertex, where the first vertex is a vertex in the directed acyclic graph other than the entrance vertex, and the second vertex is an endpoint of a directed edge originated from the first vertex.

Correspondingly, in the content request packet, the tree structure or directed acyclic graph structure may be represented in a text format, which is not limited by the embodiment of the present disclosure.

The router 1500 according to the embodiment of the present disclosure may correspond to the router in the method for processing a content request according to the embodiment of the present disclosure, and the above and other operations and/or functions of the modules in the router 1500 are respectively used to implement the corresponding procedures of each method in FIG. 13 and FIG. 14, and are not further described herein for brevity.

Therefore, according to the router in the embodiment of the present disclosure, container information of content is added on the basis of a content name to extend attributes of content in an ICN system, so that routing and forwarding are less dependent upon the content name. Therefore, routing entries in a routing table may be reduced, and it is possible to solve routing scalability and mobility problems and the like that are caused by the content name.

Figure 38:
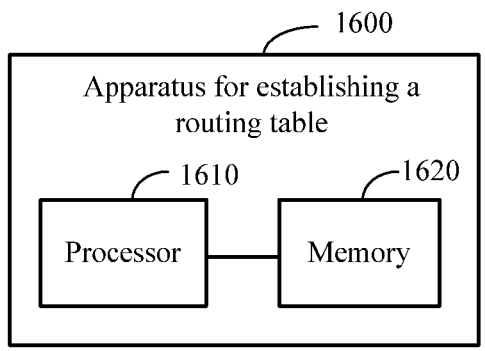
FIG. 38 is a schematic block diagram of an apparatus for establishing a routing table according to another embodiment of the present disclosure.

FIG. 38 is a schematic block diagram of an apparatus 1600 for establishing a routing table according to an embodiment of the present disclosure. As shown in FIG. 38, the apparatus 1600 for establishing a routing table includes: a processor 1610 such as a CPU, and a memory 1620. Specifically, the processor 1610 is configured to generate a routing table of a local node, so that a forwarding information base FIB is generated according to the routing table, where the routing table includes a routing entry of a global container, where the routing entry of the global container includes a container identifier of the global container and a first port corresponding to the container identifier of the global container, where the first port is a port connecting the local node to a next-hop routing node of the global container, the global container is a container capable of global routing, and the global container includes a topology-dependent global container and/or a topology-independent global container; and the memory 1620 is configured to store the routing table generated by the processor 1610.

Because the FIB is a subset of the routing table, a FIB of the local node may be generated according to the routing table generated in the embodiment of the present disclosure. The FIB may be a FIB in the method for routing and forwarding and the method for processing a content request according to the embodiments of the present disclosure. The FIB is specifically used to: when the local node receives the content request packet, match the content name of requested content which is carried in the content request packet and the container identifier in the container information with the forwarding entries in the FIB to determine a forwarding route for the content request packet.

In the embodiment of the present disclosure, all containers are classified into three types: topology-dependent container, topology-independent large container, and topology-independent small container. The topology-dependent container is a container forming a topological relationship with other containers, where the topological relationship includes: one upper-level container including one or more lower-level containers, and/or one lower-level container being included by one or more upper-level containers. When one container is one level away from another container, the container at a lower level is referred to as a lower-level container of the container at a higher level, and the container at the higher level is referred to as an upper-level container of the container at the lower level. The container at the lower level may be provided with an access service by its upper-level container, that is, the container at the higher level is an access container of the lower-level container.

The global container is a container capable of global routing, and includes a topology-dependent global container at the highest level in the topological relationship and a topology-independent large container. Other topology-dependent containers in the topological relationship than the topology-dependent global container are provided with access services by their upper-level containers, and topology-independent small containers may be provided with access services by topology-dependent containers. Correspondingly, routes of global containers may exist in a routing table of any routing node, but routes of other topology-dependent containers in the topological relationship than the global containers and routes of topology-independent small containers exist only in routing tables of routing nodes included by access containers thereof, and do not flood out of the access containers thereof.

The routing table of the local node may include a routing entry of a global container, where the routing entry of the global container includes a container identifier of the global container and a first port corresponding to the container identifier of the global container, where the first port is a port connecting the local node to a next-hop routing node of the global container.

Optionally, the routing table of the local node may further include a local route, that is, may further include a routing entry of a topology-dependent container and a routing entry of a topology-independent small container. Specifically, the routing table further includes a routing entry of the topology-dependent container, for routing based on the topology-dependent container, and the routing entry of the topology-dependent container is used, so that a route of a lower-level container of a home container of the local node is used as an internal route of the local node and does not flood out of the home container of the local node.

Optionally, the routing entry of the topology-dependent container includes a lower-level container identifier of the lower-level container relative to the home container of the local node and a second port corresponding to the lower-level container identifier, where the second port is a port connecting the local node to the lower-level container; and the using the routing entry of the topology-dependent container, so that a route of a lower-level container of a home container of the local node is used as an internal route of the local node and does not flood out of the home container of the local node, includes:

using the lower-level container identifier and the second port corresponding to the lower-level container identifier in the routing entry of the topology-dependent container, so that the route of the lower-level container of the home container of the local node is used as an internal route of the local node and does not flood out of the home container of the local node.

Optionally, a container identifier corresponding to the topology-dependent container is capable of reflecting a level of the topology-dependent container, thereby indicating the topological relationship between the topology-dependent container and other containers.

Optionally, the routing table further includes a routing entry of a topology-independent small container. The routing entry of the topology-independent small container includes a container identifier of the topology-independent small container and a third port corresponding to the container identifier of the topology-independent small container, where the third port is a port connecting the local node to a next-hop routing node of the topology-independent small container.

Optionally, according to the actual application or deployment policy requirements, some topology-independent large containers may also be provided with access services by topology-dependent containers. In this case, the topology-independent large containers are used as internal routes of access containers of the topology-independent large containers and do not need to flood out of the access containers. However, the embodiment of the present disclosure is not limited to this.

Therefore, in the embodiment of the present disclosure, the number of routing entries of the core routing table is basically equal to "the number of routes of the topology-dependent global containers" plus the "number of routes of the topology-independent global containers". Because the numbers of routes of the two types are small, the total size of the routing table may be even smaller than the number of entries of the core routing table in a present Internet router. Therefore, in the embodiment of the present disclosure, container information of content is added on the basis of the content name to extend attributes of content in an ICN system, and the route of the topology-independent small container with light access traffic is restricted within the topology-dependent container providing the access service for the topology-independent small container, and the route of the lower-level container of the topology-dependent container is restricted within the topology-dependent container; therefore, the number of entries of a core routing table is reduced greatly, and the routing scalability problem in an existing ICN system such as an NDN is solved effectively.

The apparatus 1600 for establishing a routing table according to the embodiment of the present disclosure may correspond to the apparatus in the method for establishing a routing table according to the embodiment of the present disclosure, and the above and other operations and/or functions of the modules in the apparatus 1600 for establishing a routing table are respectively used to implement the corresponding procedures of each method in FIG. 14 and FIG. 15, and are not further described herein for brevity.

Figure 39:
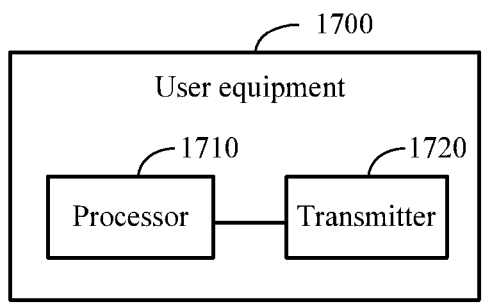
FIG. 39 is a schematic block diagram of a user equipment according to another embodiment of the present disclosure.

FIG. 39 is a schematic block diagram of a user equipment 1700 according to an embodiment of the present disclosure. As shown in FIG. 39, the user equipment 1700 includes: a processor 1710 such as a CPU and a transmitter 1720.

The processor 1710 is configured to generate a content request packet, where the content request packet carries a content name of requested content and container information of the requested content, where the container information of the requested content includes a container identifier used to identify a container that stores the requested content; and the transmitter 1720 is configured to send the content request packet generated by the processor 1710 to a network device, so that the network device determines a forwarding route for the content request packet according to the content name of the requested content and the container information of the requested content.

Therefore, according to the user equipment in the embodiment of the present disclosure, container information of content is added on the basis of a content name to extend attributes of content in an ICN system, so that routing and forwarding are less dependent upon the content name. Therefore, routing entries in a routing table may be reduced, and it is possible to solve routing scalability and mobility problems and the like that are caused by the content name.

Optionally, in the embodiment of the present disclosure, the content name of the requested content corresponds to one or more home containers, where a home container of the requested content is a container that is capable of directly routing the requested content.

Optionally, the container includes at least one routing node, where the requested content is capable of being routed in the container through one or more routing nodes in the at least one routing node, or the requested content is capable of being routed through the container.

Optionally, the container information further includes a resolution identifier corresponding to the container identifier, where the resolution identifier is used to identify whether the container corresponding to the container identifier is resolvable.

Optionally, in another embodiment, the processor 1710 is further configured to: acquire the container information of the requested content, and generate the content request packet according to the acquired container information of the requested content.

Optionally, in another embodiment, the processor 1710 is further configured to: acquire the container information of the requested content before generating the content request packet, and generate the content request packet according to the acquired container information of the requested content.

Optionally, in another embodiment, the processor 1710 is further configured to determine an access container of the container according to the acquired container information of the requested content, add container information of the access container to the container information of the requested content, and generate the content request packet according to the updated container information of the requested content.

Optionally, in another embodiment, the processor 1710 is further configured to determine access containers of all resolvable containers of the requested content according to the acquired container information of the requested content, add container information of the access containers of all the resolvable containers to the container information of the requested content, and generate the content request packet according to the updated container information of the requested content.

The user equipment 1700 according to the embodiment of the present disclosure may correspond to the apparatus in the method for acquiring content according to the embodiment of the present disclosure, and the above and other operations and/or functions of the modules in the user equipment 1700 are respectively used to implement the corresponding procedures of each method in FIG. 16 to FIG. 18, and are not further described herein for brevity.

Therefore, according to the user equipment in the embodiment of the present disclosure, container information of content is added on the basis of a content name to extend attributes of content in an ICN system, so that routing and forwarding are less dependent upon the content name.

Therefore, routing entries in a routing table may be reduced, and it is possible to solve routing scalability and mobility problems and the like that are caused by the content name.

Figure 40:
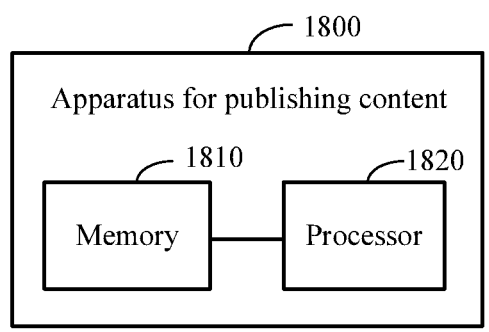
FIG. 40 is a schematic block diagram of an apparatus for publishing content according to another embodiment of the present disclosure.

FIG. 40 is a schematic block diagram of an apparatus 1800 for publishing content according to an embodiment of the present disclosure. As shown in FIG. 40, the apparatus 1800 includes: a memory 1810 and a processor 1820 such as a CPU. The memory 1810 is configured to store an instruction, and the processor 1820 is configured to execute the instruction stored by the memory 1810. Specifically, the processor 1820 is configured to: determine a container set of content and container information of each container in the container set, where the container set includes at least one container that stores the content; and publish the content and information about the content, where the information about the content includes a content name of the content and the container information of each container in the container set, so that a user generates a content request packet according to the information about the content and sends the content request packet to a network device and that a routing node determines a forwarding route for the content request packet according to the information about the content carried in the content request packet.

Therefore, according to the apparatus for publishing content in the embodiment of the present disclosure, container information of content is added on the basis of a content name to extend attributes of content in an ICN system, so that routing and forwarding are less dependent upon the content name. Therefore, routing entries in a routing table may be reduced, and it is possible to solve routing scalability and mobility problems and the like that are caused by the content name.

Optionally, in the embodiment of the present disclosure, the container information includes a container identifier.

Optionally, the container includes at least one routing node, where the requested content is capable of being routed in the container through one or more routing nodes in the at least one routing node, or the requested content is capable of being routed through the container.

Optionally, the content name of the content corresponds to one or more home containers, where a home container of the requested content is a container that is capable of directly routing the requested content.

Optionally, in another embodiment, the processor 1820 is further configured to register the at least one container in the container set and an access container of the at least one container with a resolution system, so that a user or routing node acquires the access container of the at least one container by querying the resolution system.

Optionally, the container information includes a container identifier and a resolution identifier, where the resolution identifier is used to identify whether the container is resolvable.

The apparatus 1800 for publishing content according to the embodiment of the present disclosure may correspond to the apparatus in the method for acquiring publishing content according to the embodiment of the present disclosure, and the above and other operations and/or functions of the modules in the apparatus 1800 for publishing content are respectively used to implement the corresponding procedures of each method in FIG. 19 and FIG. 20, and are not further described herein for brevity.

Therefore, according to the apparatus for publishing content in the embodiment of the present disclosure, container information of content is added on the basis of a content name to extend attributes of content in an ICN system, so that routing and forwarding are less dependent upon the content name. Therefore, routing entries in a routing table may be reduced, and it is possible to solve routing scalability and mobility problems and the like that are caused by the content name.

It should be understood that, in the embodiments of the present disclosure, the term "and/or" describes only an association relationship of associated objects, and represents that three relationships may exist. For example, A and/or B may represent the following three cases: A exists separately, both A and B exist, and B exists separately. In addition, the symbol "/" herein usually represents that the associated objects before and after the symbol are in an or relationship.

A person of ordinary skill in the art may be aware that, in combination with the embodiments disclosed in this specification, method steps and units can be implemented by electronic hardware, computer software, or a combination thereof. To clearly describe the interchangeability between the hardware and the software, the foregoing has generally described compositions and steps of each example according to functions. Whether the functions are performed by hardware or software depends on the particular applications and design constraint conditions of the technical solution. A person of ordinary skill in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that, the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some ports. The indirect couplings or communication connections between the apparatuses or units may be implemented in electronic, mechanical, or other forms.

The units described as separate parts may or may not be physically separate, and the parts displayed as units may or may not be physical units, and may be located in one position, or may be distributed on a plurality of network units. Some or all of the units may be selected to achieve the objective of the solution of the embodiments of the present disclosure according to actual needs.

In addition, functional units in the embodiments of the present disclosure may be integrated into one processing unit, or each of the units may exist alone physically, or two or more units may be integrated into one unit. The integrated units may be implemented in a form of hardware, or may be implemented in a form of a software functional unit.

When the integrated units are implemented in a form of a software functional unit and sold or used as an independent product, the integrated units may be stored in a computer-readable storage medium. Based on such an understanding, the technical solutions of the present disclosure essentially, or the part contributing to the prior art, or all or a part of the technical solutions may be implemented in a form of a software product. The computer software product is stored in a storage medium and includes several instructions for instructing a computer device (which may be a personal computer, a server, a network device, or the like) to perform all or a part of the steps of the methods described in the embodiments of the present disclosure. The storage medium includes: any mediums that can store program code, such as a USB flash drive, a removable hard disk, a read-only memory (Read-Only Memory, "ROM" for short), a random access memory (Random Access Memory, "RAM" for short), a magnetic disk, or an optical disc.

The foregoing descriptions are merely specific embodiments of the present disclosure, but are not intended to limit the protection scope of the present disclosure. Any equivalent modification or replacement readily figured out by a person skilled in the art within the technical scope of the present disclosure shall fall within the protection scope of the present disclosure. Therefore, the protection scope of the present disclosure shall be subject to the protection scope of the claims.

What is claimed is:

1. A computer-implemented method for routing a packet, comprising:
    receiving, by a computer, a content request packet that carries a content name of requested content and container information of the requested content, wherein the container information of the requested content comprises a container identifier used to identify a container that stores the requested content;
    determining whether any forwarding entry that longest prefix matches the content name of the requested content exists in a forwarding information base (FIB);
    determining whether any forwarding entry that matches the container identifier in the container information of the requested content exists in the FIB when no forwarding entry that longest prefix matches the content name of the requested content exists in the FIB, wherein a forwarding entry in the FIB comprises a preset container identifier and a port corresponding to the preset container identifier;
    acquiring, by resolution of the container identifier, a container identifier of an access container of the container when no forwarding entry that matches the container identifier in the container information of the requested content exists in the FIB;
    determining whether any forwarding entry that matches the container identifier of the access container which is acquired by resolution exists in the FIB; and
    upon determining that a forwarding entry that matches the container identifier of the access container which is acquired by resolution exists in the FIB, sending the content request packet according to a port in the matched forwarding entry.

2. The method according to claim 1, wherein the container comprises at least one routing node, wherein the content request packet is routed to a node that storing the content in the container through one or more routing nodes in the at least one routing node, or the content request packet is routed to a node that storing the content through the container.

3. The method according to claim 1, wherein the content name of the requested content corresponds to one or more home containers, wherein a home container of the requested content is a container that directly routes the content request packet to a node that storing the content.

4. The method according to claim 3, wherein: the container is an access container of one or more other first containers; and
    one or more other second containers are access containers of the container;
    wherein, the access container is a container comprising another container in a topological relationship and having a forwarding entry for routing the content request packet to the another container.

5. The method according to claim 4, wherein: the container information further comprises a resolution identifier corresponding to the container identifier, wherein the resolution identifier is used to identify whether the container corresponding to the container identifier is resolvable; and
    the determining whether any forwarding entry that matches the container identifier in the container information of the requested content exists in the FIB further comprises:
    acquiring, by resolution according to the resolution identifier, container identifiers of access containers of all resolvable containers of the requested content; and
    matching the container identifier in the container information of the requested content and the container identifiers of the access containers of all the resolvable containers of the requested content with the preset container identifiers in the FIB to determine whether any forwarding entry that matches the container identifier in the container information of the requested content and the container identifier of the access container exists in the FIB.

6. The method according to claim 5, further comprising:
    adding container information, which is acquired by resolution, of the access containers of all the resolvable containers of the requested content, to the container information of the requested content.

7. The method according to claim 4, wherein the method further comprises:
    acquiring, by resolution according to a resolution identifier corresponding to the container identifier is used to identify whether the container corresponding to the container identifier is resolvable, a container identifier of an access container of the container when no forwarding entry that matches the container identifier in the container information of the requested content exists in the FIB; and
    matching the container identifier of the access container which is acquired by resolution, with the preset container identifiers in the FIB to determine whether any forwarding entry that matches the container identifier of the access container which is acquired by resolution exists in the FIB.

8. The method according to claim 7, further comprising:
    adding container information of the access container which is acquired by resolution to the container information of the requested content.

9. The method according to claim 8, wherein: the forwarding entries in the FIB comprise content name prefixes and ports corresponding to the content name prefixes;
    the determining whether any forwarding entry that longest prefix matches the content name of the requested content exists in the FIB is according to whether a prefix of the content name of the requested content matches any content name prefix in the forwarding entries in the FIB, whether any forwarding entry that matches the content name of the requested content exists in the FIB; and sending the content request packet according to a port in the matched forwarding entry when a forwarding entry that matches the content name of the requested content exists in the FIB.

10. The method according to claim 1, further comprising:
sending the content request packet according to a default interface, or discarding the content request packet when no forwarding entry that matches the container identifier in the container information of the requested content exists in the FIB.

11. An apparatus for routing a packet, the apparatus comprising:
one or more processors;
a memory, that stores one or more fixed sequences of instructions, wherein the fixed sequence of instructions cause the one or more processors to receive a content request packet that carries a content name of requested content and container information of the requested content, wherein the container information of the requested content comprises a container identifier used to identify a container that stores the requested content;
determine whether any forwarding entry longest prefix matches the content name of the requested content which is carried in the content request packet exists in a forwarding information base (FIB) which is stored in the memory;
determine whether any forwarding entry that matches the container identifier in the container information of the requested content exists in the FIB when no forwarding entry that longest prefix matches the content name of the requested content exists in the FIB, wherein a forwarding entry in the FIB comprises a preset container identifier and a port corresponding to the preset container identifier;
acquire, by resolution of the container identifier, a container identifier of an access container of the container when no forwarding entry that matches the container identifier in the container information of the requested content exists in the FIB;
determine whether any forwarding entry that matches the container identifier of the access container which is acquired by resolution exists in the FIB; and
upon the determination that a forwarding entry matches the container identifier of the access container which is acquired by resolution exists in the FIB, the processor sends the content request packet according to a port in the matched forwarding entry.

12. The apparatus according to claim 11, wherein the container comprises at least one routing node, wherein the content request packet routed to a node that storing the content in the container through one or more routing nodes in the at least one routing node, or the content request packet is routed to a node that storing the content through the container.

13. The apparatus according to claim 11, wherein the content name of the requested content corresponds to one or more home containers, wherein a home container of the requested content is a container that is capable of directly routing the requested content.

14. The apparatus according to claim 13, wherein: the container is an access container of one or more first other containers; and
one or more second other containers are access containers of the container;
wherein, the access container is a container comprising another container in a topological relationship and having a forwarding entry for routing the content request packet to the another container.

15. The apparatus according to claim 14, wherein: the container information further comprises a resolution identifier corresponding to the container identifier, wherein the resolution identifier is used to identify whether the container corresponding to the container identifier is resolvable; and
when the one or more fixed sequences of instructions are executed by the one or more processors, causes the one or more processors to perform the steps of:
acquire, by resolution according to the resolution identifier, container identifiers of access containers of all resolvable containers of the requested content; and
match the container identifier in the container information of the requested content and the container identifiers of the access containers of all the resolvable containers of the requested content which are acquired by resolution by the first resolving unit with the preset container identifiers in the FIB to determine whether any forwarding entry that matches the container identifier in the container information of the requested content and the container identifier of the access container exists in the FIB.

16. The apparatus according to claim 15, when the one or more fixed sequences of instructions are executed by the one or more processors, causes the one or more processors to add container information, which is acquired by resolution by the first resolving unit, of the access containers of all the resolvable containers of the requested content, to the container information of the requested content.

17. The apparatus according to claim 14, wherein: the container information further comprises a resolution identifier corresponding to the container identifier, wherein the resolution identifier is used to identify whether the container corresponding to the container identifier is resolvable;
when the one or more fixed sequences of instructions are executed by the one or more processors, causes the one or more processors to perform the steps of:
when determines that no forwarding entry that matches the container identifier in the container information of the requested content exists in the FIB, acquire, by resolution according to the resolution identifier, a container identifier of an access container of the container; and
match the container identifier of the access container which is acquired by resolution, with the preset container identifiers in the FIB to determine whether any forwarding entry that matches the container identifier of the access container which is acquired by resolution exists in the FIB.

18. The apparatus according to claim 17, when the one or more fixed sequences of instructions are executed by the one or more processors, causes the one or more processors to
add container information of the access container which is acquired by resolution, to the container information of the requested content.

19. The apparatus according to claim 14, wherein: the forwarding entries in the FIB comprise content name prefixes and ports corresponding to the content name prefixes;
when the one or more fixed sequences of instructions are executed by the one or more processors, causes the one or more processors to:
determine, according to whether a prefix of the content name of the requested content matches any content name prefix in the forwarding entries in the FIB, that a forwarding entry that matches the content name of the requested content exists in the FIB; and send the content request packet according to a port in the matched forwarding entry.

20. The apparatus according to claim 11, wherein: when the one or more fixed sequences of instructions are executed by the one or more processors, causes the one or more processors to
send the content request packet through according to a default interface, when no forwarding entry that matches the container identifier in the container information of the requested content exists in the FIB; or discard the content request packet when no forwarding entry that matches the container identifier in the container information of the requested content exists in the FIB.

21. A computer-implemented method for routing a packet, comprising:
receiving, by a computer, a content request packet that carries a content name of requested content and container information of the requested content, wherein the container information of the requested content comprises a container identifier used to identify a container that stores the requested content;
determining whether any forwarding entry that longest prefix matches the content name of the requested content exists in a forwarding information base (FIB);
determining whether any forwarding entry that matches the container identifier in the container information of the requested content exists in the FIB when no forwarding entry that longest prefix matches the content name of the requested content exists in the FIB, wherein a forwarding entry in the FIB comprises a preset container identifier and a port corresponding to the preset container identifier; and
upon determining that a forwarding entry that matches the container identifier in the container information of the requested content exists in the FIB, sending the content request packet according to a port in the matched forwarding entry.

* * * * *